(12) United States Patent
Sigler et al.

(10) Patent No.: US 6,477,370 B1
(45) Date of Patent: *Nov. 5, 2002

(54) SATELLITE TRUNKED RADIO SERVICE SYSTEM

(75) Inventors: C. Edward Sigler, Myersville, MD (US); Richard S. Sweet, San Diego, CA (US)

(73) Assignee: Motient Service Inc., Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/114,289

(22) Filed: Jul. 13, 1998

Related U.S. Application Data

(63) Continuation-in-part of application No. 09/887,691, filed on Aug. 29, 1997, and a continuation-in-part of application No. PCT/US96/19165, filed on Nov. 27, 1996, and a continuation-in-part of application No. 08/657,479, filed on May 29, 1996, now Pat. No. 5,717,830, said application No. 09/887,691, is a continuation-in-part of application No. 08/718,133, filed on Sep. 18, 1996.

(60) Provisional application No. 60/014,205, filed on Mar. 27, 1996, provisional application No. 60/007,742, filed on Nov. 30, 1995, and provisional application No. 60/003,989, filed on Sep. 19, 1995.

(51) Int. Cl.[7] .............................................. H04B 7/185
(52) U.S. Cl. ........................................ 455/427; 455/512
(58) Field of Search ................................. 455/410, 411, 455/426, 428, 430, 12.1, 13.1, 422, 450, 452, 509, 510, 511, 512, 517, 518, 524, 62, 67.1

(56) References Cited

U.S. PATENT DOCUMENTS

| | | |
|---|---|---|
| 4,951,279 A | 8/1990 | Hotta |
| 5,216,427 A | 6/1993 | Yan et al. |
| 5,239,647 A | 8/1993 | Anglin et al. |
| 5,303,286 A | 4/1994 | Wiedeman |
| 5,371,898 A | 12/1994 | Grube et al. |
| 5,392,355 A | 2/1995 | Khurana et al. |
| 5,394,560 A | 2/1995 | Kane |
| 5,488,649 A | 1/1996 | Schellinger |
| 5,526,404 A | 6/1996 | Wiedeman et al. |
| 5,533,023 A | 7/1996 | Ohlson et al. |
| 5,555,257 A | 9/1996 | Dent |
| 5,586,165 A | 12/1996 | Wiedeman |
| 5,590,395 A | 12/1996 | Diekelman |
| 5,592,470 A | 1/1997 | Rudrapatna et al. |
| 5,594,740 A | 1/1997 | Ladue |
| 5,594,780 A | 1/1997 | Wiedeman et al. |
| 5,659,878 A | 8/1997 | Uchida et al. |

OTHER PUBLICATIONS

"North American Mobile Satellite System Signaling Architecture", by L. White et al., American Institute of Aeronautics and Astronautics, Inc., pp. 427–439.

(List continued on next page.)

*Primary Examiner*—Thanh Cong Le
(74) *Attorney, Agent, or Firm*—Irah H. Donner; Hale and Dorr LLP

(57) ABSTRACT

In a mobile communication system, a system for providing communication between multiple users in a closed user group arrangement includes, for example, first and second mobile earth terminals (METS) registering with the mobile system. The first MET selects a closed user group network identifier (NET ID) representing a NET group to establish voice communication therewith and transmits the NET ID to a controller. The controller receives the NET ID from the first MET, validates the first MET for communication, validates the NET ID, allocates a frequency for the NET group, and broadcasts the message to the NET group informing the NET group of the allocated frequency. The second MET tunes to the frequency in response to the message broadcast by the central controller. The closed user group arrangement provides security measures to ensure only authorized METs gain access to the NET group, dual standby mode of operation, and/or priority default operation.

32 Claims, 51 Drawing Sheets

OTHER PUBLICATIONS

"The AMSC/TMI Mobile Satellite Services (MSS) System Ground Segment Architecture", by J. Lunsford et al., American Institute of Aeronautics and Astronautics, Inc., pp. 405–426.

"Call Control in the AMSC Mobile Satellite Service System", by W.R.H. Tisdale et al., Pre–Publication Review Copy, American Institute of Aeronautics and Astronautics, Mar. 1, 1994, pp. 1–13.

"Westinghouse MSAT Mobile Terminal Channel Emulator", by A. Fasulo et al., American Institute of Aeronautics and Astronautics, pp. 256–260.

"MSAT Network Communications Controller and Network Operations Center", by T. Harvey et al., American Institute of Aeronautics and Astronautics, pp. 270–279.

"MSAT and Cellular Hybrid Networking", by P.W. Baranowsky II, Westinghouse Electric Corporation.

"Fedderlink Earth Station to Provide Mobile Satellite Services in North America", Robert H. McCauley et al., American Institute of Aeronautics and Astronautics, Jan./Feb. 1994, pp. 1–9.

"Radio Transmission in the American Mobile Satellite System", Charles Kittiver, American Institute of Aeronautics and Astronautics, Inc., pp. 280–294.

"Summary of the AMSC Mobile Telephone System", Gary A. Johanson et al., American Institute of Aeronautics and Astronautics, Inc., pp. 1–11.

"Implementation of a System to Provide Mobile Satellite Services in North America", Gary A. Johanson et al., presented at International Mobile Satellite Conference '93, Jun. 16–18, 1993.

"The American Mobile Satellite Corporation Space Segment", David J. Whalen et al., pp. 394–404.

"Mobile Earth Terminals In the AMSC Mobile Satellite Service System", Kok–Song Fong et al., American institute of Aeronautics and Astronatuics, (1994), pp. 1–11.

| PARAMETER | REQUIREMENT |
|---|---|
| L-BAND AEIRP | 56.6 dBW AT NOISE POWER RATIO OF 18 dB |
| Ku-BAND AEIRP | 36.7 dBW |
| L-BAND RECEIVE G/T | +2.7 dB/°K |
| Ku-BAND RECEIVE G/T | -3.6 dB/°K |
| L-BAND FREQUENCIES | 1530 TO 1559 MHz (TRANSMIT)<br>1631.5 TO 1660.5 MHz (RECEIVE) |
| Ku-BAND FREQUENCIES | 10,750 - 10,950 MHz (CENTRAL SATELLITE TRANSMIT)<br>13,000 - 13,150 MHz &<br>13,200 - 13,250 MHz (CENTRAL SATELLITE RECEIVE)<br>11,700 - 11,900 MHz (WING SATELLITE TRANSMIT)<br>14,000 - 14,200 MHz (WING SATELLITE RECEIVE) |

FIG. 2

EXAMPLE:
- AN ORGANIZATION SUBSCRIBES TO NET RADIO
- THEY HAVE 3,300 METs AND 125 DIFFERENT COMMUNICATION NETS
- THEY HAVE 4 BASE FESs ACROSS CANADA
- A VIRTUAL NETWORK IS ASSIGNED TO THE ORGANIZATION

VIRTUAL NETWORK DATABASE
MET FILES
 MET 1 {DN, TN, ETC.}
 MET 2 {DN, TN, ETC.}
 TO
 MET 3300 {DN, TN, ETC.}
(DN=DIRECTORY NUMBER)
NET ID FILES
 NET ID 1 {#, HANGTIME, ETC.}
 NET ID 2 {#, HANGTIME, ETC.}
 TO
 NET ID 125 {#, HANGTIME, ETC}

| FEATURE | DESCRIPTION |
|---|---|
| NET RADIO SERVICE | THIS FEATURE SHALL PROVIDE A NET RADIO CHANNEL CONFIGURATION FOR THE PURPOSE OF GROUP/SUB-GROUP COMMUNICATIONS. |
| PRIVATE MODE SERVICE | THIS FEATURE SHALL PROVIDE A NET RADIO CHANNEL CONFIGURATION FOR THE PURPOSE OF PRIVATE COMMUNICATIONS BETWEEN TWO CUG MEMBERS. |
| PRIORITY 1 SERVICE | THIS FEATURE SHALL PERMIT A MOBILE USER IN AN EMERGENCY SITUATION TO INTERRUPT A NET RADIO CALL IN PROGRESS. |
| BROADCAST SERVICE | THIS FEATURE SHALL PROVIDE A BROADCAST CHANNEL CONFIGURATION. |

FIG. 20

| MESSAGE CATEGORY | MSG. NO. HEX | MESSAGE |
|---|---|---|
| NETWORK MANAGEMENT | 41 | NET ID DOWNLOAD |
| | 42 | NET ID ATTRIBUTE |
| CALL CONTROL | 51 | NET RADIO CHANNEL ASSIGNMENT |

FIG. 21

| 8 | 7 | 6 | 5 | 4 | 3 | 2 | 1 | |
|---|---|---|---|---|---|---|---|---|
| 1 | \multicolumn{7}{c|}{MESSAGE TYPE =} | 1 |
| \multicolumn{8}{|c|}{MGSP HEADER} | 2 |
| \multicolumn{8}{|c|}{} | 3 |
| \multicolumn{8}{|c|}{FTIN} | 4 |
| \multicolumn{8}{|c|}{} | 5 |
| \multicolumn{8}{|c|}{} | 6 |
| \multicolumn{8}{|c|}{NET ID} | 7 |
| \multicolumn{8}{|c|}{} | 8 |
| \multicolumn{8}{|c|}{ENCRYPTED NET RADIO ACCESS SECURITY KEY} | 9 |
| \multicolumn{8}{|c|}{} | 10 |
| \multicolumn{8}{|c|}{CRC} | 11 |
| \multicolumn{8}{|c|}{} | 12 |

FIG 22

| PARAMETER | SIZE BITS | FUNCTION |
|---|---|---|
| MGSP HEADER | 8 | HEADER FOR MGSP PROTOCOL |
| FTIN | 24 | FORWARD TERMINAL IDENTIFICATION NUMBER |
| NET ID | 24 | NET RADIO IDENTIFICATION NUMBER |
| ENCRYPTED NET RADIO ACCESS SECURITY KEY (NRASK) | 16 | THIS IS THE NET ID ASK ENCRYPTED USING THE MET's ASK. |

FIG 23

| 8 | 7 | 6 | 5 | 4 | 3 | 2 | 1 | |
|---|---|---|---|---|---|---|---|---|
| 1 | \multicolumn{7}{c|}{MESSAGE TYPE =} | 1 |
| \multicolumn{8}{|c|}{MGSP HEADER} | 2 |
| \multicolumn{8}{|c|}{FTIN} | 3 |
| | | | | | | | | 4 |
| | | | | | | | | 5 |
| \multicolumn{8}{|c|}{OPERATOR} | 6 |
| \multicolumn{3}{|c|}{MON-CODE} | \multicolumn{5}{c|}{NET ID TAG} | 7 |
| \multicolumn{8}{|c|}{RECORD FIELD} | 8 |
| | | | | | | | | 9 |
| | | | | | | | | 10 |
| \multicolumn{8}{|c|}{CRC} | 11 |
| | | | | | | | | 12 |

FIG 24

| PARAMETER | SIZE BITS | FUNCTION |
| --- | --- | --- |
| MGSP HEADER | 8 | HEADER FOR MGSP PROTOCOL |
| FTIN | 24 | FORWARD TERMINAL IDENTIFICATION NUMBER |
| OPERATOR | 8 | THIS PARAMETER INDICATES THE OPERATION TO BE PERFORMED.<br>'01' = DE-ALLOCATE THE NET ID GIVEN IN THE RECORD FIELD.<br>'02' = ASSOCIATE THE NET ID GIVEN IN THE RECORD FIELD TO THE SELECTOR POSITION OR MEMORY LOCATION GIVEN BY THE TAG PARAMETER AND ASSIGN THE NET ID THE MONITOR-CODE.<br>'03' = CHANGE THE MET DN TO THE DN GIVEN IN THE RECORD FIELD |
| NET ID TAG | 6 | THIS PARAMETER IS USER DEFINED AND PERMITS A SUBSCRIBER TO TAG A NET ID TO A MEMORY LOCATION OR SELECTOR POSITION AT THE MET.<br>TAG = '00 HEX' FOR THE PRIVATE MODE SERVICE NET ID.<br>TAG = '3F HEX' WHEN NOT USED. |
| MON-CODE | 2 | THIS PARAMETER IS USER DEFINED AND DETERMINES THE ACTION TAKEN BY THE MET WHEN A CHANNEL ASSIGNMENT FOR THE GIVEN NET ID IS RECEIVED WHILE MONITORING THE GC-S CHANNEL.<br>'00' = THE MET SHALL RESPOND TO A CHANNEL ASSIGNMENT FOR THE NET ID ONLY WHEN THE NET ID IS SELECTED BY THE OPERATOR.<br>'01' = THE MET SHALL RESPOND TO A CHANNEL ASSIGNMENT FOR THE NET ID EVEN IF NOT SELECTED BY THE OPERATOR, BUT PROVIDING THE OPERATOR HAS NOT "LOCKED-ON" TO A DIFFERENT NET ID.<br>'11' = THE MET SHALL ALWAYS RESPOND TO A CHANNEL ASSIGNMENT FOR THE NET ID. |
| RECORD FIELD | 24 | THE RECORD FIELD SHALL CONTAIN A 3 BYTE NET ID OR A MET DN REPRESENTED BY 4 HEXIDECIMAL DIGITS AS REQUIRED FOR THE OPERATION. WHEN TRANSMITTED, THE DN SHALL BE CONTAINED IN BYTES 8 AND 9 OF THE SIGNALING UNIT. |

FIG 25

| 8 | 7 | 6 | 5 | 4 | 3 | 2 | 1 | |
|---|---|---|---|---|---|---|---|---|
| 0 | MESSAGE TYPE = | | | | | | | 1 |
| NET ID OR FTIN | | | | | | | | 2 |
| | | | | | | | | 3 |
| | | | | | | | | 4 |
| TRANSMIT FREQUENCY | | | | | | | | 5 |
| | | | | | | | | 6 |
| RECEIVE FREQUENCY | | | | | | | | 7 |
| | | | | | | | | 8 |
| CALL TYPE | | | | | | | | 9 |
| SPARE | | | | | | | | 10 |
| CRC | | | | | | | | 11 |
| | | | | | | | | 12 |

FIG 26

| PARAMETER | SIZE BITS | FUNCTION |
|---|---|---|
| NET ID OR FTIN | 24 | NET RADIO IDENTIFICATION NUMBER FOR NET RADIO SERVICE. FTIN OF THE ADDRESSED MET FOR PRIVATE MODE SERVICE. |
| TRANSMIT FREQUENCY | 16 | TRANSMIT CHANNEL FREQUENCY |
| RECEIVE FREQUENCY | 16 | RECEIVE CHANNEL FREQUENCY |
| CALL TYPE | 8 | '01 HEX' = NET RADIO SERVICE<br>'02 HEX' = PRIVATE MODE SERVICE<br>'03 HEX' = BROADCAST SERVICE |

FIG 27

| MESSAGE CATEGORY | MSG. NO. HEX | MESSAGE |
|---|---|---|
| NETWORK MANAGEMENT | 41 | MET MANAGEMENT ACKNOWLEDGE |
| CALL CONTROL | 51 | NET RADIO ACCESS REQUEST |

FIG. 28

| 8 | 7 | 6 | 5 | 4 | 3 | 2 | 1 | |
|---|---|---|---|---|---|---|---|---|
| 1 | \multicolumn{7}{c|}{MESSAGE TYPE =} | 1 |
| \multicolumn{8}{|c|}{MGSP HEADER} | 2 |
| \multicolumn{8}{|c|}{RTIN} | 3 |
| | | | | | | | | 4 |
| | | | | | | | | 5 |
| \multicolumn{8}{|c|}{SPARE} | 6 |
| | | | | | | | | 7 |
| | | | | | | | | 8 |
| | | | | | | | | 9 |
| | | | | | | | | 10 |
| \multicolumn{8}{|c|}{CRC} | 11 |
| | | | | | | | | 12 |

FIG. 29

| PARAMETER | SIZE BITS | FUNCTION |
|---|---|---|
| MGSP HEADER | 8 | HEADER FOR MGSP PROTOCOL |
| RTIN | 24 | REVERSE TERMINAL IDENTIFICATION NUMBER |

FIG. 30

| 8 | 7 | 6 | 5 | 4 | 3 | 2 | 1 | |
|---|---|---|---|---|---|---|---|---|
| 1 | \multicolumn{7}{l|}{MESSAGE TYPE =} | 1 |
| \multicolumn{8}{|c|}{MGSP HEADER} | 2 |
| \multicolumn{8}{|c|}{RTIN} | 3 |
| | | | | | | | | 4 |
| | | | | | | | | 5 |
| \multicolumn{8}{|c|}{NET ID} | 6 |
| | | | | | | | | 7 |
| | | | | | | | | 8 |
| \multicolumn{4}{|c|}{MET DN (DIGIT 2)} | \multicolumn{4}{c|}{MET DN (DIGIT 1)} | 9 |
| \multicolumn{4}{|c|}{MET DN (DIGIT 4)} | \multicolumn{4}{c|}{MET DN (DIGIT 3)} | 10 |
| \multicolumn{8}{|c|}{CRC} | 11 |
| | | | | | | | | 12 |

FIG. 31

| PARAMETER | SIZE BITS | FUNCTION |
|---|---|---|
| MGSP HEADER | 8 | HEADER FOR MGSP PROTOCOL |
| RTIN | 24 | REVERSE TERMINAL IDENTIFICATION NUMBER |
| NET ID | 24 | NET RADIO INDENTIFICATION NUMBER |
| MET DN (DIGIT n) | 4 | DIGIT n = 'F HEX' FOR NET RADIO SERVICE<br><br>DIGIT n = HEXIDECIMAL REPRESENTATION OF THE nth DIGIT OF THE CALLED MET DIRECTORY NUMBER FOR PRIVATE MODE SERVICE<br><br>DIGITS 1 TO 4 = 'E911 HEX' FOR PRIORITY 1 SERVICE. |

FIG. 32

| MESSAGE CATEGORY | MSG. NO. HEX | MESSAGE |
|---|---|---|
| CALL CONTROL | 41 | NET RADIO |
| | 42 | NET RADIO CALL RELEASE |
| | 43 | COMMAND (RESERVED FOR FUTURE REQUIREMENTS) |

FIG. 33

| PARAMETER | SIZE BITS | FUNCTION |
|---|---|---|
| NET ID | 24 | IDENTIFIES THE NET INDENTIFICATION FOR THE NETRADIO CALL. |
| MET DN (DIGIT n) | 4 | IDENTIFIES THE MET'S DN. |
| REQUEST TYPE | 8 | IDENTIFIES THE TYPE OF REQUEST WHERE:<br>'00 HEX' IS A PTT REQUEST<br>'01 HEX' IS A PTT RELEASE<br>'10 HEX' IS A PRIORITY 1 PTT REQUEST |

FIG. 34

| TIMER | DESCRIPTION | TIMING REQUIREMENTS |
|---|---|---|
| $T_M 20$ | LOST FES-C CHANNEL TIMEOUT | EQUAL TO $T_M 6$ |
| $T_M 21$ | LOST SPEAKER STATUS TIMEOUT | 3 SECONDS |
| $T_M 22$ | TRANSMITTER INHIBIT TIMEOUT | 1 FES-C CHANNEL SUPERFRAME (ABOUT 1/2 SECOND) |
| $T_M 23$ | CONTENTION WINDOW TIMEOUT | 1 SECOND |
| $T_M 24$ | ACCESS REQUEST TIMEOUT | 2 SECONDS |

FIG. 35

| MONITOR CODE | FUNCTION |
|---|---|
| 00 | THE MET SHALL RESPOND TO NET IDs WITH THIS MONITOR CODE ONLY WHEN THE OPERATOR HAS SELECTED THIS NET ID. |
| 01 | THE MET SHALL RESPOND TO NET IDs WITH THIS MONITOR CODE PROVIDED THE OPERATOR HAS NOT "LOCKED ON" TO ANOTHER NET ID. |
| 11 | THE MET SHALL ALWAYS RESPOND TO NET IDs WITH THIS MONITOR CODE. |

FIG. 36

KEY

FLOW ON ALL VERTICAL SEGMENTS GOES FROM TOP TO BOTTOM ONLY.

— BOLD LINES REPRESENT THE NORMAL CALL SETUP PATH.

— OTHER PATHS ARE REPRESENTED BY LIGHTER LINES.

① CIRCLED NUMBERS REPRESENT THE STARTING POINT OR THE DESTINATION POINT OF A GO TO.

△D LETTERS IN TRIANGLES REPRESENT CONTINUATION POINTS BETWEEN PAGES.

*GC-FES CHANNEL ASSIGNMENT* ALL SIGNALING UNITS ARE DEPICTED IN ITALICS.

*GC-MET\* CHANNEL ASSIGNMENT* UNACKNOWLEDGED MGSP MESSAGES ARE DENOTED BY ONE \*.

⊠ THIS SYMBOL, WHEN REACHED IN A PARTICULAR EPOCH, INDICATES THAT THE PROCESS HAS ENDED FOR THAT PARTICULAR ENTITY.

FIG. 39

MODE OF FES-C CHANNEL DURING CALL RELEASE

| PARAMETER | BITS | FUNCTION |
|---|---|---|
| PAGE NUMBER | 3 | PAGE NUMBER ASSOCIATED WITH THIS SU. |
| UPDATE NUMBER | 5 | INCREMENTED WHENEVER CONTENTS OF THIS PAGE ARE CHANGED |
| SU NUMBER | 8 | SEQUENCE NUMBER OF THIS SU IN THE PAGE. |
| RETRANSMISSION TIMEOUT | 8 | TIMEOUT VALUE FOR RETRANSMISSION MET-SR CHANNEL. SPECIFIED IN 100 ms INCREMENTS. NOMINALLY [10] |
| MAXIMUM RETRANSMISSIONS | 3 | MAXIMUM NUMBER OF RETRANSMISSIONS ALLOWED PER MESSAGE (0, 1, .. 7). NOMINALLY [4]. |
| RANDOMIZING INTERVAL | 5 | RANDOMIZATION INTERVAL USED FOR RETRANSMISSION. SPECIFIED IN 100 ms INCREMENTS. THIS INTERVAL IS DOUBLED FOR EVERY SUBSEQUENT RETRANSMISSION OF A SU. NOMINALLY [5]. |
| NUMBER OF REPEATS | 3 | NUMBER OF TIMES AN SU (COMMAND, RESPONSE) IS REPEATED TO IMPROVE CHANNEL ERROR PERFORMANCE. 0, 1, ... |
| RESPOND TO REPEAT COMMANDS | 1 | MET MUST RESPOND TO EACH REPEATED COMMAND SU. |
| REPEAT INTERVAL | 4 | INTERVAL BETWEEN REPEATS IN 100 MILLISECOND INCREMENTS. |
| CLIENT REF TIMEOUT | 4 | MGSP CLIENT REFERENCE TIMER VALUE IN SECONDS. |
| SERVER REF TIMEOUT | 4 | MGSP SERVER REFERENCE TIMER VALUE IN SECONDS. |
| ACCESS SECURITY FILL BITS | 24 | FILL BITS USED TO EXTEND THE PLAIN TEXT INPUT TO THE ACCESS SECURITY CHECK FIELD GENERATION PROCESS |

FIG. 51

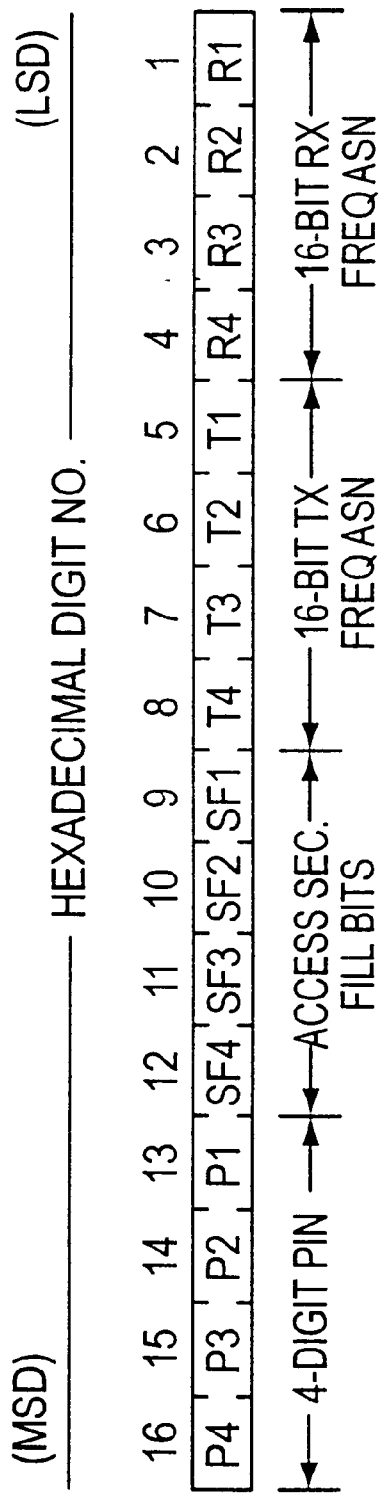

FIG. 54

LEGEND: SFn = nth 4-BIT SEGMENT OF (LOWEST ORDER FOUR) ACCESS SECURITY FILL BITS, REPRESENTED AS HEXADECIMAL CHARACTER, n = 1-4
Tn = nth 4-BIT SEGMENT OF TRANSMIT FREQUENCY ASSIGNMENT, REPRESENTED AS HEXADECIMAL CHARACTER, n = 1-4
Rn = nth 4-BIT SEGMENT OF RECEIVE FREQUENCY ASSIGNMENT, REPRESENTED AS HEXADECIMAL CHARACTER, n = 1-4
Pn = nth 4-BIT SEGMENT OF PIN CODE, REPRESENTED AS HEXADECIMAL CHARACTER, n = 1-8

GLOSSARY

| | |
|---|---|
| APCO | ASSOCIATED PUBLIC SAFETY COMMUNICATIONS OFFICERS, INC. |
| ASK | ACCESS SECURITY KEY |
| CRC | |
| CUG | CLOSED USER GROUP |
| DN | DIRECTORY NUMBER |
| FES | FEEDERLINK EARTH STATION |
| FTIN | FORWARD TERMINAL IDENTIFICATION NUMBER |
| LLS | LOWER LEVEL SPECIFICATION |
| MET | MOBILE EARTH TERMINAL |
| MGSP | MET-GC SIGNALING PROTOCOL |
| MMA | MET MANAGEMENT ACKNOWLEDGEMENT |
| MRS | MOBILE RADIO SERVICE |
| MTS | |
| NA | NET ID ATTRIBUTE |
| NCC | NETWORK CONTROL CENTER |
| NID | NET ID DOWNLOAD |
| NRACR | NET RADIO ACCESS REQUEST |
| NRCHA | NET RADIO CHANNEL ASSIGNMENT |
| NRCR | NET RADIO CALL RELEASE |
| PTT | PUSH-TO-TALK |
| SU | SIGNALING UNIT |
| TLS | TOP LEVEL SPECIFICATION |
| TMI | TELESAT MOBILE INC. |

FIG. 55

SATELLITE TRUNKED RADIO SERVICE SYSTEM

RELATED APPLICATIONS

This application is a Continuation-in-Part of U.S. patent application Ser. No. 09/887,691 filed on Aug. 29, 1997 entitled "Satellite Trunked Radio Service System", which is a file wrapper continuation application of, and which claims priority from, U.S. patent application Ser. No. 08/718,133 filed on Sep. 18, 1996 entitled "Satellite Trunked Radio Service System," now abandoned, and U.S. patent application Ser. No. 08/657,479 filed on May 29, 1996 entitled "Satellite Trunked Radio Service System," now U.S. Pat. No. 5,717,830, which claims priority from provisional application serial No. 60/003,989 filed on Sep. 19, 1995 entitled "Satellite Trunked Radio Service System," and U.S. provisional application serial No. 60/014,205 filed on Mar. 27, 1996 entitled "Improved Satellite Trunked Radio Service System,"all incorporated herein by reference.

TECHNICAL FIELD

The present invention relates generally to a satellite trunked radio service system for satellite communication, and more particularly, to a satellite trunked radio service system for satellite communication utilizing a shared satellite demand circuit associated with voice networks.

BACKGROUND ART

Wireless technology is not new. The age of electronic communication began with the invention of a practical telegraph in 1844, over 150 years ago. It has been said that the telegraph was a major factor in the explosive development of the Western United States in the mid-1800's.

In 1983, the FCC issued licenses to provide mobile communications in a new frequency hand using a technique called cellular transmission which had been developed by both AT&T and Motorola. The proponents invested over $400 million in the new business before the FCC licensed cellular service. Many people thought that consumers needed mobile communications as much as they needed a second Jaguar automobile. Much to the surprise of everyone the growth rate was phenomenal. An enormous mass market developed for this service.

There are over 500 million users of wireline communications in the world today. By the early part of the next century, wireline will continue to grow, and wireless will be a major factor in telecommunications. According to the U.S. Commerce Department, there are at least 52 million cellular subscribers in the world (23 million in the U.S.). Within five years, experts estimate that there may be 150 million (50 million U.S.) and by 2005 we expect the worldwide total will be 260 million (65 million U.S.).

Cellular service is available in most urban regions, excluding, large, less developed areas. Service is not provided beyond the range of cells at which distances the signals are too weak. Cells typically do not exceed 10 miles in diameter, although super large cells have been created in the Caribbean. The new PCS service, which operates at much higher frequencies, requires even smaller cells, three times as many cells must be built as are required for cellular service. In regions where population density is low, the cost of building and operating transmission facilities may exceed the potential revenues. Wireless is sometimes blocked by terrain even in highly populated regions because the transmission signal arrives at low elevation angles.

Surveys show that customers currently are unhappy with unavailability and call blockage. Because of the low elevation angle transmission, service is sometimes interrupted during transmission or handover from cell to cell. During the peak busy hours, circuits are often blocked by other callers. Subscribers would like to enjoy wireless service all of the time, wherever they are.

Another major problem is that wireless transmission standards differ throughout the world. International travelers ar required to use different telephones when they travel to other regions. Even within the U.S. the new digital cellular service will be based on both time division multiple access (TDMA) and code division multiple access (CDMA) technology. Current plans suggest that digital cellular customers who roam up the East Coast will travel alternatively between systems that use different access methods.

Most of the world's telephone service is concentrated in the industrialized world. The 800 million people in industrialized countries have access to 400 million telephone lines, but 5 billion people in developing countries have access to only 200 million telephone lines. In Asia, more than 3 billion people have only 75 million telephone lines, and in Africa, with 500 million people, there is only one telephone per 1000 population.

The cost of closing the gap in developing countries has been estimated to be $3 trillion. Space based services are a faster and less costly solution. Large regions that are not served today could be economically served in the future with satellites. New systems hold the potential for extending service into regions that have been inaccessible or uneconomical to serve because of low population density or weak economic conditions.

Even in affluent, densely populated countries like Japan nd Germany, mountainous conditions prevent full coverage. Japanese cellular service operators expect that half of the land area will not be covered by terrestrial wireless. We are on the threshold of being able to provide universal, affordable wireless service throughout the world.

Wireless service is more expensive than wireline service, especially in urban regions. From a service provider perspective, the cost is higher because the call routing, call maintenance and billing is more complex. From a subscriber perspective, wireless telephone service adds great value. Wireless telephones allow mobile workers to talk while traveling. Mobile calls provide greater flexibility and permit communications in situations in which they were previously impossible.

Today, cellular systems offer service with a wide range of tariffs. typically, the systems charge a monthly service fee of about $30 plus an additional charge based on airtime. For local services, the airtime rates vary between $0.10 to $0.90 per minute, depending on the region of the country or the world. Often, service providers offer cellular telephones at a discount but require a one year service contract, payment for the telephone equipment being embedded within the service price structure.

Currently, satellite service is available worldwide as an alternative to cellular service, but the terminal cost and service rates are very high. Inmarsat signatories offer service for airtime rates ranging from $5 to $15 per minute. "Portable" terminals that cost at least $15,000 and have a mass of 10 kilograms (22 pounds) can be lugged on trips. Terrestrial cellular has 1000 times more customers at service rates which are a factor of ten lower than present space based systems. The prices are very elastic.

Manufacturers of handsets and satellite systems recognized that cellular type communications from space could be much less expensive in the future than it is today. Several companies have determined that space based wireless service can be provided at service rates which are affordable by a mass market.

The primary consideration for business success is having a cost effective product which customers desire. This means balancing the service charges to own a personal telephone as well as the air time rates with the needs of the subscriber. Cost must also be kept affordable and economical compared to alternatives. However, each system must strike a balance between low cost and high quality. As a business, the service and distribution functions must provide an outlet to the ultimate customer, the consumer.

In the mid 1960's we had correctly determined that the best orbit for fixed satellite service was a geostationary orbit. This choice was logical because a stationary orbit permitted satellites to appear fixed in the sky. Large, high gain ground terminals could be positioned to ensure that the transmission path always would be clear. Although large, the antennas had no need to track, since the satellites appeared motionless to it. Only three or four satellites were needed to view most of the globe (excepting the polar regions). Unfortunately, the distance to Geostationary Earth Orbit (GEO) is great (about 23,000 miles) and the propagation time delay produces overtalking and confusion.

During the 1980's, conditions developed for a major change in the satellite communications paradigm: Orbiting satellites closer to the Earth would permit more powerful transmission with reasonable sized satellites and antennas. In addition, inclined orbits could ensure high elevation angles to minimize blockage by buildings, and other obstacles. The microelectronics for a ground station had become so compact that an affordable, light, hand held terminal could be built for satellite service. The lower power, application specific integrated circuit (ASIC) was built with GaAs, High density Bipolar Transistors (HBT) and high electron mobility power transistors (HEMPT's).

A conceptual overview of the satellite network system is illustrated conceptually in FIG. 1. The satellite network system design provides the capability for METs and FESs to access one or more multiple beam satellites located in geostationary orbit to obtain communications services.

The heart of the satellite network system for each of the networks is the Network Control System (NCS) which monitors and controls each of the networks. The principal function of the NCS is to manage the overall satellite network system, to manage access to the satellite network system, to assign satellite circuits to meet the requirements of mobile customers and to provide network management and network administrative and call accounting functions.

The satellites each transmit and receive signals to and from METs at L-band frequencies and to and from Network Communications Controllers (NCCs) and Feederlink Earth Stations (FESs) at Ku-band frequencies. Communications at L-band frequencies is via a number of satellite beams which together cover the service area. The satellite beams are sufficiently strong to permit voice and data communications using inexpensive mobile terminals and will provide for frequency reuse of the L-band spectrum through inter-beam isolation. A single beam generally covers the service area.

The satellite network system provides the capability for mobile earth terminals to access one or more multiple beam satellites located in geostationary orbit for the purposes of providing mobile communications services. The satellite network system is desired to provide the following general categories of service:

Mobile Telephone Service (MTS). This service provides point-to-point circuit switched voice connections between mobile and public switched telephone network (PSTN) subscriber stations. It is possible for calls to be originated by either the mobile terminal or terrestrial user. Mobile terminal-to-mobile terminal calls are also supported.

Mobile Radio Service (MRS). This service provides point-to-point circuit switched connections between mobile terminal subscriber stations and subscriber stations in a private network (PN) which is not a part of the PSTN. It is possible for calls to be originated from either end. Mobile terminal-to-mobile terminal calls are also supported.

Mobile Telephone Cellular Roaming Service (MTCRS). This service provides Mobile Telephone Service to mobile subscribers who are also equipped with cellular radio telephones. When the mobile terminal is within range of the cellular system, calls are serviced by the cellular system. When the mobile terminal is not in range of the cellular system, the MTCRS is selected to handle the call and appears to the user to be a part of the cellular system. When the mobile terminal is not in range of the cellular system, the MTCRS is selected to handle the call and appears to the user to be a part of the cellular system. It is possible for calls to be originated either from the MET or the PSTN. Mobile terminal-to-mobile terminal calls are also supported.

Mobile Data Service (MDS). This service provides a packet switched connection between a data terminal equipment (DTE) device at a mobile terminal and a data communications equipment (DCE)/DTE device connected to a public switched packet network. Integrated voice/data operation is also supported.

The satellites are designed to transmit signals at L-band frequencies in the frequency band 1530–1559 MHz. They will receive L-band frequencies in the frequency band 1631.5–1660.5 MHz. Polarization is right hand circular in both bands. The satellites will also transmit in the Ku frequency band, 10,750 MHz to 10,950 MHz, and receive Ku-band signals in the frequency band 13,000 to 13,250 MHz.

The satellite transponders are designed to translate communications signals accessing the satellite at Ku-band frequencies to an L-band frequency in a given beam and vice versa. The translation will be such that there is a one-to-one relation between frequency spectrum at Ku-band and frequency spectrum in any beam at L-band. The satellite transponders will be capable of supporting L-band communications in any portion of the 29 MHz allocation in any beam.

Transponder capacity is also provided for Ku-band uplink to Ku-band down-link for signalling and network management purposes between FESs and NCCs. The aggregate effective isotropic radiated power (AEIRP) is defined as that satellite e.i.r.p. that would result if the total available communications power of the communications subsystem was applied to the beam that covers that part of the service area. Some of the key performance parameters of the satellite are listed in FIG. 2.

The satellite network system interfaces to a number of entities which are required to access it for various purposes. FIG. 3 is a context diagram of the satellite network system conceptually illustrating these entities and their respective interfaces. Three major classes of entities are defined as user of communications services, external organizations requiring coordination, and network management system.

The users of satellite network communications services are MET users who access the satellite network system either via terrestrial networks (PSTN, PSDN, or Private Networks) or via METs for the purpose of using the services provided by the system. FES Owner/Operators are those organizations which own and control FESs that provide a terrestrial interface to the satellite network. When an FES becomes a part of the satellite network, it must meet specified technical performance criteria and interact with and accept real-time control from the NCCs. FES Owner/Operators determine the customized services that are offered and are ultimately responsible for the operation and maintenance of the FES. Customers and service providers interact with the Customer Management Information System within the Network Management System.

The satellite network system interfaces to, and performs transactions with, the external organizations described below:

Satellite Operations Center (SOC)

The SOC is not included in the satellite network ground segment design. However, the satellite network system interfaces with the SOC in order to maintain cognizance of the availability of satellite resources (e.g. in the event of satellite health problems, eclipse operations, etc.) and, from time to time, to arrange for any necessary satellite reconfiguration to meet changes in traffic requirements.

NOC

The satellite network system interfaces with the satellites located therein via the NOC for a variety of operational reasons including message delivery and coordination.

Independent NOCs

The satellite network system interfaces with outside organizations which lease resources on satellite network satellites and which are responsible for managing and allocating these resources in a manner suited to their own needs.

Other System NOCs

This external entity represents outside organizations which do not lease resources on satellite network satellites but with whom operational coordination is required.

The satellite network management system (NMS) is normally located at an administration's headquarters and may comprise three major functional entities; Customer Management Information System (CMIS), Network Engineering, and System Engineering (NE/SE). These entities perform functions necessary for the management and maintenance of the satellite network system which are closely tied to the way the administration intends to do business. The basic functions which are performed by CMIS, Network Engineering, and System Engineering are as follows:

Customer Management Information System

This entity provides customers and service providers with assistance and information including problem resolution, service changes, and billing/usage data. Customers include individual MET owners and fleet managers of larger corporate customers. Service providers are the retailers and maintenance organizations which interact face to face with individual and corporate customers.

Network Engineering

This entity develops plans and performs analysis in support of the system. Network Engineering analyzes the requirements of the network. It reconciles expected traffic loads with the capability and availability of space and ground resources to produce frequency plans for the different beams within the system. In addition, Network Engineering defines contingency plans for failure situations.

System Engineering

This entity engineers the subsystems, equipment and software which is needed to expand capacity to meet increases in traffic demands and to provide new features and services which become marketable to subscribers.

The satellite network system comprises a number of system elements and their interconnecting communications links as illustrated conceptually in FIG. 4. The system elements are the NOC, the NCC, the FES, the MET, the Remote Monitor Station (RMS), and the System Test Station (STS). The interconnecting communications links are the satellite network Internetwork, terrestrial links, the MET signaling channels, the Interstation signaling channels, and the MET-FES communications channels. The major functions of each of the system elements are as follows:

NOC

The NOC manages and controls the resources of the satellite network system and carries out the administrative functions associated with the management of the total satellite network system. The NOC communicates with the various internal and external entities via a local area network (LAN)/wide area network (WAN) based satellite network Internetwork and dial-up lines.

NCC

The NCC manages the real time allocation of circuits between METs and FESs for the purposes of supporting communications. The available circuits are held in circuit pools managed by Group Controllers (GCs) within the NCC. The NCC communicates with the NOC via the satellite network Internetwork, with FESs via Ku-to-Ku band interstation signaling channels or terrestrial links, and with mobile terminals via Ku-to-L band signaling channels.

FES

The FES supports communications links between METs, the PSTN, private networks, and other MTs. Once a channel is established with an MET, call completion and service feature management is accomplished via In-Band signaling over the communication channel. Two types of FESs have been defined for the satellite network system; Gateway FESs and Base FESs. Gateway FESs provide MTS, MRS, MTCRS and NR services. Base FESs are for like services and/or value added services.

MET

The MET provides the mobile user access to the communications channels and services provided by the satellite network system. A range of terminal types has been defined for the satellite network system.

RMS

The RMS monitors L-band RF spectrum and transmission performance in specific L-band beams. An RMS is nominally located in each L-band beam. Each RMS interfaces with the NOC via either a satellite or terrestrial link.

STS

The STS provides an L-band network access capability to support FES commissioning tests and network service diagnostic tests. The STS is collocated with, and interfaced to, the NOC.

Communications channels transport voice, data and facsimile transmissions between METs and FESs via the satellite. Connectivity for MET-to-MET calls is accomplished by double hopping the communications channels via equipped FESs. Signaling channels are used to set up and tear down communications circuits, to monitor and control FES and MET operation, and to transport other necessary information between network elements for the operation of satellite network. The system provides Out-of-Band and Interstation signaling channels for establishing calls and transferring information. In-Band signaling is provided on established communications channels for supervisory and feature activation purposes. A detailed description of the satellite network signaling system architecture is provided in L. White, et al., "North American Mobile Satellite System Signaling Architecture," AIAA 14th International Communications Satellite Conference, Washington, D.C. (March 1992), incorporated herein by reference.

The satellite network Internetwork provides interconnection among the major satellite network ground system elements such as the NOCs, NCCs, and Data Hubs, as well as external entities. Various leased and dial-up lines are used for specific applications within the satellite network system such as backup interstation links between the NCC and FESs and interconnection of RMSs with the NOC.

The primary function of the NOC is to manage and control the resources of the satellite network system. FIG. 5 is a basic conceptual block diagram of the NOC and its interfaces. The NOC computer is shown with network connections, peripheral disks, fault tolerant features, and expansion capabilities to accommodate future growth. The NOC software is represented as two major layers, a functional layer and a support layer. The functional layer represents the application specific portion of the NOC software. The support layer represents software subsystems which provide a general class of services and are used by the subsystems in the functional layer.

The application specific functions performed by the NOC are organized according to five categories: fault management, accounting management, configuration management, performance management, and security management. The general NCC Terminal Equipment (NCCTE) configuration showing constituent equipment includes: processing equipment, communications equipment, mass storage equipment, man-machine interface equipment, and optional secure MET Access Security Key (ASK) storage equipment. The Processing Equipment consists of one or more digital processors that provide overall NCC control, NCS call processing, network access processing and internetwork communications processing.

The Communications Equipment consists of satellite signaling and communications channel units and FES terrestrial communication link interface units. The Mass Storage Equipment provides NCC network configuration database storage, call record spool buffering an executable program storage. The Man-Machine Interface Equipment provides operator command, display and hard copy facilities, and operator access to the computer operating systems. The MET ASK storage Equipment provides a physically secure facility for protecting and distributing MET Access Security Keys.

The NCCTE comprises three functional subsystems: NCCTE Common Equipment Subsystem, Group Controller Subsystem, and Network Access Subsystem. The NCCTE Common Equipment subsystem comprises an NCC Controller, NCCTE mass storage facilities, and the NCCTE man-machine interface. The NCC Controller consists of processing and database resources which perform functions which are common to multiple Group Controllers. These functions include satellite network Internetwork communications, central control and monitoring of the NCCTE and NCCRE, storage of the network configuration, buffering of FES and Group Controller call accounting data, transfer of transaction information to the Off-line NCC and control and monitoring of FESs.

The Mass Storage element provides NCC network configuration database storage, call accounting data spool buffering, and NCCTE executable program storage. The Man-machine Interface provides Operator command and display facilities for control and monitoring of NCC operation and includes hard copy facilities for logging events and alarms. A Group Controller (GC) is the physical NCC entity consisting of hardware and software processing resources that provides real time control according to the CG database received from the NOC.

The Group Controller Subsystem may incorporate one to four Group Controllers. Each Group Controller maintains state machines for every call in progress within the Control Group. It allocates and de-allocates circuits for FES-MET calls within each beam of the system, manages virtual network call processing, MET authentication, and provides certain elements of call accounting. When required, it provides satellite bandwidth resources to the NOC for AMS (R)S resource provisioning. The Group Controller monitors the performance of call processing and satellite circuit pool utilization. It also performs MET management, commissioning and periodic performance verification testing.

The Network Access Subsystem consists of satellite interface channel equipment for Out-of-Band signaling and Interstation Signaling which are used to respond to MET and FES requests for communications services. The Network Access Processor also includes MET communications interfaces that are used to perform MET commission testing. In addition, the subsystem includes terrestrial data link equipment for selected FES Interstation Signaling.

The principal function of the FES is to provide the required circuit switched connections between the satellite radio channels, which provide communications links to the mobile earth terminals, and either the PSTN or PN. FESs will be configured as Gateway Stations (GS) to provide MTS and MTCRS services or Base Stations to provide MRS and Net Radio services (described in detail below). Gateway and Base functions can be combined in a single station.

The FES operates under the real time control of the Network Communications Controller (NCC) to implement the call set-up and take-down procedures of the communications channels to and from the METs. Control of the FES by the NCC is provided via the interstation signaling channels. An FES will support multiple Control Groups and Virtual Networks. The FES is partitioned into two major functional blocks, the FES RF Equipment (FES-RE) and the FES Terminal Equipment (FES-TE). The principal function of the FES-RE is to provide the radio transmission functions for the FES. In the transmit direction it combines all signals from the communications and interstation signaling channel unit outputs from the FES-TE, and amplifies them and up-convert these to Ku-Band for transmission to the satellite via the antenna. In the receive direction, signals received from the satellite are down-converted from Ku-Band, amplified and distributed to the channel units within the FES-TE. Additional functions include satellite induced Doppler correction, satellite tracking and uplink power control to combat rain fades.

The principal function of the FES-TE is to perform the basic call processing functions for the FES and to connect the METs to the appropriate PSTN or PN port. Under control of the NCC, the FES assigns communications channel units to handle calls initiated by MET or PSTN subscribers. The FES-TE also performs alarm reporting, call detail record recording, and provision of operator interfaces.

For operational convenience, an FES may in some cases be collocated with the NCC. In this event, the NCC RF Equipment will be shared by the two system elements and the interstation signaling may be via a LAN. Connection to and from the PSTN is via standard North American interconnect types as negotiated with the organization providing PSTN interconnection. This will typically be a primary rate digital interconnect. Connection to and from private networks is via standard North American interconnect types as negotiated with the organization requesting satellite network service. This will typically be a primary rate digital interconnect for larger FESs or an analog interconnect for FESs equipped with only a limited number of channels may be employed.

We have discovered that there is a general need for an integrated mobile telephone that can be used to transmit to, and receive from, to communicate in a Closed User Group (CUG) arrangement that allows each member of the group to hear what any other user is saying. Each member of the group can also talk when needed. The system behaves like a radio multi-party line where several parties communicate over the same communication channel. Public services and law enforcement agencies are typical users of this service, which is normally provided by either traditional terrestrial radio networks or by the more recent trunked radio systems. These trunked systems, generally in the 800–900 MHz band, provide groups of end users with virtual private systems by assigning frequencies to CUGs on a demand basis. In this connection, however, we have discovered that an integrated mobile communication device is needed that provides this ability to communicate in a CUG of a satellite network. Further, we have discovered that if this type of satellite trunking utilizes a shared satellite demand period circuit per CUG rather than one circuit per mobile user, the cost per minute of a group conversation would be much less expensive to the owner of the group.

We have further discovered that there is the need to provide the capability for the Closed User Group arrangement to be used alternately with a private point-to-point voice communication between two parties.

We have also discovered that for Closed User Group communications, additional security procedures are required to ensure that unauthorized parties are unable to enter the group. In this connection, we have discovered that an efficient method for permitting parties access to the Closed User Group without being to cumbersome is required.

We have also discovered that the call set-up time for one shared circuit per CUG compared to a mobile radio service multi-user conference set-up time is likely to be more acceptable to a group end user/operator, who normally expects to be able to talk as soon as the handset/microphone is taken off-hook. Further, we have discovered the need for a nationwide and regional point-to-multipoint mobile communication service that is not limited in coverage.

We have also discovered that there is a need to provide a procedure for priority service for the Closed User Group arrangement under a default mode. That is, we have discovered the need to permit a MET user while communicating in a first closed user group to have the capability to efficiently transmit a priority message to a predetermined closed user group.

SUMMARY OF THE INVENTION

It is a feature and advantage of the present invention to provide an integrated mobile telephone that can be used to transmit and receive in a Closed User Group (CUG) arrangement that allows each member of the group to hear what any other user is saying.

It is another feature and advantage of the present invention to permit each member of the group to talk when needed, and to provide a system that behaves like a radio multi-party line.

It is a further feature and advantage of the present invention to provide an integrated mobile communication device that can communicate in a CUG of a satellite network.

It is a further feature and advantage of the present invention to provide additional security procedures are required to ensure that unauthorized parties are unable to enter the group for the Closed User Group.

It is another feature and advantage of the present invention to provide an inexpensive satellite trunking service to the owner of the group.

It is another feature and advantage of the present invention to minimize the call set-up time for one shared circuit per CUG.

It is another feature and advantage of the present invention to provide a procedure for priority service for the Closed User Group arrangement under a default mode.

It is another feature and advantage to provide a MET user, while communicating in a first closed user group, to have the capability to efficiently transmit a priority message to a predetermined closed user group.

It is another feature and advantage of the present invention to generally effectively and efficiently effectuate transmissions between mobile communication devices and the satellite network in a closed user group environment by utilizing an efficient communication protocol.

It is another feature and advantage of the invention to provide the capability for the Closed User Group arrangement to be used alternately with a private point-to-point voice communication between two parties.

It is another feature and advantage of the invention to provide a nationwide and regional point-to-multipoint mobile communication service that is not limited in coverage.

The present invention is based, in part, on the desirability of providing point-to-multipoint circuit switched connections between mobile terminal subscriber stations and a central base station. Mobile users are able to listen to two-way conversations and to transmit using a push-to-talk mode of operation.

To achieve these and other features and advantages of the present invention, a mobile communication system is provided in a mobile satellite system. The mobile satellite system includes a satellite communication switching office having a satellite antenna for receiving/transmitting a satellite message via a satellite from/to a vehicle using a mobile communication system, a satellite interface system, a central controller receiving/transmitting the satellite message from/ to the satellite communication switching office issued from the vehicle via the satellite and the satellite interface system. The mobile communication system includes a user interface system providing a user interface through which a user has access to services supported by the mobile satellite system, and an antenna system providing an interface between the mobile communication system and the mobile satellite system via the satellite interface system, and receiving a first satellite message from the satellite and transmitting a second satellite message to the satellite. The antenna system includes an antenna including one of a directional and an omnidirectional configuration, a diplexer, an amplifier, a low noise amplifier, a beam steering unit when the antenna is of the directional configuration, and at least one of a compass and sensor to determine vehicle orientation. The mobile communication system also includes a transceiver system, operatively connected to the antenna system, including a receiver and a transmitter. The transmitter converts the second satellite message including at least one of voice, data, fax and signaling signals into a modulated signal, and transmits the modulated signal to the antenna system. The transmitter includes an amplifier, a first converter and associated first frequency synthesizer, a modulator, an encoder, multiplexer, scrambler and frame formatter for at least one of voice, fax, and data. The receiver accepts the first satellite message from the antenna system and converts the first satellite message into at least one of voice, data, fax and signaling signals, at least one of the voice, data and fax signals routed to the user interface system. The receiver includes a second converter with an associated second frequency synthesizer, a demodulator, a decoder, demultiplexer, descrambler and frame unformatter for at least one of voice, fax, and data. The mobile communication system also includes a logic and signaling system, operatively connected to the transceiver, controlling initialization of the mobile communication system, obtaining an assigned outbound signaling channel from which updated system information and commands and messages are received. The logic and signaling system configures the transceiver for reception and transmission of at least one of voice, data, fax and signaling messages, and controls protocols between the mobile communication system and the mobile satellite system, and validating a received signalling messages and generating codes for a signaling message to be transmitted.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

In one embodiment of the invention, a system for providing satellite communication between multiple users in a closed user group arrangement includes first and second mobile earth terminals (METs) responsively connected to and registering with the mobile satellite system. The first MET selects a closed user group network identifier (NET ID) representing a NET group including the first and second METs to establish voice communication therewith and transmits the NET ID to a central controller. The central controller receives the NET ID from the first MET, validates the first MET for communication, validates the NET ID, allocates a frequency for the NET group, and broadcasts the message to the NET group including the second MET informing the NET group of the allocated frequency and the voice communication associated therewith. The second MET tunes to the frequency in response to the message broadcast by the central controller, and the central controller assigns the first MET as current speaker for the NET group.

In another embodiment of the invention, a method of providing satellite communication between multiple users in a closed user group arrangement includes the steps of first and second mobile earth terminals (METs) registering with the mobile satellite system, the first MET selecting a closed user group network identifier (NET ID) representing a NET group including the first and second METs to establish voice communication therewith. The method also includes the steps of the first MET transmitting the NET ID to the central controller, the central controller receiving the NET ID, validating the first MET for communication, validating the NET ID, allocating a frequency for the NET group, and broadcasting the message to the NET group including the second MET informing the NET group of the allocated frequency and the voice communication associated therewith. The method also includes the steps of the second MET tuning to the frequency in response to the message broadcast by the central controller, and assigning by the central controller the first MET as current speaker for the NET group.

In another embodiment of the invention, the method also includes the step of monitoring by the first and second METs whether at least one of a dispatcher message, a priority message and a release of speaker message has been issued, and if so, interrupting the current speaker with the at least one of the dispatcher message, the priority message and a new speaker. The method also includes the steps of monitoring by the central controller whether the current speaker is active, and if not, removing the current speaker and setting the current speaker to vacant, notifying by the central controller the first and second METs that the current speaker is vacant, and initiating by one of the first and second METs a request to be the new speaker. The method further includes the steps of receiving by the central controller the request from a first of the one of the first and second METs to be the new speaker, and assigning the first of the one of the first and second METs as the new speaker, and releasing the closed user group communication when no request from the one of the first and second METs is made to be the new speaker for a predetermined period of time.

In another embodiment of the invention, the method also includes the steps of a third MET included in the NET group registering with the mobile satellite system, and the central controller broadcasting the message to the NET group including the third MET informing the NET group of the allocated frequency and the voice communication associated therewith. The method also includes the steps of the third MET tuning to the frequency in response to the message broadcast by the central controller by generating a scrambling vector for access thereto. The third MET gains access to the frequency and the voice communication of the NET group using the scrambling vector.

According to the invention, the central controller advantageously controls the closed user group satellite communication including net radio parameters used by the first and second METs. The central controller also selectively downloads the NET IDs to the first and second METs according to predetermined user criteria.

The central controller advantageously collects billing information regarding the closed user group satellite communication and transmits the billing information to the mobile satellite system. The mobile satellite system optionally charges a service fee to a customer that has requested the closed user group arrangement instead of each of the individual users in the NET group thereby consolidating the billing transactions and permitting a single customer to monitor communication charges.

In another embodiment of the invention, the method includes the steps of a non-MET accessing the mobile satellite system via either a public switched telephone network or a cellular network to initiate a closed user group communication with the NET group including at least one of the first and second METs, the central controller broadcasting the message to the NET group informing the NET group of the allocated frequency and the voice communication associated therewith, and the at least one of the first and second METs tuning to the frequency in response to the message broadcast by the central controller to communicate with the non-MET in the closed user group arrangement.

In another embodiment of the invention, the method includes the steps of the first MET selecting the closed user group network identifier (NET ID) representing a NET group including the first MET and a non-MET serviced by one of a public switched telephone network and a cellular network to establish voice communication therewith, and the first MET transmitting the NET ID to the central controller. Additionally, the method includes the central controller receiving the NET ID, determining that the NET group includes the non-MET, and broadcasting a non-MET message to either the public switched telephone network or the cellular network including the voice communication associated therewith, and either the public switched telephone network or the cellular network receiving the non-MET message from the central controller and transmitting the non-MET message to the non-MET to establish the closed user group arrangement between the MET and the non-MET.

The first MET beneficially includes a push to talk (PTT) device for generating the release of speaker message. The first MET activates the PTT device generating a PTT signal only when the PTT device is activated after the current speaker is vacant, relieving congestion on the satellite by selectively transmitting the PTT signal.

The central controller advantageously selectively downloads monitor codes to the first and second METs according to predetermined user criteria. The monitor code functions to lock the first and second METs to the NET group preventing the NET group from being released when no request has been made by the first or second METs to be the current speaker after the predetermined period of time.

In another embodiment of the invention, a priority default operation is provided. The first MET and the central controller implement the following operations:

(1) assigning, by the first MET, a default priority NET group for receiving a priority message when a priority button of the first MET is activated;

(2) activating, by the first MET, the priority button of the first MET to initiate the priority message to be transmitted to the default priority NET group even when the first MET is active in the NET group, wherein the default priority NET group is potentially different than the NET group;

(3) tuning, by the first MET, to a GC-S channel and transmitting a Net Radio Access Request Signalling Unit (NRACRSU) with a priority code appended on a corresponding receive channel indicating the default priority NET group;

(4) receiving, by the central controller, the NRACRSU and performing a MET originated NET Radio call setup procedure;

(5) rebroadcasting by the central controller the NET Radio Channel Assignment (NRCHASU) on the GC-S channel identified in the Net ID or that are active;

(6) transmitting by the central controller the NRCHASU a predetermined number of times in a predetermined number of consecutive superframes for a NET Radio channel assignment;

(7) setting by the central controller, the priority code and including a call identifier in the GC-I channel assignment message; and (8) tuning, by the first MET, to the NET Radio channel assignment and proceeding with the voice communication.

In another embodiment of the invention, security measures are provided to prevent unauthorized METs from entering or accessing a closed user group communication. According to this aspect of the invention, a MET storing a first security key generates a scrambling vector for access to the voice communication. The scrambling vector is generated in accordance with the following operations:

(1) generating a second security key having first and second components using a first process having first and second input signals, the first input signal comprising the first security key and the second input signal comprising at least one of a transmit frequency and a receive frequency; and (2) generating the scrambling vector responsive to the second security key.

The second MET tunes to the allocated frequency for the NET group using the scrambling vector to gain access thereto.

In another embodiment of the invention, the system further provides dual standby operation permitting voice communication alternately between a closed user group arrangement (NET radio) and a mobile telephone service (MTS). At least one of the first and second METs implement the function of responding either to a MTS page request indicating the mobile telephone service is being requested or to a NET radio channel assignment request as transmitted on a GC-S channel. When one of the first or second METs responds to a service request of either the closed user group arrangement or the mobile telephone service, the first or second MET is not required to monitor the GC-S channel for service requests for the other service.

In accordance with another embodiment, a mobile communication system receives and/or transmits a message from/to a mobile communication device. The system provides communication between multiple users in a closed user group arrangement. The system includes first and second mobile communication devices responsively communicable in the mobile communication system, and adapted to select a closed user group network identifier (NET ID) representing a NET group, and a controller responsively connectable to the first and second mobile communication devices. The at least first and second mobile communication devices are also adapted to transmit a priority message to the NET group and/or a priority NET group. The NET group and/or the priority NET group are adapted to receive the priority message as the communication in the closed user group arrangement.

In accordance with another embodiment of the invention, a mobile communication system provides communication between multiple users in a closed user group arrangement.

The system includes first and second mobile communication devices responsively communicable in the mobile communication system, and adapted to select a closed user group network identifier (NET ID) representing a NET group including, for example, the first and second METs. The system also includes a controller adapted to receive the NET ID from the first mobile communication device, allocate a frequency for the NET group, and transmit the message to the NET group to inform the NET group of the allocated frequency. The second mobile communication device is adapted to tune to the allocated frequency in response to receiving the message. One the first and second mobile communication devices is designatable as a speaker for the NET group. At least one of the first and second mobile communication devices is also adapted to generate a security message for authorized access to the communication, and to tune to the allocated frequency for the NET group using the security message.

In accordance with another embodiment of the invention, a mobile communication system provides communication between multiple users in a closed user group arrangement. The system includes first and second mobile devices adapted to select a closed user group network identifier (NET ID) representing a NET group including, for example, the first and second mobile devices. The system also includes a controller adapted to receive the NET ID from the first mobile device, allocate a frequency for the NET group, and transmit the message to the NET group to inform the NET group of the allocated frequency and the communication associated therewith. The second mobile device is adapted to tune to the frequency in response to receiving the message, and one of the first and second mobile devices, for example, is designatable as a speaker for the NET group. The system is also adapted to provide dual standby operation permitting communication between, for example, the first and second mobile devices in at least one of the closed user group arrangement (NET radio) and a mobile telephone service (MTS).

These together with other objects and advantages which will be subsequently apparent, reside in the details of construction and operation as more fully herein described and claimed, with reference being had to the accompanying drawings forming a part hereof wherein like numerals refer to like elements throughout.

BRIEF DESCRIPTION OF THE DRAWINGS

FIG. 2 is a diagram illustrating key performance parameters of the satellite used in the satellite network system;

FIG. 20 illustrates the service categories for Net Radio;

FIG. 21 illustrates the additional GC-S messages in each group;

FIG. 22 is an illustration of the format of the NID_SU;

FIG. 23 is an illustration of the content of the NID-SU;

FIG. 24 is an illustration of the format of the NA_SU;

FIG. 25 is an illustration of the content of the NA_SU;

FIG. 26 is an illustration of the format of the NRCHA_SU;

FIG. 27 is an illustration of the content of the NRCHA-SU;

FIG. 28 is an illustration of the MET-ST messages that are of the Network Management Category;

FIG. 29 is an illustration of the format of the MMA_SU;

FIG. 30 is an illustration of the content of the MMA-SU;

FIG. 31 is an illustration of the format of the NRACR_SU;

FIG. 32 is an illustration of the content of the NRACR-SU;

FIG. 33 is an illustration identifying the messages in each call control group;

FIG. 34 is an illustration of the content of the PTT-SU;

FIG. 35 is an illustration identifying MET timing requirements;

FIG. 36 is an illustration identifying MET call monitor codes;

FIG. 39 is an illustration of a symbol key for use in the various figures including the event tree figures;

FIG. 51 is a diagram of a bulletin board in the satellite communication system;

FIG. 54 is a diagram of the form of the "plain text input" used in the PIN-inclusive ASCF generation process;

FIG. 55 is a glossary of additional commonly used acronyms.

BEST MODE FOR CARRYING OUT THE INVENTION

Figure 1:
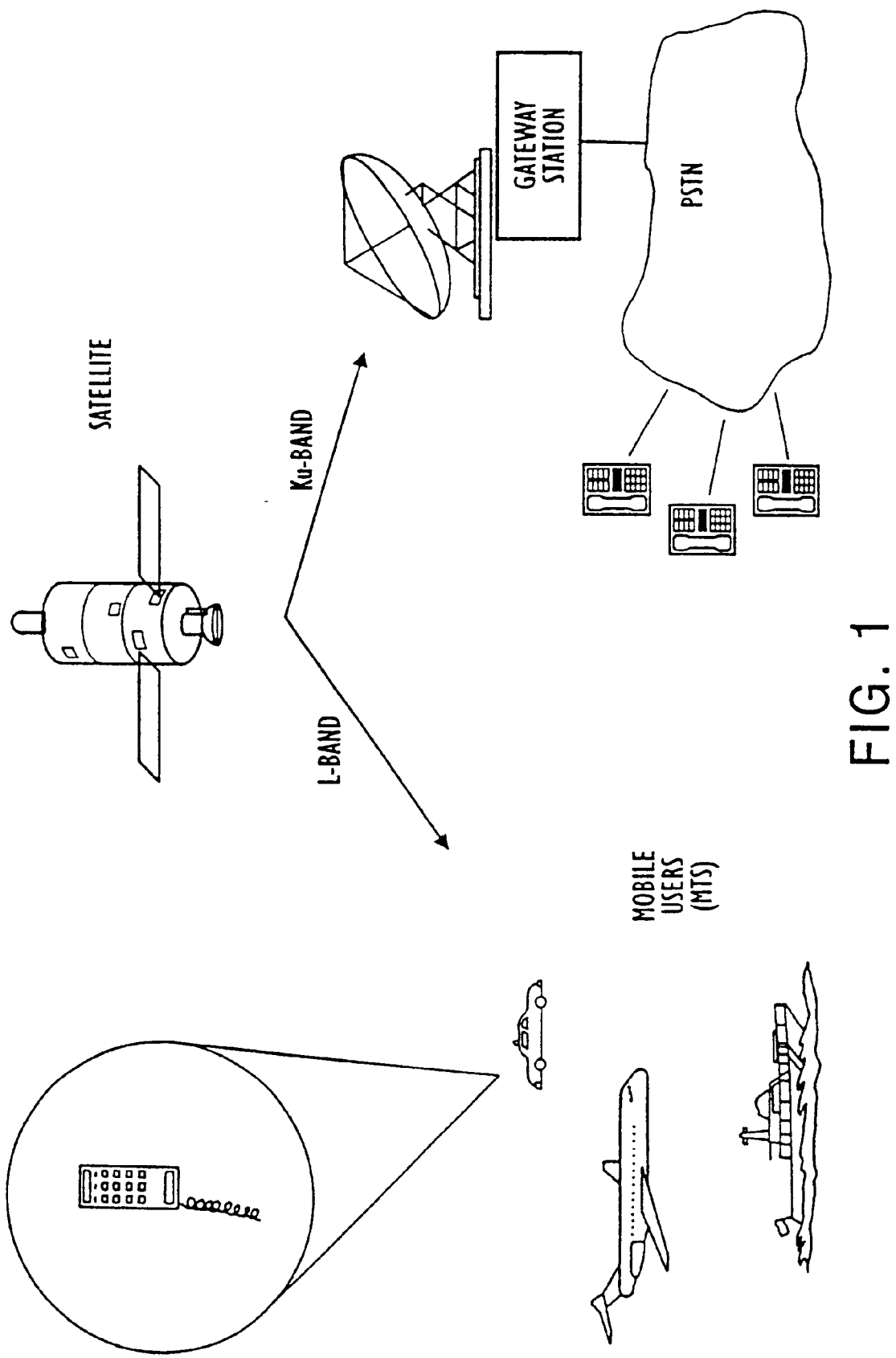
FIG. 1 is a diagram illustrating an overview of the satellite network system.
Figure 3:
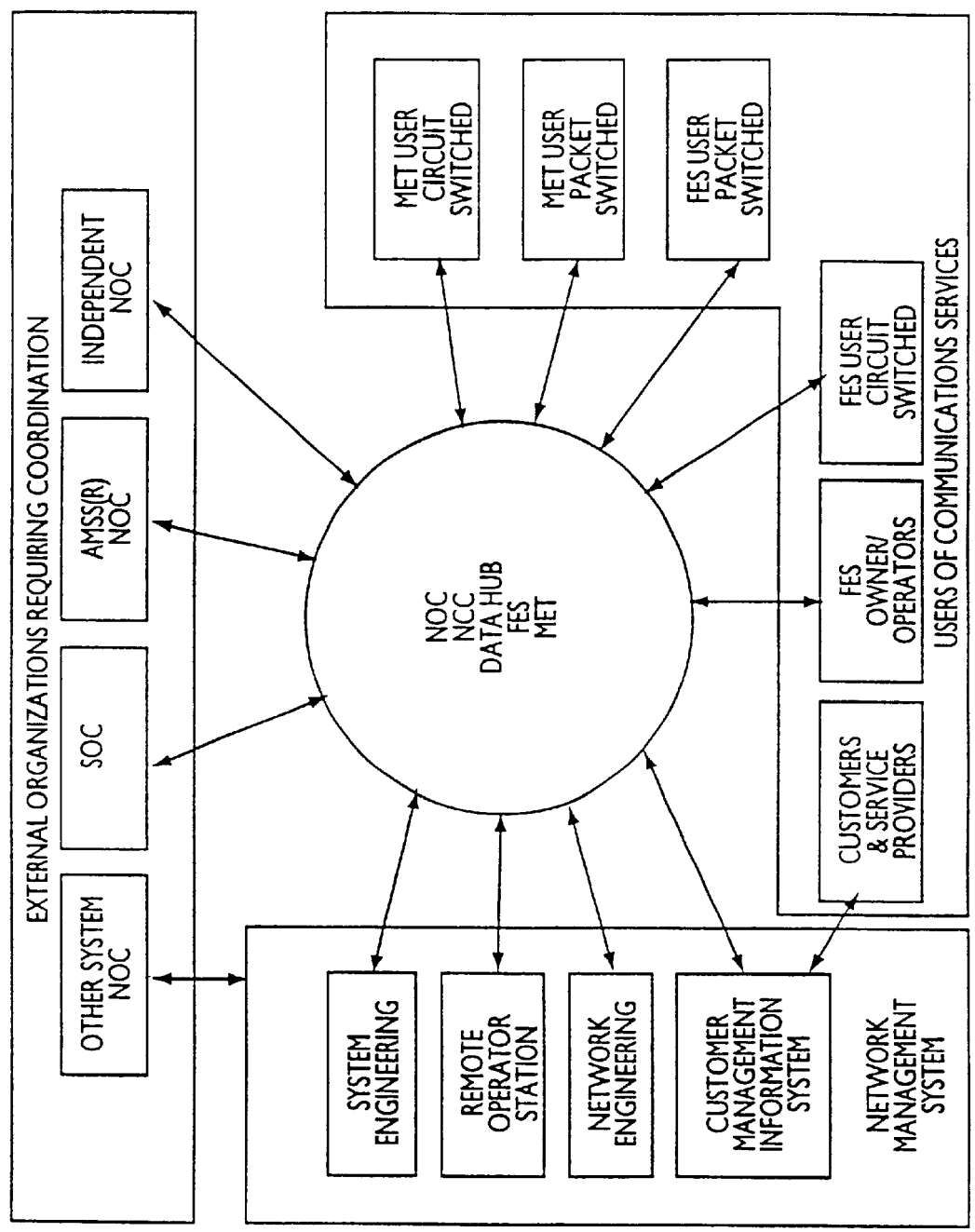
FIG. 3 is a diagram of the satellite network system illustrating components and respective interfaces.
Figure 4:
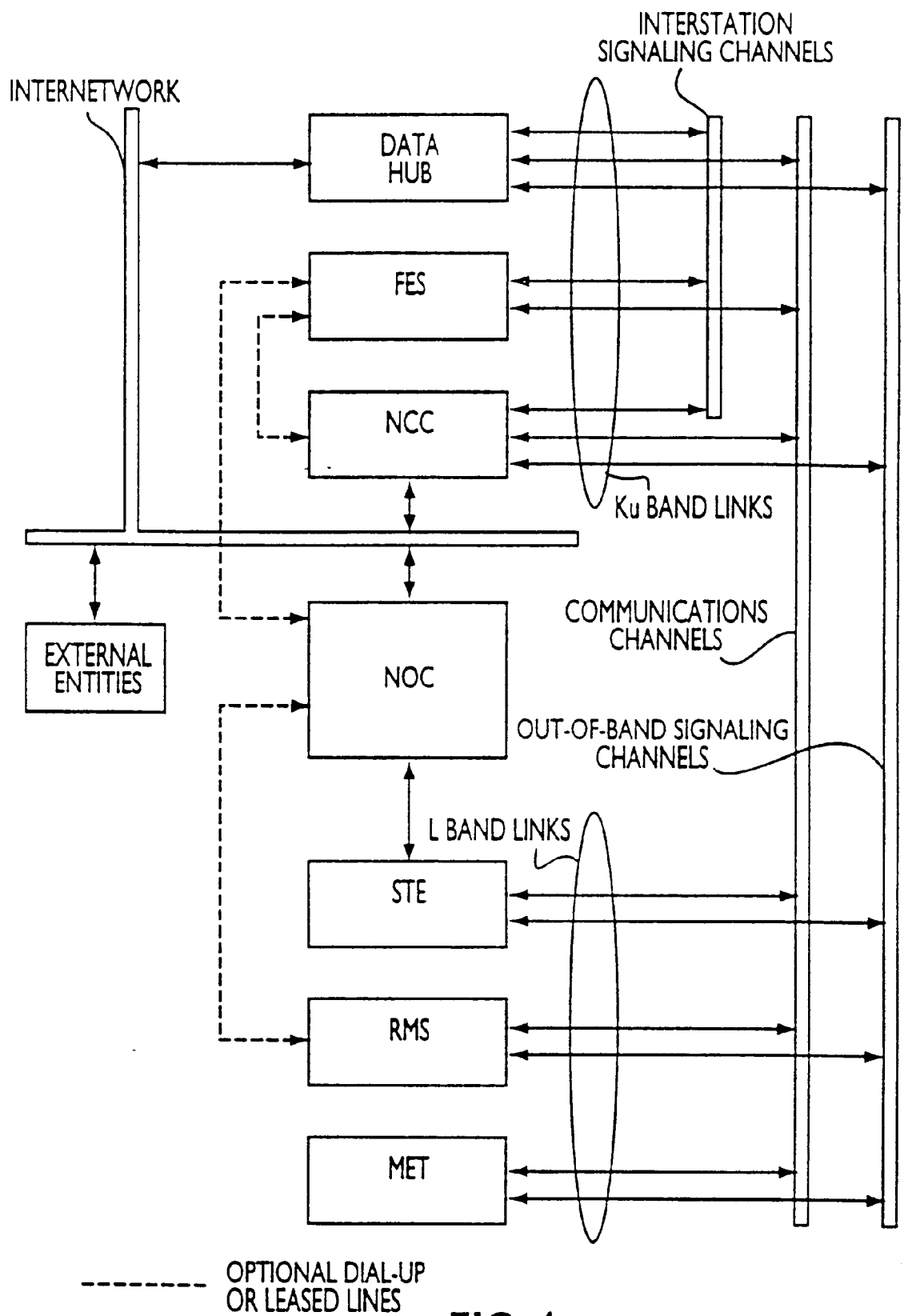
FIG. 4 is a diagram of a satellite network system illustrating a number of system elements and their interconnecting communications links.
Figure 5:
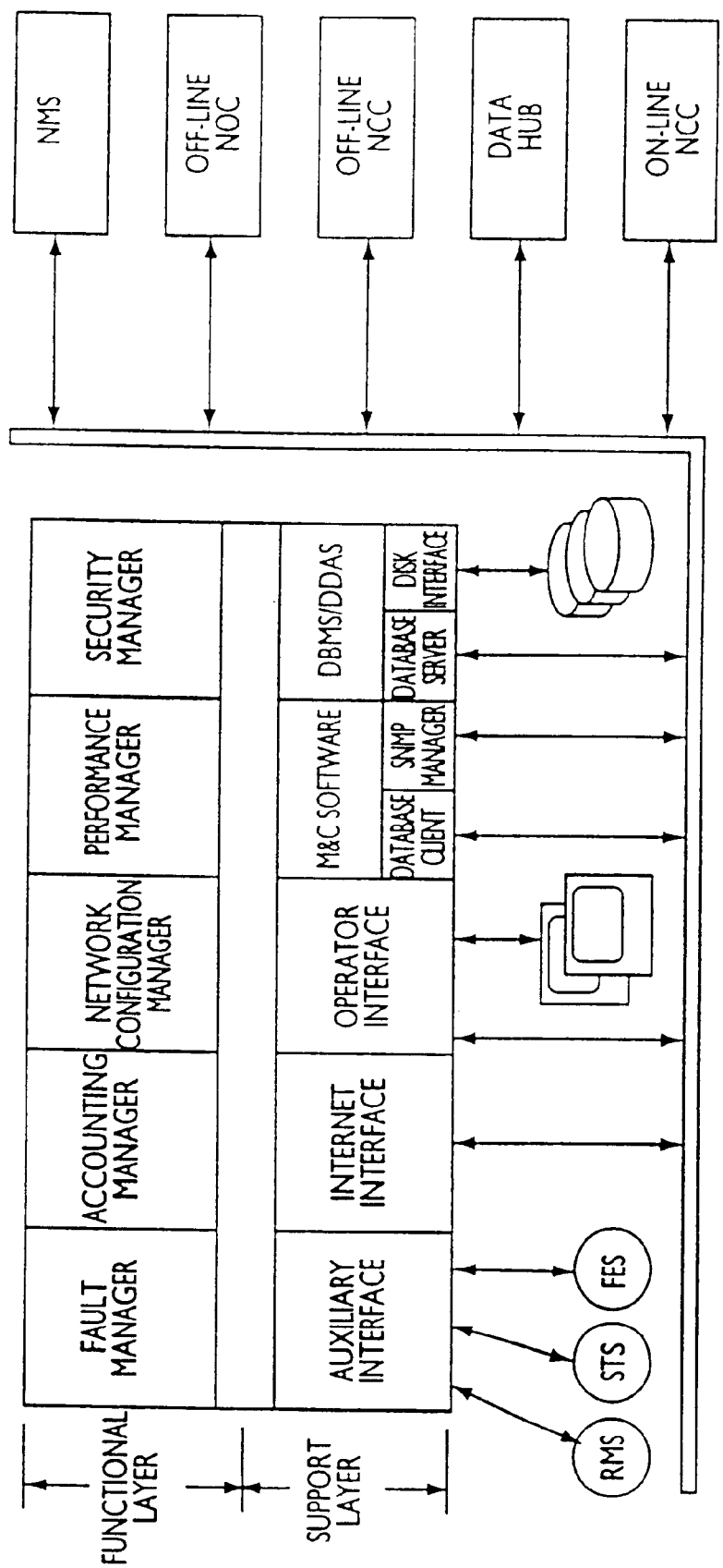
FIG. 5 is a basic block diagram of the NOC and its interfaces.

Digital speech compression means that each satellite can serve a much larger number of customers, substantially reducing the cost of the space segment. Unfortunately compression introduces 80 to 100 milliseconds of additional delay, rendering GEO systems almost unusable due to overtalking.

Omnidirectional antennas are also essential for personal telephones because the mobile users move. Accordingly, the GEO satellite loses its motionless advantage, and the satellites might just as well move also. Improved battery technology for higher power density meant lower mass. Satellites are able to transmit over obstacles from above the user.

There are generally three classes of service that can be identified:

1. Data Transmission And Messaging From Very Small, Inexpensive Satellites. Sometimes these are called the Little low earth orbits (LEO's). These systems are the space equivalent of paging systems. Examples include Orbcomm, Starsys, and VITA. The GEO predecessor was GEOSTAR, which continues to operate using small packages on Spacenet 3 and GSTAR. Orbcomm has already launched experimental satellites. The messaging data rates range from 100 to 4800 bits per second (bps).

2. Voice And Data Communications From the Big LEO's. They include Iridium, Globalstar, Odyssey, and Inmarsat P. Motorola expects to launch experimental satellites next year. All of these systems claim that they will be in service by the year 2000.

3. Wideband Data Transmission. This is the extension of the Global Information Initiative (GII). Systems proposed include Teledesic, Spaceway, and CyberStar. Several other counties and companies are working on systems of this type. These systems will offer computer to computer links and video conferencing. Higher data rates (160×9.6 kbps) 1.544 Mbps (T-1 carrier or higher).

Frequency spectrum was originally st aside for Maritime Mobile Satellite Service (MSS). The original set of bands was established with Inmarsat service in mind. These bands are in the region of 1.6 and 1.5 GHz. More recently, additional bands have been designated for Aeronautical MSS and Land MSS. These bands are also used for domestic service in the U.S., Canada, Mexico, Australia, and Japan.

The spectrum that was allocated for Radio Determination Satellite Service at WARC-88 was made coprimary with MSS at WARC-92. The U.S. FCC has allocated the top 5 MHz of the 1.6 GHz band for TDMA and the lower 11.5 MHZ for CDMA. The lower part of the 1.6 GHz band has also been used by Russian Glonass Navigation system and the Radio Astronomy service won a primary allocation for the lower part as well.

Inmarsat P has campaigned for additional service link spectrum in the new Personal Communication Service band which is also called the Future Personal Land Mobile Telephone Service (FPLMTS). Many of the developing countries and some developed countries use the 2.0/2.2 GHz bands for terrestrial services including troposcatter and microwave links.

In addition to the question of moving service link displacement dates, special provision must be made for feeder links. This could be a more important issue than the provision of communications services, since a wider bandwidth is required for the backhaul to the Land Earth Stations. Generally, wider bandwidths are available at higher frequencies. Currently, there is major competition for spectrum all the way up to 20/30 GHz (Ka bands).

Some of the satellite companies would like to operate in lower bands because the lower bands are less susceptible to rain attenuation and weather conditions. These bands are currently used by a number of critical services, including the Aeronautical Services. The International Civil Aviation Organization (ICAO) and the FAA use the C-band spectrum near 5 GHz for both communications and wind shear radar. Several of the Big LEO's, including Globalstar and Inmarsat P also want to use these bands.

Figure 6:
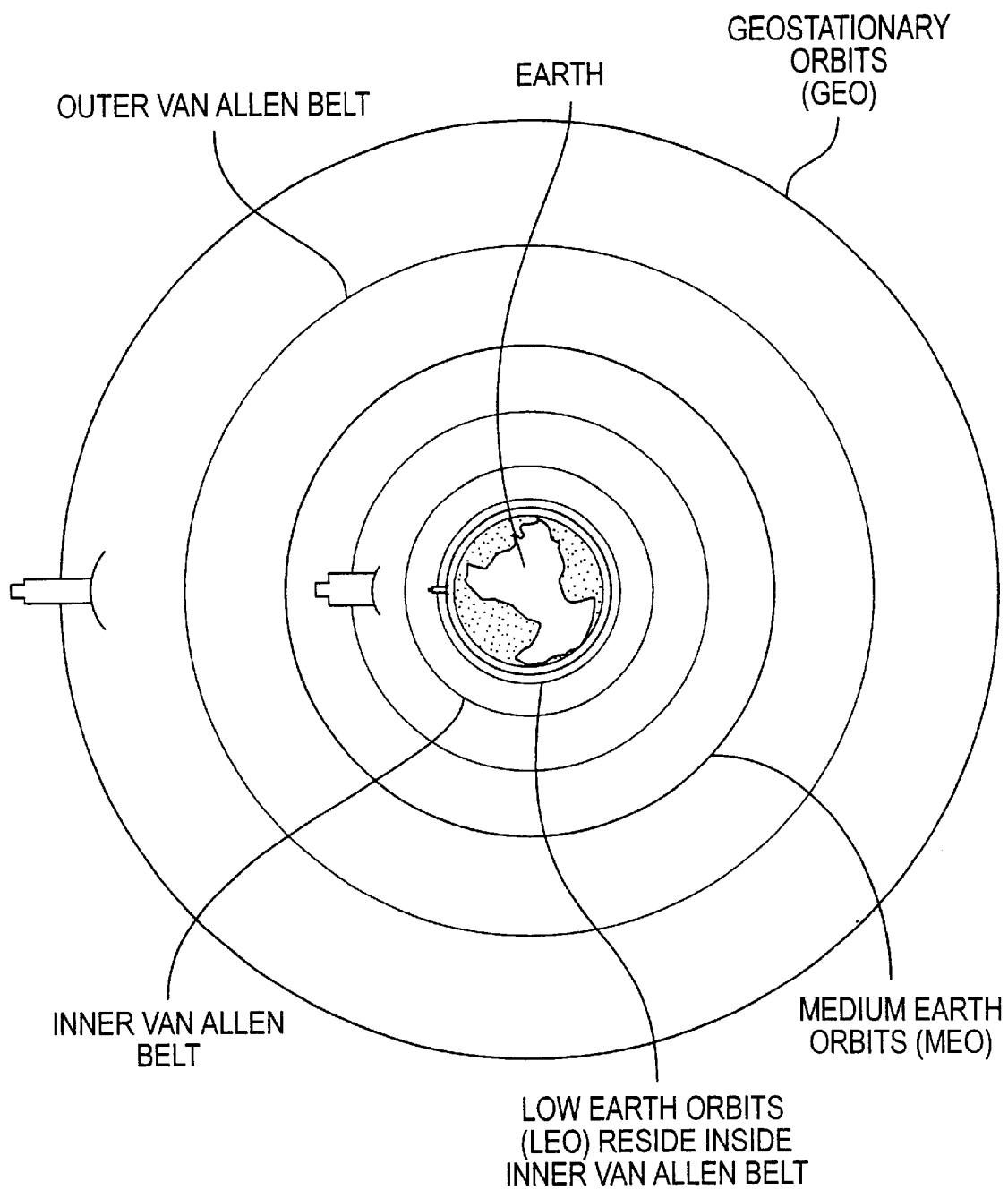
FIG. 6 shows the relative altitude of the orbits for various satellite systems.

Some of the systems would employ the use of reverse band transmissions for feeder links. This technique involves paired bands by which the Earth to space transmissions are used in the space to Earth direction and vice versa. FIG. 6 shows the relative altitude of the orbits. GEO satellites are located in orbits farthest from the Earth. Time delay is 250 msec or more plus processing delays.

Most of the non-geostationary satellites are located in LEO orbits, between the Earth's atmosphere and the inner Van Allen Belt. The inner belt contains trapped particles which have been ejected from the sun. The particles in the inner belt are high intensity, high energy electrons which are dangerous to electronic components. Collisions with satellites produce X-rays and additional energetic electrons. Shielding within the belt is not practical and satellites in this region would survive only for a few months.

Medium earth orbit (MEO) satellites take advantage of gap between the inner and outer Van Allen belts and orbit satellites in inclined orbits. This region enables service without encountering the extremely dangerous radiation levels within the Van Allen belts. Although the radiation level is about twice as intense as that for GEO, the MEO satellite can be protected by selective shielding and use of hardened electronic components.

American Mobile Satellite Corporation (AMSC)

Figure 7:
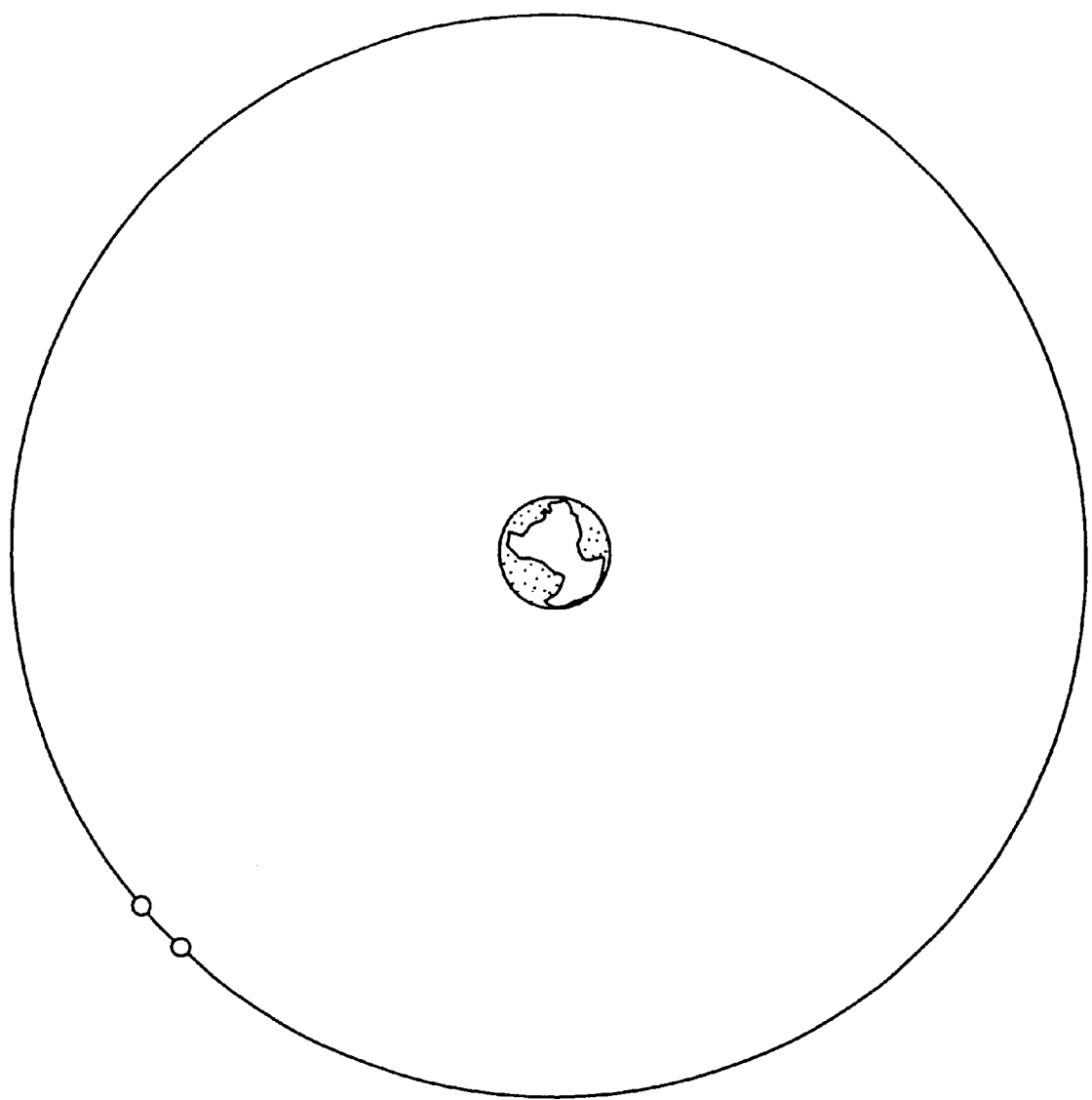
FIG. 7 is an illustration of the Geostationary Earth Orbit (GEO) satellite system for American Mobile Satellite Corp. (AMSC) designed to service vehicles with transportable terminals.

The race to provide lower cost, space based mobile communications started with the U.S. domestic proposals to the FCC by Skylink and MOBILSAT which merged with other proponents into the consortium which is called American Mobile Satellite Corp. (AMSC). This GEO system, illustrated in FIG. 7, is designed to service vehicles with transportable terminals. The satellite antennas are 5 to 6 meters in diameter. Each satellite can provide 1900 circuits.

The system is designed to provide domestic service to the U.S. and Canada. MSAT uses the existing spectrum which is shared with Inmarsat. Other countries are also using this spectrum for domestic services. The constellation includes two GEO satellites, one for AMSC and one for Telsat Mobile Inc. of Canada which is also developing a comparable service. The satellite inclination is approximately 0°, having an altitude of approximately 35,000 km. Two ground stations or control stations are provided. The access method to the system is frequency division multiple access (FDMA). The communication spectrum is approximately 1.6/1.5 GHz, the feeder links are 13/11 GHz, and special features include service to land mobile vehicles.

Several other systems are designed around the goal to provide a desirable, cost effective service from GEO, as well. These include the Asi-African Satellite Corp. (ASC) and the ASEAN Cellular System called ACeS. China and Singapore Telecom are proceeding with development of a GEO system called Asia Pacific Mobile Telephone (APMT).

These GEO systems are planned to provide service to hand held terminals and will require very large satellite antennas, which could be 20 meters in diameter or larger. Each satellite would be required to provide hundreds of transponders. Separate antennas would be desirable for the satellite mobile link receive and transmit functions, but this may be impractical given such large aperture antennas. If a single, large antenna is used there will be the risk of passive intermodulation products.

Orbcomm

Figure 8:
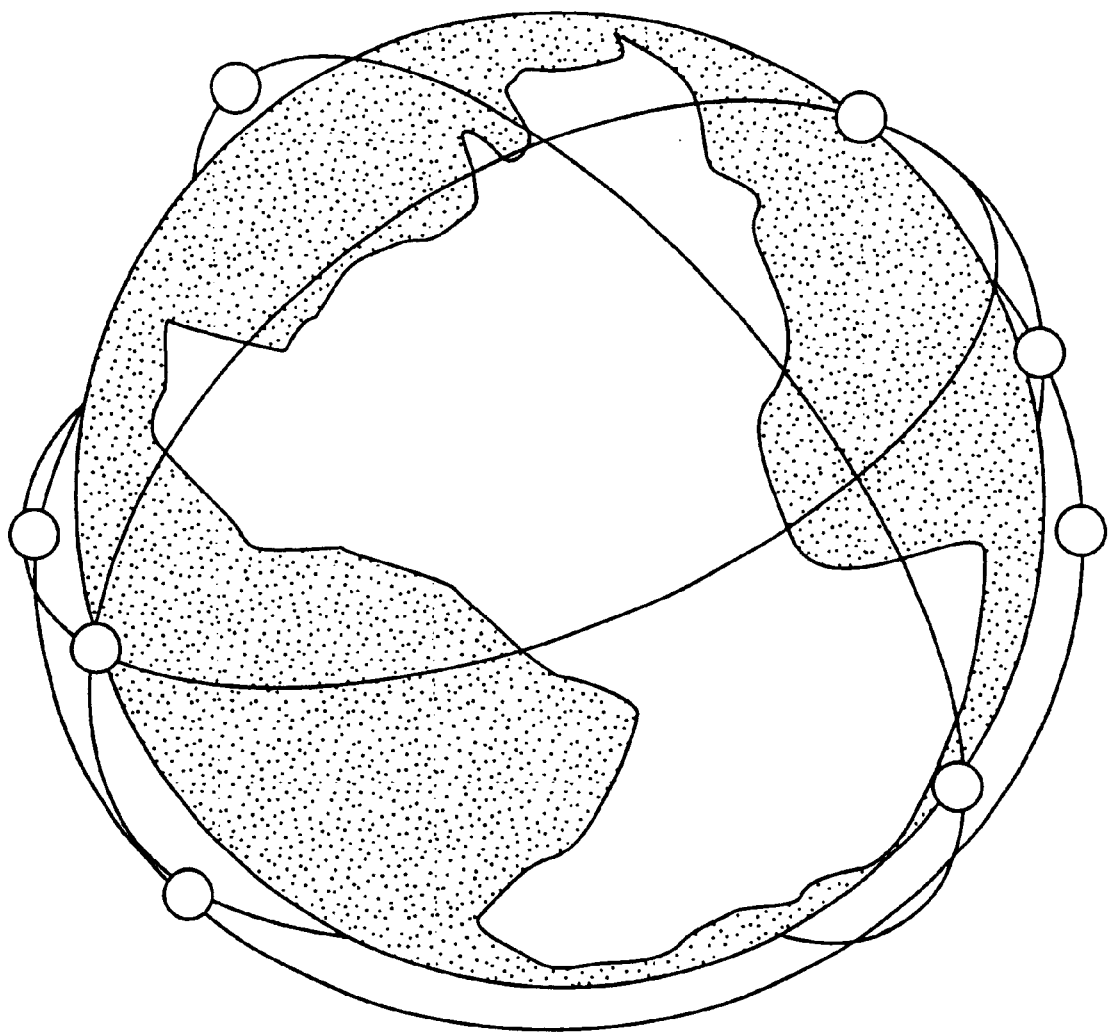
FIG. 8 is an illustration of a Low Earth Orbit (LEO) satellite system for Orbcomm designed to relay messages throughout the world by means of on board processing.

Orbcomm is one of the major players among the little LEO's and has launched two satellites. The satellite configuration for Orbcomm is illustrated in FIG. 8. This system is planned to provide real time messaging at data rates of 2400 bps from user to satellite and up to 4800 bps back to the user. The satellites are designed to relay messages throughout the world by means of on board processing.

The sponsors of the Orbcomm program include OSC/Teleglobe. The satellite constellation includes two satellites in four orbit planes. The satellite inclination is 70° (2) 45° (24). The LEO altitude is approximately 750 km, and includes approximately four ground stations located in the United States. The communication access method is TDMA with a communication spectrum of approximately 137.5/150.0 MHz, and feeder link spectrum of 137.5/150.0 MHz.

Iridium

Iridium was one of the earliest systems to consider voice communications from non-geostationary orbits. Much of the exploration and optimization of space based mobile communications services has taken Iridium into consideration. Iridium is designed to provide global communications by means of state of the art electronics. The architecture reflects the need to network LEO communications in space.

Because the satellites operate from relatively low altitude (460 statute miles), each satellite can only observe about 2% of the Earth's surface at a given time. Consequently 66 satellites are needed to provide the service. The satellites therefore are frequently out of contact with land facilities which could carry transmissions into the terrestrial wireline infrastructure. Iridium attempts to overcome this obstacle by passing communications between satellites until a land Earth station can make the terrestrial connection. This architecture provides a space network which links the entire Iridium system to the Public Switched Telephone Networks (PSTNs).

Figure 9:
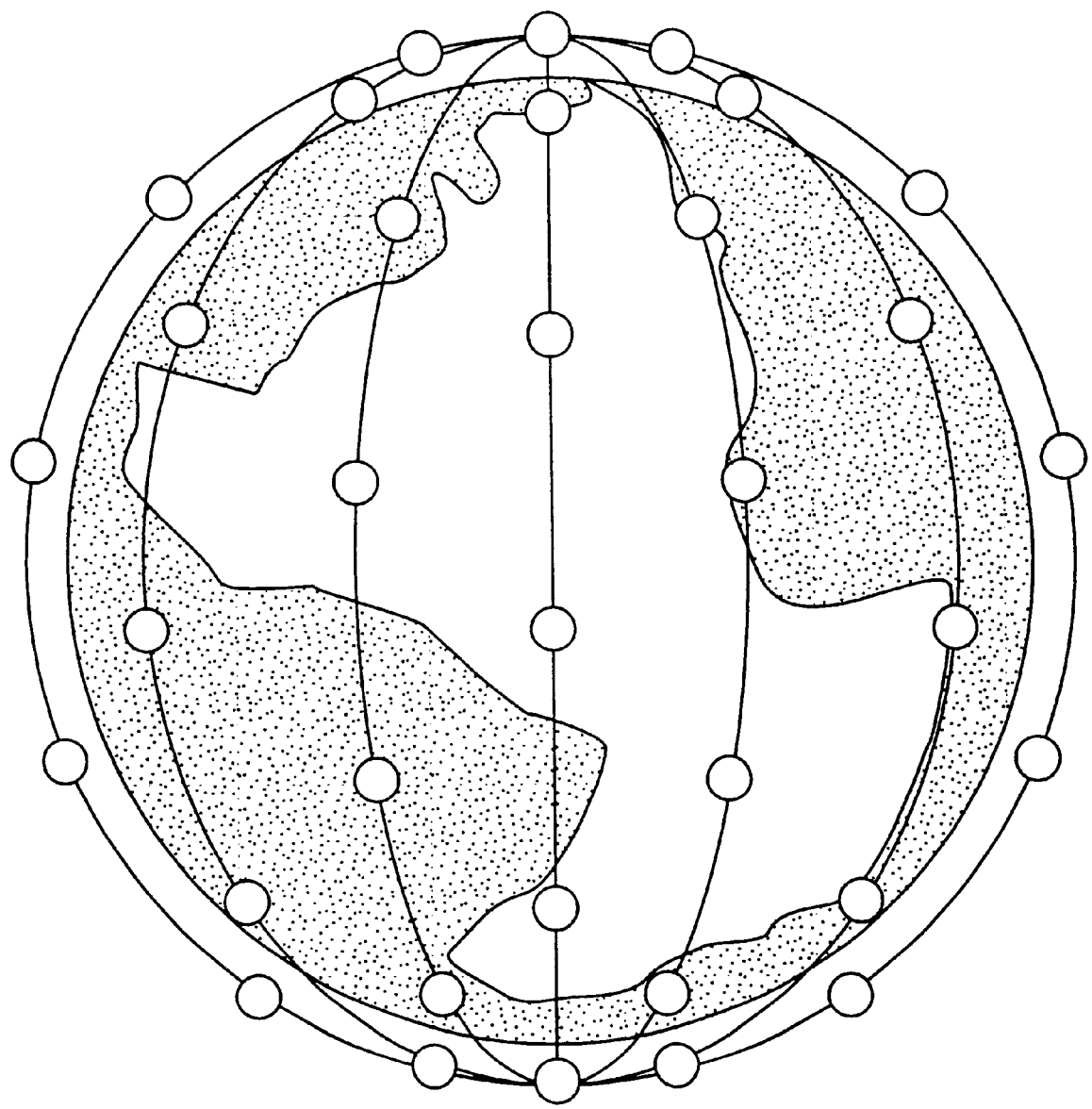
FIG. 9 is an illustration of a Low Earth Orbit (LEO) satellite system for Iridium designed to pass communications between satellites until a land earth station can make the necessary terrestrial connection, and provides a space network which links the entire Iridium system to the Public Switched Telephone Networks (PSTN)

As illustrated in FIG. 9, each satellite projects 48 beams to the Earth, and the satellites provide very high link margins. The system is designed so that one satellite beam always provides service to a given spot on the Earth. Several satellites are available to provide service in more northerly locations, but only one satellite is used. Because the satellites orbit at the low altitude, the elevation angles can be as low as 10 degrees, and the average elevation angle is about 28 degrees. These motion of 15 degrees and 35 degrees per minute.

The main sponsor of the Iridium project is Motorola. The satellite constellation includes 66 satellites in six orbit planes. The satellite inclination is approximately 90°, and the LEO altitude is approximately 740 km. Approximately twenty ground stations are used to control and/or administer the Iridium project. The communication access method is TDMA, and the communication spectrum is approximately 1616 to 1626.5 MHz with feeder links of approximately 20/30 GHz. Special features of Iridium include time division duplex transmission, and cross-links for global networking.

Globalstar

Figure 10:
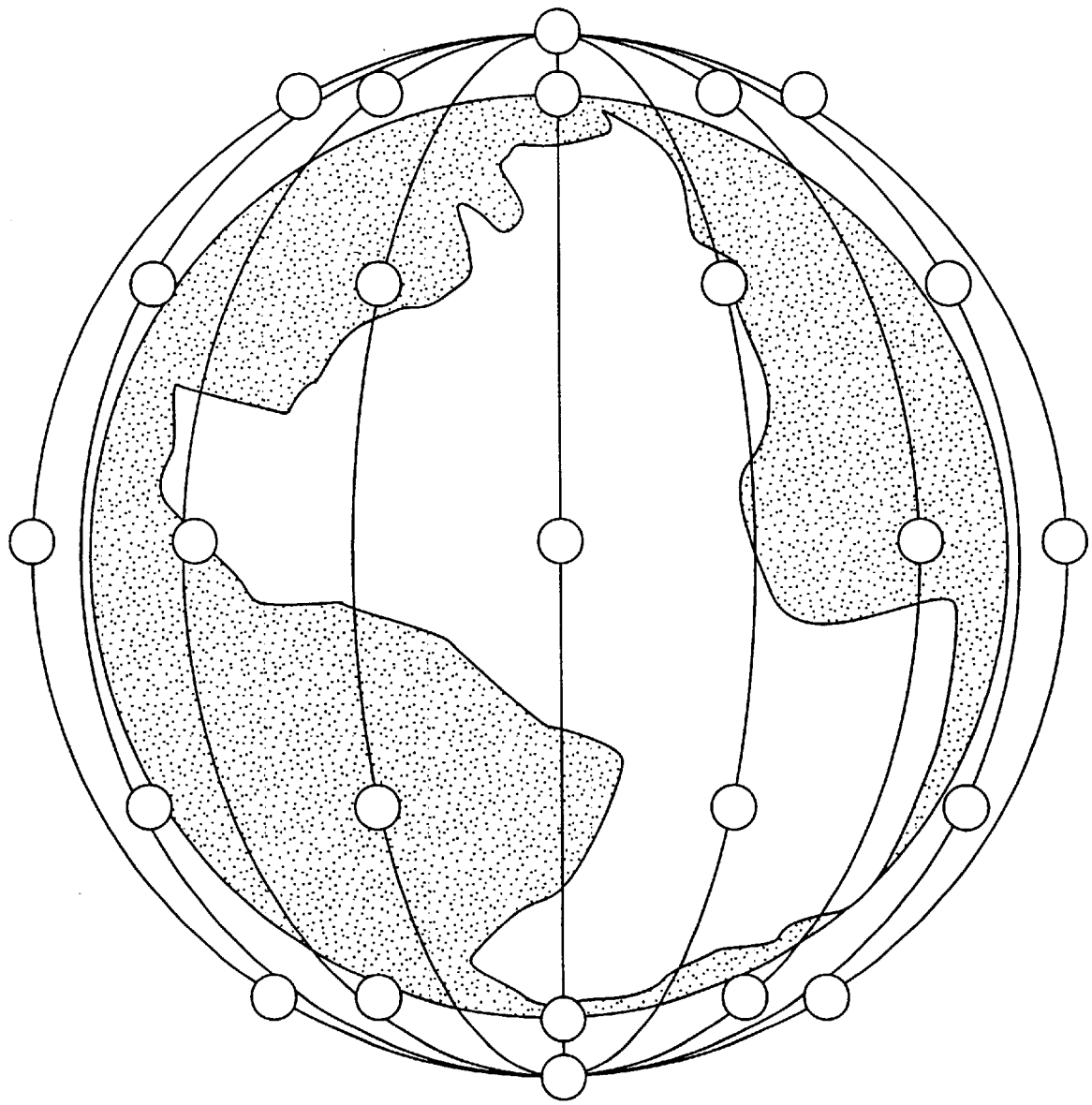
FIG. 10 is an illustration of a Low Earth Orbit (LEO) satellite system for Globalstar that does not use satellite cross links, uses CDMA communication protocol, and does not process signals on board.

FIG. 10 is an illustration of a Low Earth Orbit (LEO) satellite system for Globalstar that does not use satellite cross links, uses CDMA communication protocol, and does not process signals on board. The Globalstar satellite system is similar to Iridium. The satellites operate at a higher altitude (about 830 statute miles), and can observe as much as 5% of the surface of the Earth at a time. Consequently, service can be provided by using a somewhat smaller number of satellites (i.e., approximately 48). Each satellite is simpler than the Iridium satellites, since Globalstar does not use satellite cross links. The system uses CDMA, but the satellites do not process the signals on board. This "bent pipe" transponder approach keeps complexity low. Each satellite projects 16 beams to the Earth.

Globalstar employs spatial diversity by transmitting signals through two satellites. The Qualcomm "stereo transmission" technique reduces the amount of power required for transmission. Each handset communicates through two satellites. The two CDMA signals are combined in each handset using standard Rake receivers (which add the two CDMA signals constructively). This technique provides the most robust service when two satellites are available. The double path provides a "soft" handover from beam to beam and satellite to satellite as the constellation of satellites moves overhead.

The proponents of the Globalstar satellite system include Loral and Qualcomm. The satellite constellation includes 48 satellites in 6 orbit planes. The inclination for the satellite is approximately 47°, with a LEO altitude of approximately 1390 km. The number of ground stations are approximately 90 to 200. The communication access method for Globalstar is CDMA, with a communication spectrum of approximately 1.6/2.5 GHz, and feeder links of approximately 5/7 GHz. Special features of the Globalstar satellite system include diversity service using "stereo" transmission.

Odyssey

Figure 11:
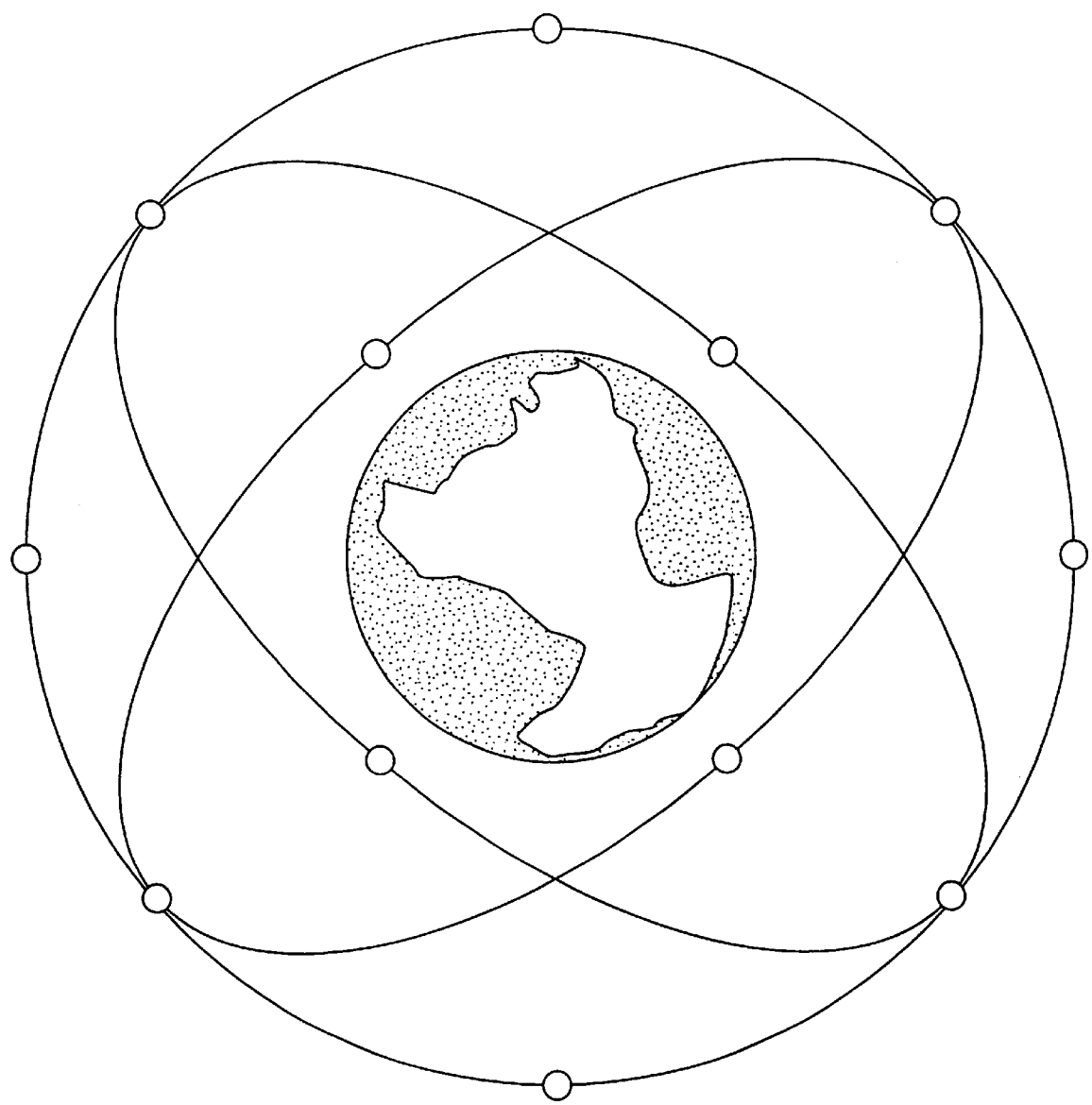
FIG. 11 is an illustration of a Medium Earth Orbit (MEO) satellite system for Odyssey with satellites operating inside the Van Allen Belts.

FIG. 11 is an illustration of a Medium Earth Orbit (MEO) satellite system for Odyssey with satellites operating inside the Van Allen Belts. Odyssey employs orbiting satellites in Medium Earth Orbit or Intermediate Circular Orbits (ICO) for mobile satellite service. The Odyssey designers recognized that a cost effective system which would not cause time delay could use a relatively small number of satellites. Furthermore, a small constellation of satellites would require a smaller number of ground antennas and less complex operations. However, this meant that the satellites would operate inside the Van Allen Belts.

These considerations led to the selection of the MEO, which can furnish initial service with only six satellites, and full global coverage with only nine satellites. With twelve satellites, at least two satellites are visible from any point in the world. The system is baselined with twelve satellites so that the satellite constellation would have built in redundancy. This configuration provides the foundation of diversity service. Satellites have an apparent motion of 1° per minute.

Odyssey provides the highest elevation angles of all the mobile satellite systems proposed for voice service. Since two or more satellites are available for service anywhere in the world, service can be routed through whichever satellite provides the better transmission. This type of diversity service provides very high availability for the user. The system is also designed with directed coverage to concentrate capacity into the regions where demand is the greatest. Less demand is expected in ocean regions, consequently the system provides only single satellite service at sea.

The proponents of the Odyssey system include TRW and Teleglobe. The satellite constellation includes twelve satellites in three orbit planes. The satellite inclination is approximately 50°, with the MEO altitude of approximately 10,350 km. The ground stations used in the Odyssey system are approximately eight. The communication access method is CDMA, with a communication spectrum of approximately 1.6/2.5 GHz, and feeder links operating at approximately 20/30 GHz. Special features of the Odyssey satellite system include directed coverage, and diversity service, generally from either of two satellites.

Inmarsat P (or I-CO Global)

Figure 12:
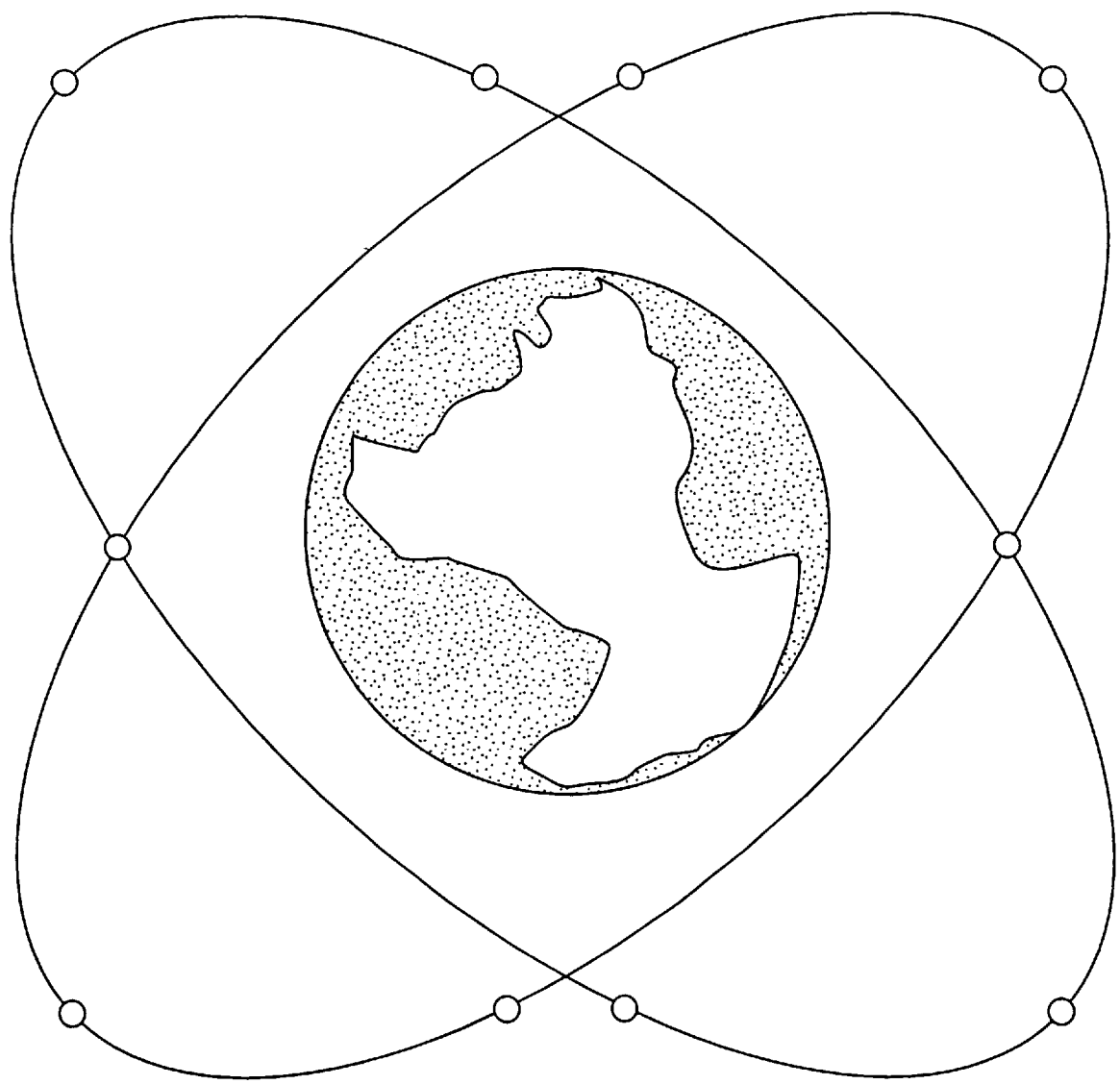
FIG. 12 is an illustration of a Medium Earth Orbit (MEO) satellite system for Inmarsat P with satellites operating inside the Van Allen Belts using the TDMA communication method.

FIG. 12 is an illustration of a Medium Earth Orbit (MEO) satellite system for Inmarsat P with satellites operating inside the Van Allen Belts using the TDMA communication method. The Inmarsat Affiliate system is very similar to the Odyssey constellation and ground infrastructure. I-CO has adopted the same altitude, nearly the same inclination, multibeam antennas, and service features, as the Inmarsat P system. Both systems orbit twelve satellites, but I-CO only operates ten satellites, and has two nonoperating spares in orbit.

Inmarsat has elected to use TDMA access, the 2.0/2.2 GHz frequencies (which require a larger number—163 smaller beams). Ample capacity is available in ocean areas. Inmarsat P is funded by many of the same signatories that have operated the treaty based Inmarsat monopoly for the part 16 years. The satellite constellation includes at least ten satellites in two orbit planes, with a satellite inclination of approximately 45° at an altitude of approximately 10,350 km. The Inmarsat satellite system includes approximately eight to twelve ground stations with feeder links operating at approximately 5/15 GHz. Special features of the Inmarsat system include diversity service or redundant satellite coverage area.

Teledesic

Figure 13:
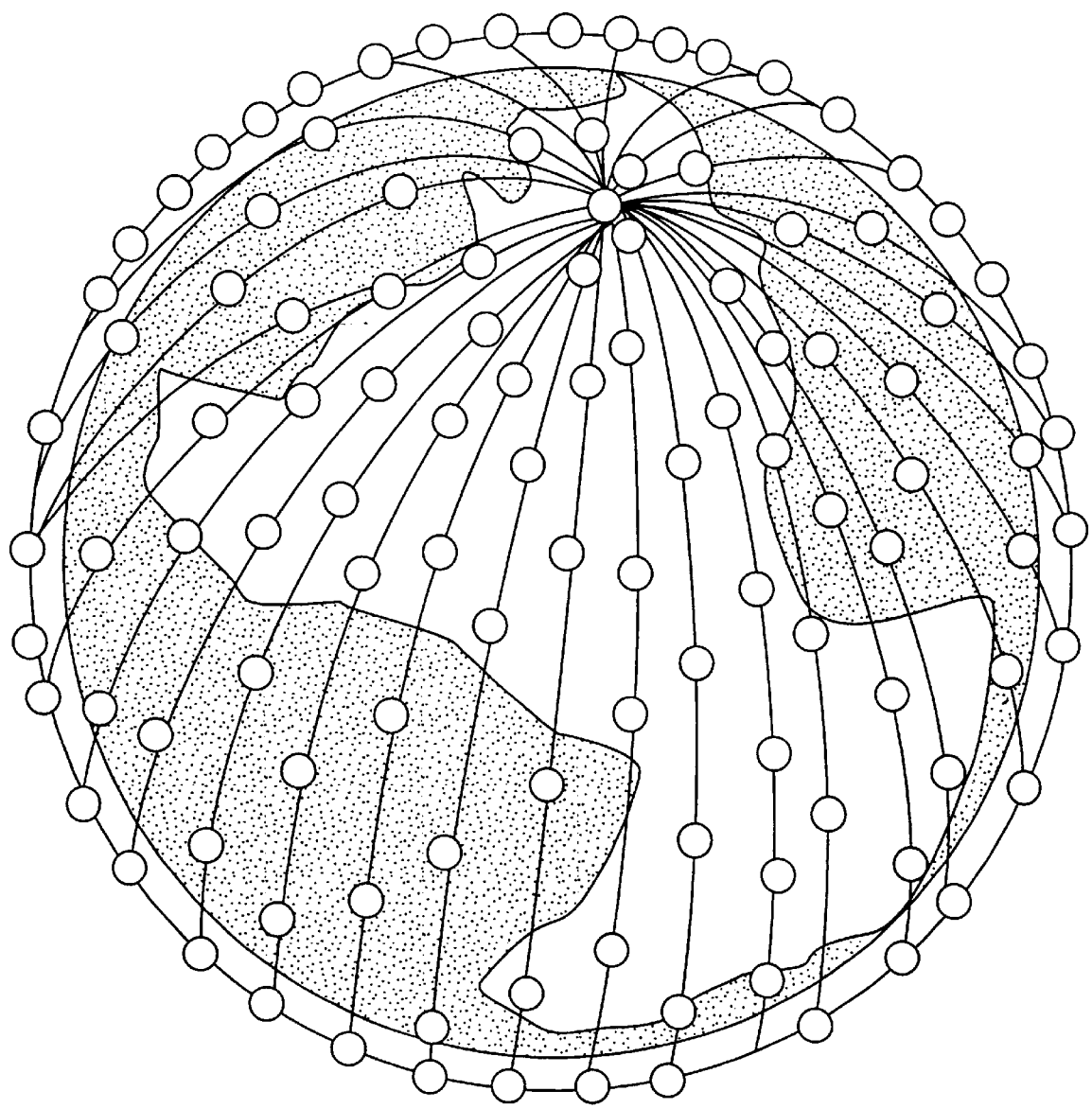
FIG. 13 is an illustration of a Low Earth Orbit (LEO) satellite system for Teledesic with satellites operating under or providing wideband data communication using TDMA communication method.

FIG. 13 is an illustration of a Low Earth Orbit (LEO) satellite system for Teledesic with satellites operating under or providing wideband data communication using TDMA communication method. Teledesic is considered to be the most ambitious service. This system would provide wideband data from LEO. The Teledesic constellation requires the largest number of satellites proposed to date. The system as proposed would provide high data rate digital communications. The constellation of 840 satellites provides service at elevation angles that always exceed 40°.

The system is planned for operation of the communication spectrum at approximately 20/30 GHz. Transmission data rates of 1.2 Mbps (E-1) to 2 Gbps are under consideration for this system. The satellite inclination is approximately 98.2° with an altitude of approximately 700 km. Approximately sixteen ground stations are used, with feeder links at approximately 20/30 GHz. Special features of the Teledesic system include a minimum satellite elevation angle 40°

Spaceway and Cyberstar

Figure 14:
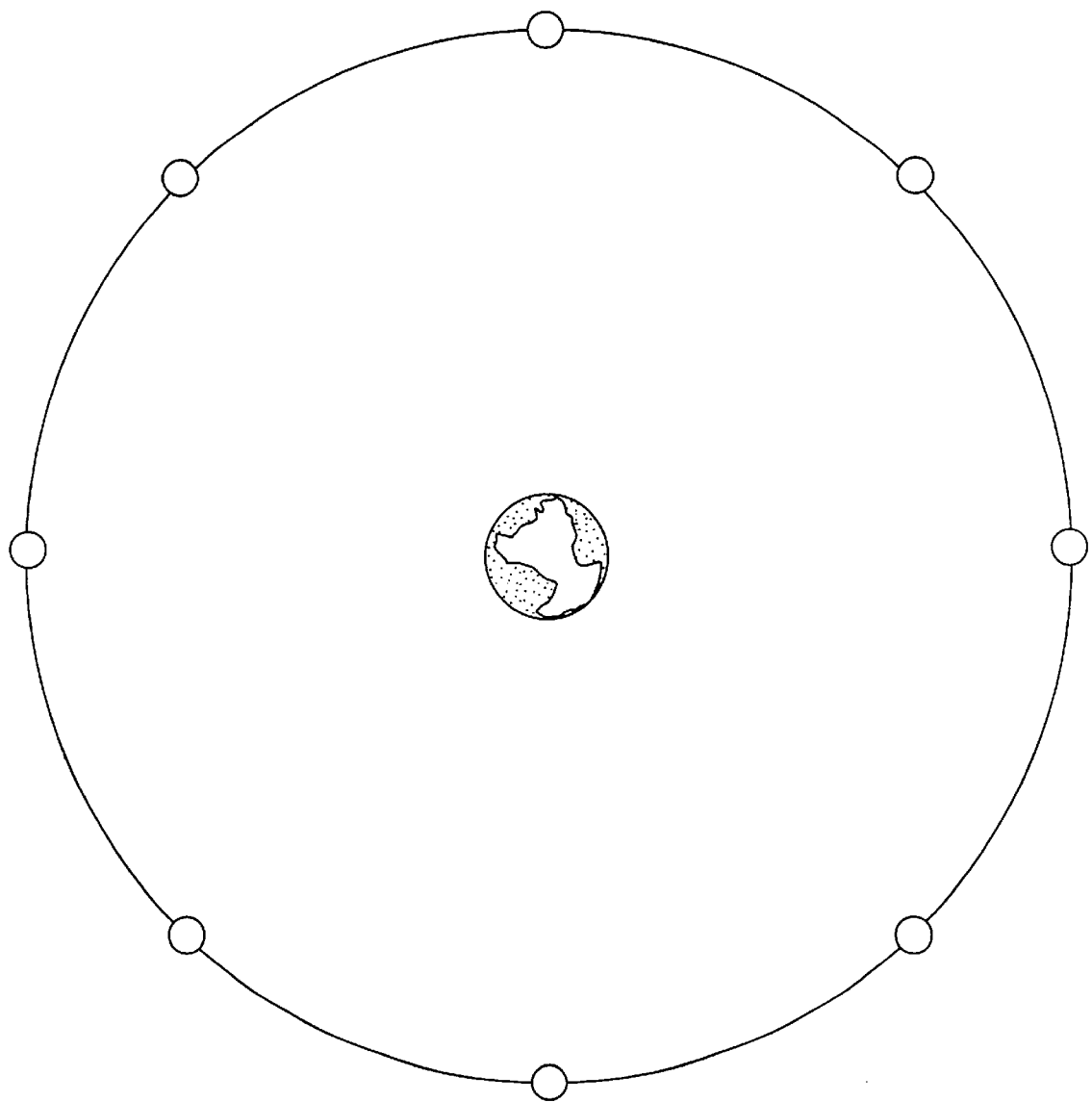
FIG. 14 is an illustration of a Geostationary Earth Orbit (GEO) satellite system for Spaceway and Cyberstar with satellites using TDMA communication method.

FIG. 14 is an illustration of a Geostationary Earth Orbit (GEO) satellite system for Spaceway and Cyberstar, with satellites using TDMA communication method. The Spaceway system has been proposed by Hughes Communications and has the same objectives as Teledesic. This system operates from GEO, and may encounter some time delay limitations in the case of interactive communications, such as video conferencing. Transmission data rates of 1.544 Mbps (T-1) are under consideration for this system.

Recently Loral filed for a similar system called CyberStar. Both applications have been accepted for processing by the FCC. The satellite constellation includes eight satellites in one orbit plane, with an inclination angle of 0°, and altitude of 35,000 km. The Spaceway and Cyberstar systems include two ground stations, utilizing the TDMA access method. The communication spectrum is approximately 20/30 GHz, with feeder links operating under approximately 20/30 GHz. Special features of the Spaceway and Cyberstar systems include the use of two GHz of bandwidth at Ka-band The above description of the various satellite systems is described in more detail in "The Market and Proposed Systems for Satellite Communications," by Roger Rusch, in Applied Microwave & Wireless, pp. 10–34 (Fall 1995), published by Noble Publishing, Tucker, Ga. 30084, the details of which are incorporated herein by reference.

Overview of MET Communication Protocol and Architecture

While the description below focuses on the AMSC Satellite System, this description is conceptually appropriate for the other above described satellite systems. The present invention provides point-to-multipoint circuit switched connections between mobile terminal subscriber stations and a central base station. Mobile users are able to listen to two-way conversations and to transmit using a push-to-talk mode of operation.

Figure 15:
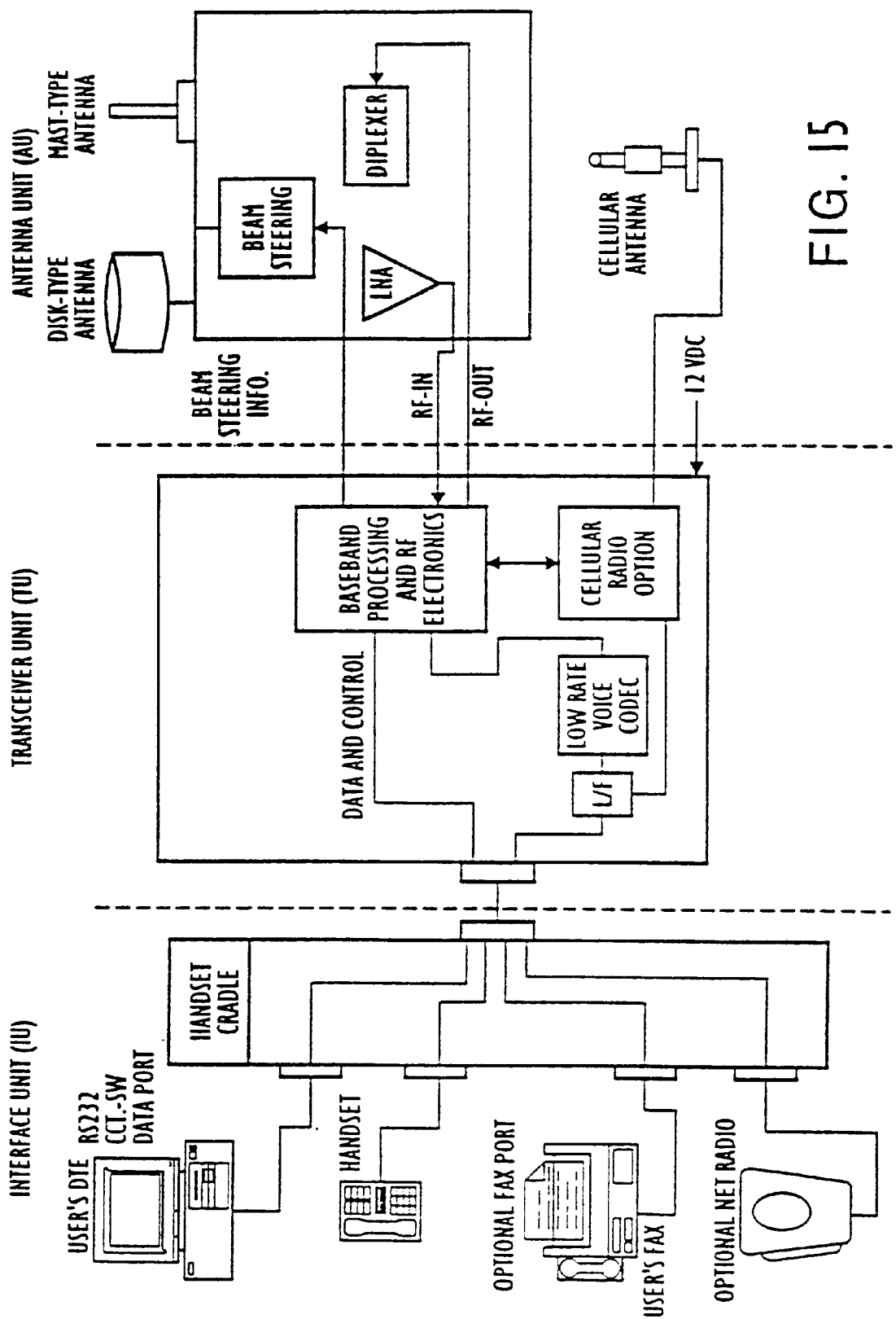
FIG. 15 is a basic block diagram of the physical architecture of the mobile earth terminal.
Figure 16:
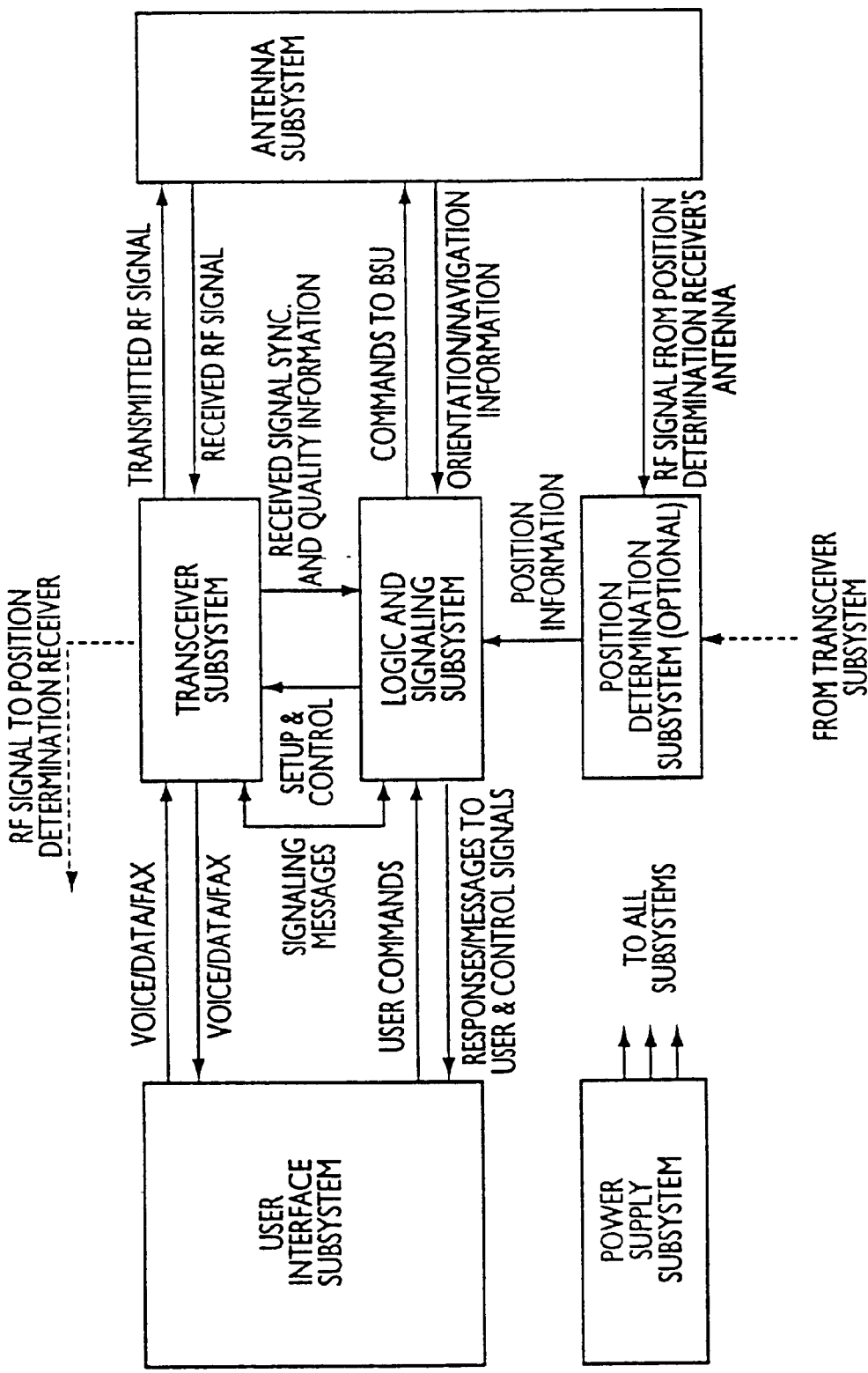
FIG. 16 is a basic block diagram of the functions of the mobile earth terminal.

The MET includes all of the communication and control functions necessary to support communications from a vehicle or fixed remote site using the resources of the satellite network system. FIGS. 15 and 16 are basic block diagrams of the physical architecture and functions of the mobile earth terminal. The basic functional diagram of FIG. 16 is implemented by baseband processing and RF electronics of FIG. 15. A standard voice coder/decoder receives coded messages from the baseband processing and RF electronic system and decodes the message received from the satellite antenna unit for delivery to the interface unit that includes standard user interfaces. Baseband processing and RF electronics receive satellite communications responsive with low noise amplifier (LNA) and output signals for transmission using the diplexer of the antenna unit. Baseband processing and RF electronics also outputs signals for use with beam steering antennas as will be discussed blow. Advantageously, the mobile earth terminal is functional with antennas that are either steerable or nonsteerable.

The functional subsystems comprising the MET are shown in FIG. 16 and include the user interface, transceiver, antenna, logic and signaling, power supply subsystems, and Position Determination subsystem. The baseline MET will have a low gain directional antenna in the antenna subsystem. The satellite network system supports communications with METs using omnidirectional and higher gain directional antennas.

The user interface subsystem provides the user interfaces through which the user has access to the services supported by the satellite network system. Depending on the service(s) the MET will be equipped with one or more of the devices or ports. The transceiver subsystem consists of a receiver and a transmitter. The transmitter accepts voice, data, fax and signaling signals and converts them to a modulated RF signal. The transmit RF signal is routed to the antenna subsystem. The transmitter typically consists of the high power amplifier (HPA), the upconverter with its associated frequency synthesizer, the modulators and the modules for voice, Fax, or data encoding, multiplexing, scrambling, FEC encoding, interleaving and frame formatting.

The receiver accepts modulated RF signals from the antenna subsystem and converts them into voice, data, fax or signaling signals as appropriate. The voice, data and fax signals are routed to the user interface subsystem. The receiver typically consists of the downconverter with its associated frequency synthesizer, the demodulator, and the modules for frame de-formatting, de-interleaving, FEC decoding, descrambling, demultiplexing and voice, Fax, or data decoding. The transceiver communicates over one channel in each direction at any one time. Thus, the transceiver subsystem will typically consist of only one receiver and one transmitter. However, the MET may also incorporate a pilot receiver for antennas and frequency tracking purposes, or a complete receiver dedicated to the continuous reception of the signaling channel from the Group Controller.

The antenna subsystem provides the MET interface to the satellite network and is responsible for receiving the RF signal from the satellite and transmitting the RF signal generated by the MET towards the satellite. The subsystem typically includes an antenna which may be either directional or omnidirectional, a diplexer, a low noise amplifier (LNA), an optional beam steering unit (BSU) if a directional antenna is used, a device such as a compass or an inertial sensor for the determination of the orientation of the vehicle, and an antenna for the position determination receiver.

The logic and signaling subsystem acts as the central controller for the MET. Its basic functions are to initialize the MET by performing a self test at power up and control, based on a resident system table, the acquisition of one of the METs assigned outbound signaling channels from which updated system information and commands and messages from the GC are derived. The logic and signaling subsystem sets up and configures the transceiver for the reception and transmission of voice, data, fax or signaling messages as appropriate. The logic and signaling subsystem also handles the protocols between the MET and the FES and between the MET the GC via signaling messages, and checks the validity of the received signaling messages (Cyclic Redundancy Check (CRC)) and generates the CRC codes for the signaling message transmitted by the MET.

The logic and signaling subsystem also interprets the commands received from the local user via the user interface subsystem (e.g. on/off hook, dialled numbers, etc.) and take the appropriate actions needed, and generates, or commands the generation, of control signals, messages and indications to the user through the user interface subsystem. The logic signaling system also controls the beam steering unit (if any) in the antenna subsystem, and monitors and tests all the other subsystems. In case of fault detection, it informs the user about the failure and take the appropriate measures needed to prevent harmful interference to the satellite network or other systems.

The power supply subsystem provides power to all other subsystems. The external voltage source to which this subsystem interfaces depends on the type of vehicle on which the MET is mounted (e.g. 12/24 Volts DC for land vehicles).

A standard receiver such as a GPS or a Loran-C receiver is also provided for the determination of the position of the vehicle. This information is used by the logic and signaling subsystem for beam steering (if used) or for applications such as position reporting. The position determination system is implemented externally to the MET and interfaced through a dedicated data port in the user interface subsystem.

The function of the Remote Monitor System is to continuously monitor the activity on each GC-S channel and to monitor the activity within the downlink L-band spectrum in the beam in which it is located. An RMS will be located in every beam carrying satellite network traffic. An RMS may be a stand alone station or collocated with the NCC or an FES. The RMS is controlled by the NOC and communicates via leased lines or the interstation signaling channels if collocated with an FES. The RMS detects anomalous conditions such as loss of signal, loss of frame sync, excessive BER, etc. on the GC-S channels and generates alarm reports which are transmitted to the NOC via the leased line interface. In addition, it monitors BER on any channel and power and frequency in any band as instructed by the NOC.

The primary functions of the System Test Stations (STS) is to provide commission testing capability for every channel unit in a FES and to provide readiness testing for the Off-Line NCC. The STS is collocated with and controlled by the NOC and will comprise one or more specifically instrumented METs. The STS provides a PSTN dial-up port for making terrestrial connections to FESs to perform MET to terrestrial end-to-end testing. The STS also provides a LAN interconnection to the NOC to provide access to operator consoles and peripheral equipment.

Advantageously, the MET combines three different features for the delivery and transmission of voice and data. These three features include: the ability to initiate and transmit a data call, the ability to initiate and transmit a facsimile digital call, and the ability to roam between satellite and terrestrial based wireless communication systems. The following documents, representing applicable transmission protocols, are hereby incorporated by reference: EIA/IS-41B Cellular Radio Telecommunications Inter-System Operations; EIA/TIA-553-1989 "Cellular System Mobile Station—Land Station Compatibility Standard"; EIA/TIA-557; EIA/IS-54B. A more detailed description of the MET is also provided in U.S. provisional patent application serial No. 60/002,464 filed on Aug. 15, 1995 to Ward et al., entitled "Improved Mobile Earth Terminal" incorporated herein by reference.

Overview of NET Radio Communication Protocol and Architecture

Some MSS system users have voice communication requirements that are not met by MTS and Mobile Radio Service (MRS). They need to communicate in a Closed User Group (CUG) arrangement that allows each member of the group to hear what any other user is saying. Each member of the group can also talk when needed. The system behaves like a radio multi-party line. Public services and law enforcement agencies are typical users of this service, which is normally provided by either traditional terrestrial radio networks or by the more recent trunked radio systems. These trunked systems, generally in the 800–900 MHz band, provide groups of end users with virtual private systems by assigning frequencies to CUGs on a demand basis. The Net Radio service is meant to be the satellite equivalent of terrestrial trunked systems ("trunking" for short), and could be pictured as a "Satellite Trunked Radio Service", or "Satellite Trunking".

The Net Radio service provides the capability described in the previous paragraph in a cost effective manner:

- as one shared satellite demand period circuit per CUG is utilized rather than one circuit per mobile user, the cost per minute of a group conversation would be much less expensive to the owner of the group, and
- as the call set-up time for one shared circuit per CUG compared to an MRS multi-user conference set-up time is likely to be more acceptable to a group end user/operator, who normally expects to be able to talk as soon as the handset/microphone is taken off-hook.

Figure 17:
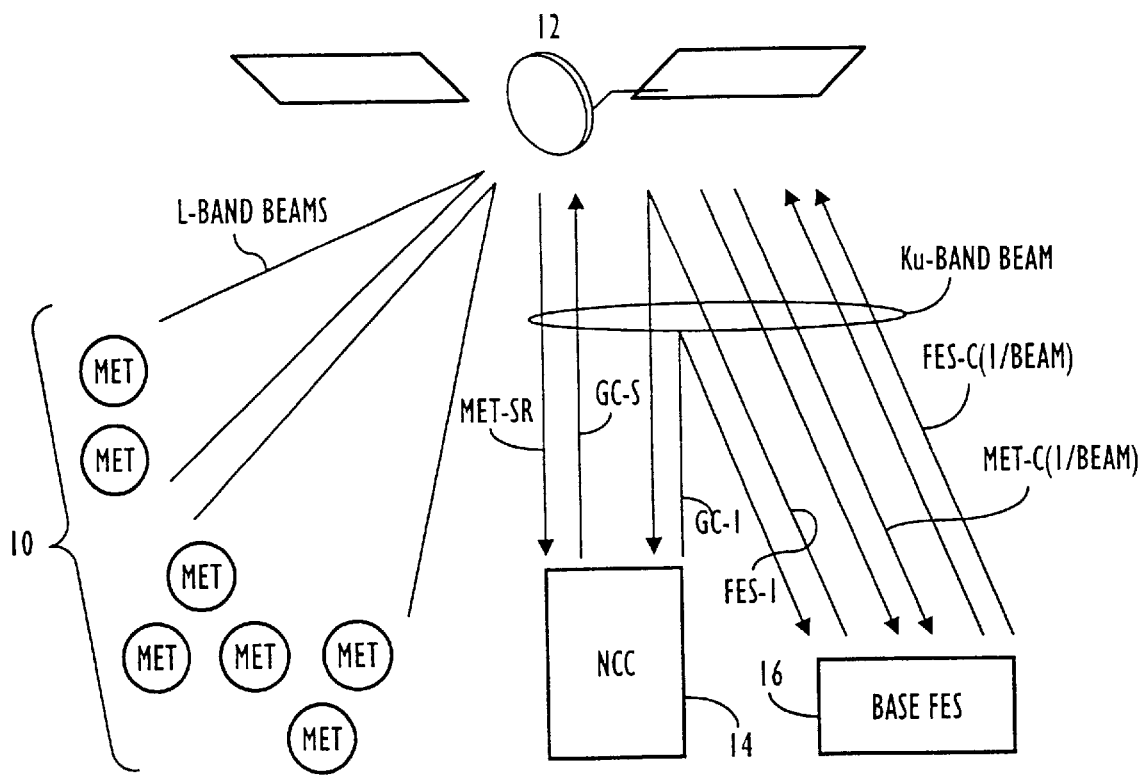
FIG. 17 illustrates the basic concept and elements involved in establishment of communications and control in the Net Radio system.

An overview of the MSS system with Net Radio service is illustrated in FIG. 17. FIG. 17 illustrates the basic concept and elements involved in establishment of communications and control in the Net Radio system. METs access the system via one or more L-band beams. Each beam contains one or more signaling channels for network control and call establishment and a number of communications channels for provision of Net Radio services to METs.

The L-band frequencies are translated to Ku-band frequencies by the satellite 12. The Network Control Center 14 is responsible for the real time allocation of channels to support Net Radio calls. The base Feederlink Earth Station 16 is responsible for re-transmission on the outbound channel of the MET transmissions received on the inbound channel, control of the Net Radio call, and interfacing the Net Radio call to terrestrial private networks.

Net Radio service is available to CUGs on subscription to MSS. A subscribing organization may comprise a number of METs grouped by their communication needs. A virtual private communication net is established for each of these groups or subgroups.

Figure 18:
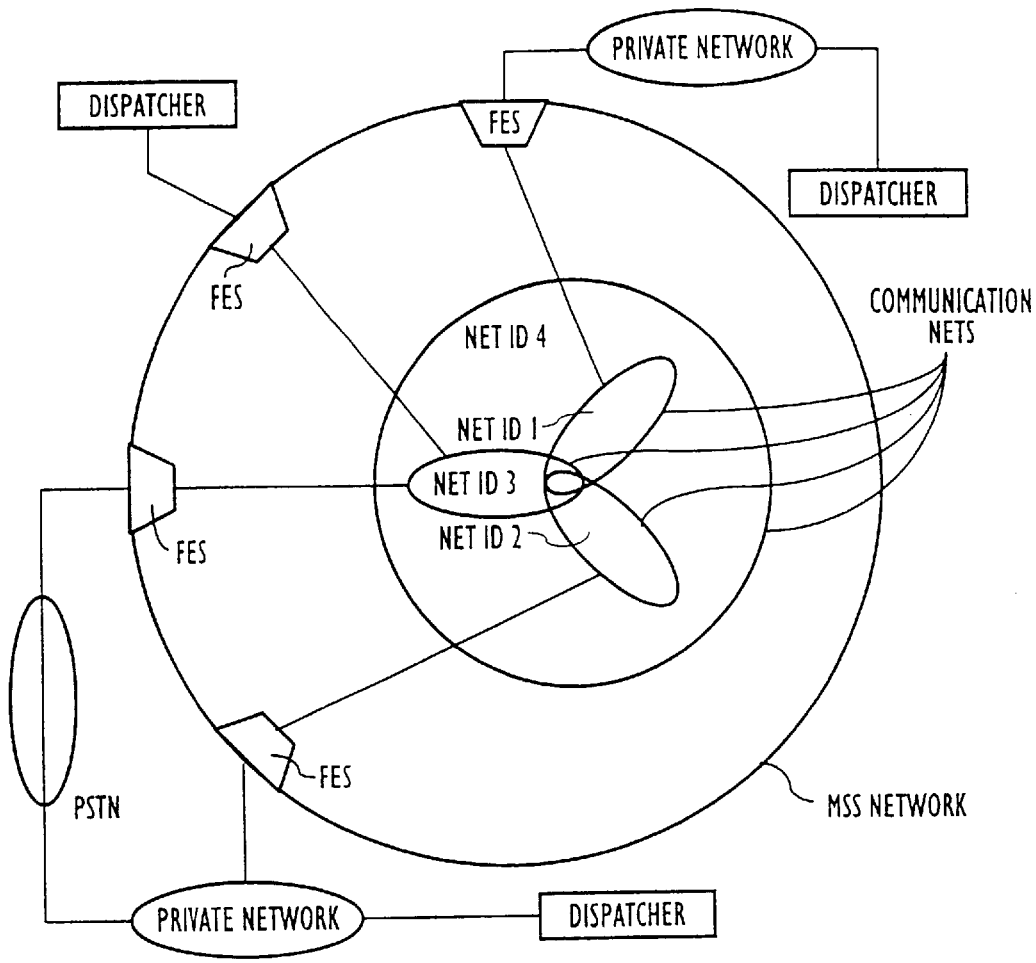
FIG. 18 is a diagram of an example of a Net Radio service subscribing organization with several communication nets.

The base FES 16 can interconnect the Net Radio call to terrestrial private networks so that a dispatcher located within the private network can participate in the conversation. A Dispatch facility may be directly connected to the base FES 16, or may use leased PSTN or dial-up access, or may use a Mobile Radio Service (MRSA) circuit. An example of a Net Radio service subscribing organization with several communication nets is depicted in FIG. 18.

The Net Radio MET operates in CUG and receives voice transmissions from all other MET users in the same CUG, and the base FES. The MET supports Net Radio service on a single demand period circuit per beam, which is shared by the entire CUG. The MET requiring communications will be given the Net ID for the net and since different nets may be necessary for different purposes, the MET may be given a number of different NET IDs. NET IDs may represent organizational groups such as fleets or sub-fleets. NET IDs may represent functional groups such as a command unit which draws on mobile users from more than one fleet or sub-fleet. NET IDs may represent geographic configurations such as an east or west area, or both.

A mobile user requests a channel on a Push-To-Talk (PTT) basis. The MET receives an assignment of demand period satellite resources consisting of an outbound channel frequency and an inbound channel frequency relevant to the particular NET ID (per defined CUG beam). The mobile user is alerted by a tone when the channel is available and the base FES manages the contention on the communications channel. Since the base FES retransmits the signal received from the mobile, the MET operates in a half duplex PTT mode, turning off the speaker while the microphone is engaged. When the user releases the PTT, the MET ceases transmission. On receipt of a release message from the base FES, the MET retunes to the signaling channel.

Figure 19A:
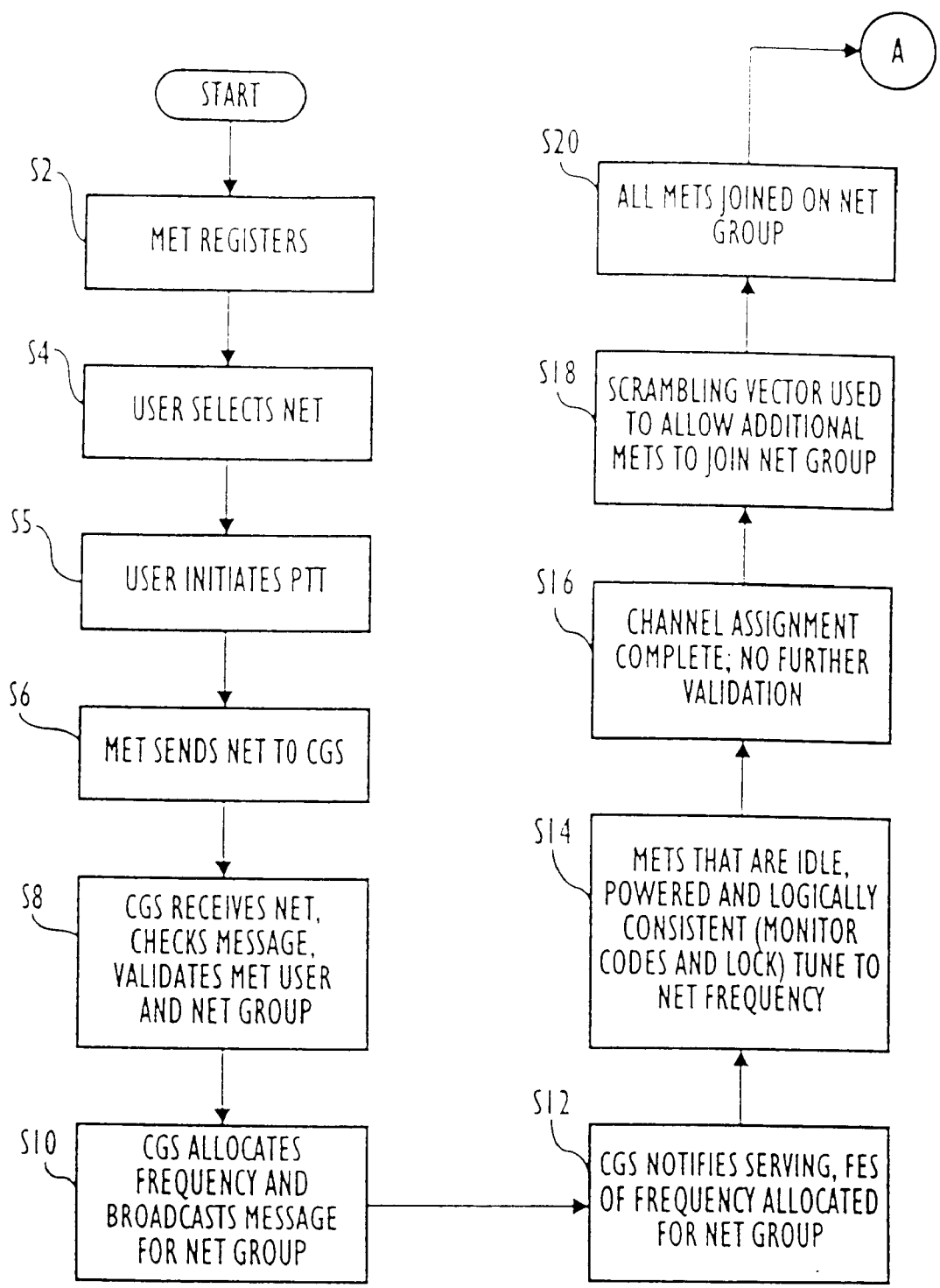
FIGS. 19A–19C are flowcharts of the overall process conducted by the various components in establishment of communications and control in the Net Radio system.
Figure 19B:
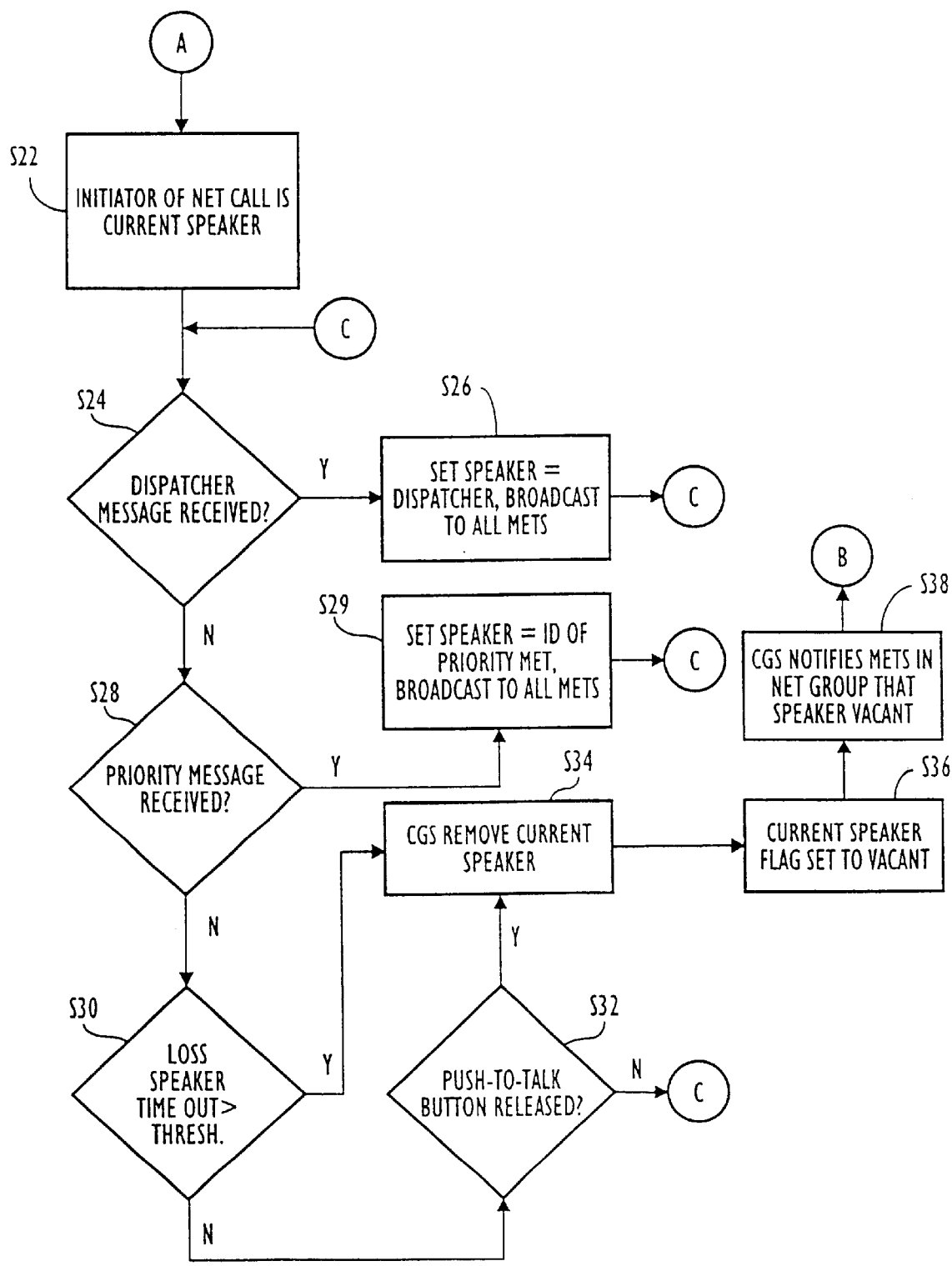
Figure 19C:
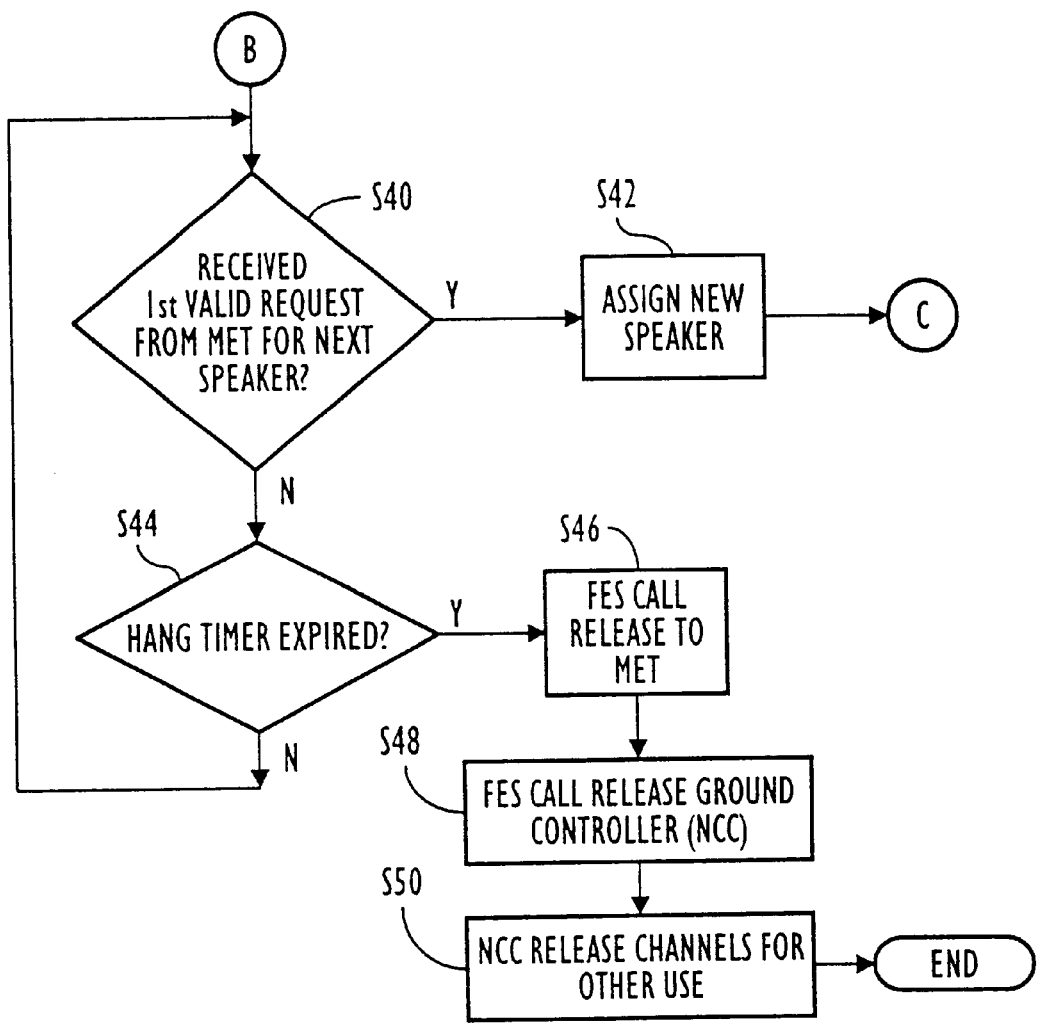

FIGS. 19A–19C are flowcharts of the overall process conducted by the various components in establishment of communications and control in the Net Radio system. In FIGS. 19A–19C, a mobile earth terminal registers in step S2 and the user of the mobile earth terminal selects a particular net to establish voice communication therewith in step S4. The user then activates the push-to-talk (PTT) button of the MET in step S5.

In step S6, the MET sends the net number to the communication ground segment. The communications ground segment receives the net number, checks the message for transmission errors, validates the specific MET user and also validates the requested net group in step S8. The communications ground segment allocates a specific frequency for the net group and broadcasts the message to the net group informing the net group of the allocated frequency in step S10.

The group controller in the communications ground segment will also send the net frequency to the feeder link earth station in step S12. In step S14, the METs that are idle, powered and logically consistent with respect to monitor codes and lock discussed below, will tune to the net frequency indicated by the communication ground segment. Channel assignment is thereupon completed and no further validation for the net group is performed in step S16. A scrambling vector is next used to permit additional METs to join the selected net group in step S18. All METs are assumed to have joined the net group in step S20. CGS will continue to broadcast NET group activation information at predetermined time intervals while the NET group is active.

The MET user which initiates the Net Radio call is considered to be the current speaker in step S22 permitting the initiator to communicate with the various MET users that have joined the net group. The MET monitors whether a dispatcher message has been received in step S24, and if so the current speaker is set to the dispatcher, and the communication is broadcast to all METs in the NET group in step S26. The MET also monitors receipt of the priority message in step S28, and if a priority message is received, sets the current speaker to the identifier of the priority MET, and the communication is broadcast to all METs in the NET group in step S29.

If no dispatcher message or priority message is received, the MET also monitors whether the current speaker is active in step S30. If speaker is active for the requisite period of time, the MET also determines whether the push-to-talk button has been released in step S32. If either the speaker is inactive for greater than a predetermined threshold period of time as determined in S30 or the push-to-talk button has been released as determined in step S32, the current speaker is removed by the communications ground segment in step S34, and the current speaker is set to vacant in step S36. The communication ground segment will then notify the METs in the net group that the speaker is vacant in step S38.

The METs will then be permitted to initiate a request to be the next current speaker. Upon receipt of the first valid request from a MET to be the next speaker in step S40, the communications ground segment will assign the new speaker to that particular MET in step S42. If, however, no request from a MET is made to be the next speaker, the communications ground segment will determine whether or not the hang timer has expired in step S44. If the hang timer has expired, the communications ground segment will release the call to the METs of the net group in step S46. The feeder link earth station will also initiate a call release to the ground controller in step S48 and the ground controller will release the frequency channel which was being used for the net group in step S50.

The MET supports the service categories for Net Radio listed in FIG. 20. MSS will support addressing methods that permit private communications between a mobile end-user and groups or sub-groups of end users, or an individual, where the individual is part of the same group. NET IDs are utilized, where a NET ID can represent either a group, sub-group or individual. MSS supports addressing methods that permit a mobile end user to engage in a private conversation with another mobile where the called mobile is part of the same virtual network as the calling mobile.

It should be noted that even on private mobile to mobile calls the PTT has to be used, as the two mobile units share the same satellite circuit. This is the main difference between MRS and Net Radio for mobile to mobile calls. The MET monitors the NET Radio Channel Assignment SUs (NRCHA_SU)s on the GC-S channel for those containing any of its stored NET IDs and, if not engaged in a Priority call or set-up procedure, responds to assignments in accordance with the current setting of the call monitoring.

The MET provides a User ID display for the purpose of displaying the NET ID the MET is currently tuned to, and the MET DN of the current speaker. The MET optionally displays an alpha-numeric display or user programmable label associated with a NET ID. When suitably equipped with a second receiver capable of continuously receiving the GC-S channel, the MET provides the user with notification of incoming calls, which the user may accept or reject.

This section provides the formats of several SUs used by the MET that are additional for Net Radio service. A separate section is generally provided for each channel type (GC-S, MET-SR, FES-C, MET-C).

GC-S Messages

The SUs transmitted on the GC-S signaling channel that are additional for Net Radio shall conform to the content and format specified in this section. The messages are required for Network Management and Call Control. FIG. 21 identifies the additional GC-S messages in each group.

1. The NID_SU is transmitted by the NCC to a MET on the GC-S channel. The NID_SU is used to download a NET ID assignment to a MET subscribing to Net Radio Service.

2. The NID_SU has the format illustrated in FIG. 22. The content of the NID-SU conforms to FIG. 23.

NET ID Attribute (NA)

The NA message is used to allocate and de-allocate NET IDs assigned to a MET, to change a METs Directory Number (DN), or to change the user defined characteristics of a NET ID assigned to a MET. The NA_SU has the format illustrated in FIG. 24. The content of the NA-SU conforms to FIG. 25.

Net Radio Channel Assignment (NRCHA)

The NRCHA message is used by the GC to broadcast the channel assignments to the METs for a Net Radio call. The SU is broadcast on all GC-S channels defined for the NET ID. The NRCHA_SU has the format illustrated in FIG. 26. The content of the NRCHA_SU conforms to FIG. 27. This message is rebroadcast on the GC-S channel every predetermined time interval (e.g., every 10 seconds) for the duration of activity of the NET communication.

MET-SR and MET-ST Messages

The SUs transmitted on the MET-SR and MET-ST signaling channel that are additional for Net Radio conform to the content and format specified in this section. The MET-SR messages are of the Call Control category. The MET-ST messages are of the Network Management Category. FIG. 28 identifies the messages.

MET Management Acknowledge (MMA)

The MMA_SU is used by METs to acknowledge NID and NA messages received from the GC. The MMA_SU has the format illustrated in FIG. 29. The content of the MMA_SU conforms to FIG. 30.

Net Radio Access Request (NRACR)

The NRACR_SU shall be used by METs to initiate Net Radio calls. The SU message has the format illustrated in FIG. 31. The content of the NRACR_SU conforms to FIG. 32.

FES-C Messages

The SUs transmitted on the FES-C signaling channel that are additional for Net Radio conform to the content and format specified in this section. The messages are of the Call Control category. FIG. 33 identifies the messages in each group.

Net Radio Call Release (NRCR)

The NRCR_SU shall be used to broadcast the NET ID to the METs during a Net Radio call and to indicate to the METs that the channel assignment for the Net Radio call is about to be released. The NRCR_SU has similar format and content as described above.

MET-C Messages

The SUs transmitted on the MET-C signaling channel that are additional for Net Radio conform to the content and format specified in this section. The messages are of the Call Control category.

Push-To-Talk (PTT)

The PTT_SU is used to request access to the inbound channel for a Net Radio call. The PTT_SU has the content conformed to FIG. 34. The Response SU shall be used by the MET to respond to FES-C Command SUs received on the FES-C channel. The Response SU shall have the same format and contents as specified for the FES-C Command SU. The Reserved field is reserved for future user defined requirements. The MET timing requirements for Net Radio service are illustrated in FIG. 35.

Push-to-Talk Operation

In the NET Radio service the operation of the PTT resembles terrestrial trunked radio systems. A PTT microphone/handset or the like is needed for Net Radio. Depressing the PTT switch when the current NET is unassigned shall result in the transmission of a NRACR_SU with the intent of requesting the assignment of a channel to the selected NET ID, subject to the availability of resources. Depressing the PTT switch while the selected NET ID is active and the speaker ID is vacant shall result in the transmission of a PTT_SU request on the communications channel followed by the transmission of voice frames in accordance with the standard MET call supervision procedures. If the MET has not selected a NET ID and the MET is not active in a NET Radio Call, then the MET ignores the PTT request.

Depressing of the PTT results in transmission of a PTT_SU only if the PTT is pressed after the speaker ID is equal to the vacant code or the METs DN. This will relieve congestion on the MET-C channel by adding a natural delay. If the MET user depresses the PTT before the speaker ID is vacant or matches the METs DN, the MET ignores the request.

Priority 1 service is granted to a MET, not based on the PTT, but only by activation of the Priority 1 Button. Activation of the Priority 1 Button shall result in a Priority 1 call. The user is given immediate access to the channel and retains it until he releases his PTT, is preempted by another Priority request generated by another MET user, or is preempted by a dispatcher PTT. If he wishes to make another Priority 1 transmission it shall be necessary to repeat the procedure.

The re-transmitted signal appears to the MET user as a delayed echo where the delay time is the double satellite link transmission delay time. For this reason, the speaker is disabled while the user is talking. The MET operates in half duplex from the user's viewpoint, but operates in full duplex over the satellite channels.

MSS Network Management assigns each communication net a Net Radio Identification (NET ID) number when the subscribing organization defines the net. A MET is also assigned a number of NET IDs to use. The MET stores in non-volatile RAM a GSI code for Net Radio service. The MET uses this GSI in selecting a GC-S channel while providing Net Radio service. The MET also stores a directory number (DN) with a maximum of 4 digits. The MET DN is downloaded to the MET at the completion of the commissioning process. If the MET receives an NA_SU with operator field equal to 3, the MET stores the specified DN as its new DN.

The MSS Network Management assigns a unique 16 bit access security code to each NET ID defined. The MET uses the NET access security code (NET ID ASK) to determine a standard scrambling vector used to initialize the channel unit scrambler for transmit and receive Net Radio calls. The MET determines the scrambling vector using as input:

the NET ID Access Security Key (ASK)

the transmit Frequency Assignment the Receive Frequency Assignment.

A Net Radio subscriber can customize the organization of communications nets. User defined NET ID attributes, a NET ID Tag number, and a Monitor code, are associated with the NET ID for this purpose. The Tag number is used to designate a selector position, or memory location to "tag" the NET ID to. When the MET operator sets the selector switch to a position, the MET uses the NET ID with the Tag number that corresponds to the selector position. This permits a CUG to setup all METs with the same selection positions for emergency nets for example.

The monitor codes are identified in FIG. 36 and are used to control which channel assignments the MET responds to. During a lull in the conversation where the hangtimer has expired (described below), the MET receives a channel assignment to a NET ID other than the one that was just tuned to. If the MET tunes to the new net, the operator may miss the next conversation on the previous net. At the same time, the monitor code permits the organization to setup nets which can reach entire fleets, or emergency teams even though all member METs have not selected that NET ID. In this case a monitor code for a required response is associated with the NET ID.

A Net Management System (NMS) permits a Net Radio subscribing organization to customize their communication nets by assigning NET IDs to METs, changing NET ID assignments, or modifying the user defined attributes of a NET ID assigned to a MET. These changes are made by contacting or interfacing with customer billing support system/personnel. The NMS enters the changes in the NOC customer configuration database. The NOC disseminates this information to the NCC, which downloads the changes to the MET "over the air" from the GC-S channel.

The MET uses acknowledged MGSP message pairs for Net Radio MET management. Upon receipt of a NID SU addressed to it, the MET de-encrypts the NET ID NRASK using the METs ASK and RTIN, and stores that NET ID and the NRASK associated with the NET ID in non-volatile memory. The MET then sends the MMA SU to the GC. The MET stores multiple NET IDs, and an ASK is stored with each NET ID.

Upon receipt of the NET ID Attribute SU, the MET performs operations indicated in the SU. The MET sends the MMA SU to the GC. The MET examines the Tag number contained in the NET ID Attribute SU (NA_SU) and, provided the Operator field equals a predetermined number, uses this number to determine the Tag position of the NET ID Selector switch to associate with that particular NET ID. For example, for a Tag number of zero the MET stores the NET ID in Tag location 00, which is reserved for Private Mode. If the Operator field in the NA_SU equals a predetermined number, for example 1, the MET erases the specified NET ID from memory.

The MET supports the following responses to the Monitor codes contained in the NA_SU. The MET provides a means for the user to select one of the NET IDs and "lock-on" to it. When so selected, the MET does not respond to the NET ID assignments with monitor code 00 or 01, but responds to assignments with 11 code.

The sequence of information exchanged between the MET, GC, and FES is for the purpose of demand period circuit assignment for Net Radio service, Private Mode service, Priority 1 service and Broadcast service calls. A call is described in five parts; channel assignment, call establishment, call monitoring, call supervision and call release. Channel assignment includes the network access procedures. Call establishment includes the procedures followed by the FES and the MET to initiate a Net Radio call. Call monitoring includes the procedures performed by the MET during a call. Call supervision includes procedures, performed by the FES, which provide contention resolution for MET access to the inbound channel. Call release includes those procedures used by the FES to terminate a call and release the demand period circuits.

METs place and accept voice calls to/from members of the closed user group and a private network connected at a base FES. The GC controls access to the satellite resources. The base FES provides the Net Radio function of re-transmitting the mobile transmissions so that all member METs participating in the call can hear both sides of the conversation. The FES provides access to the private network.

Figure 37:
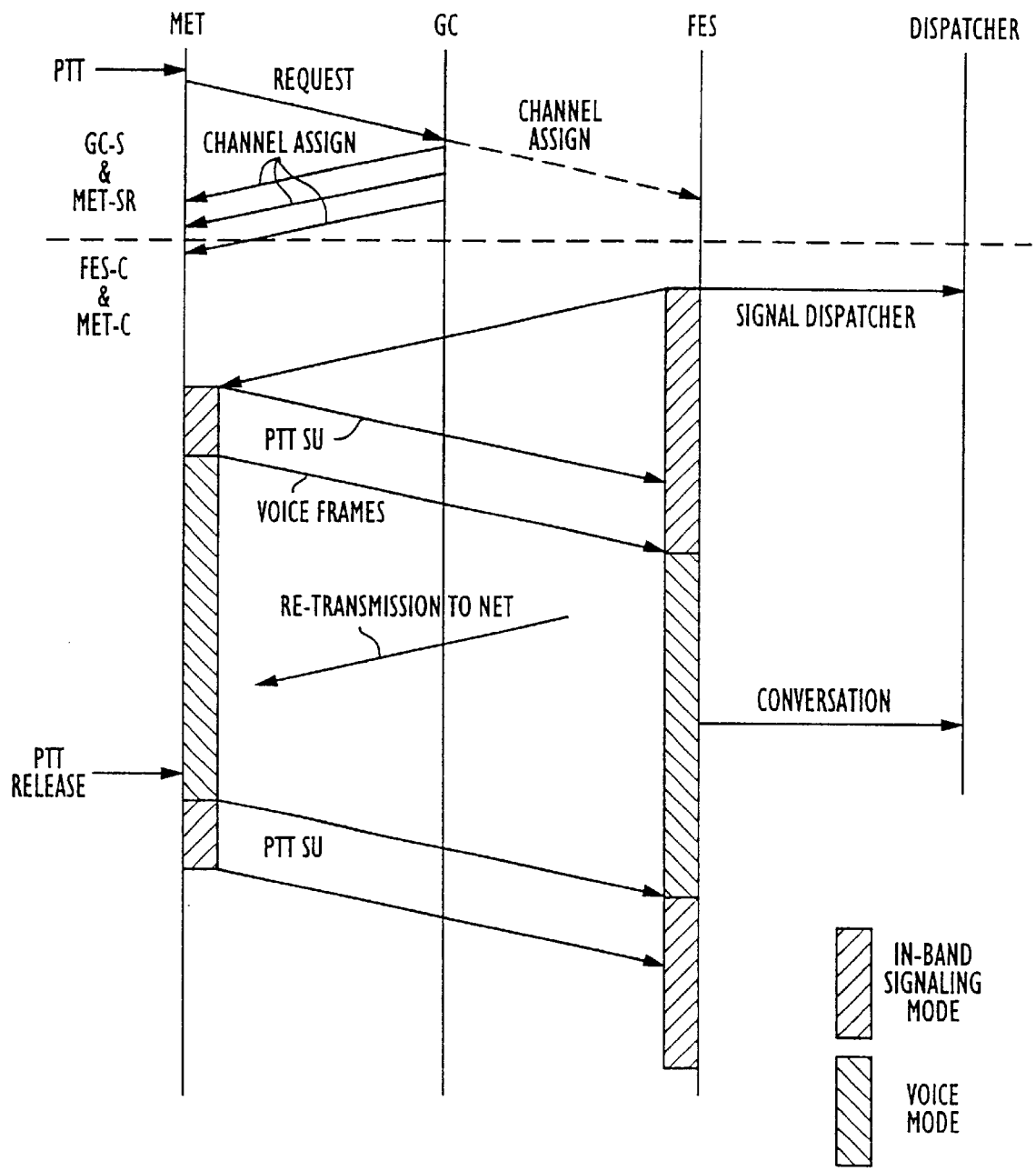
FIG. 37 is an illustration of a MET originated net radio call message flow.
Figure 38:
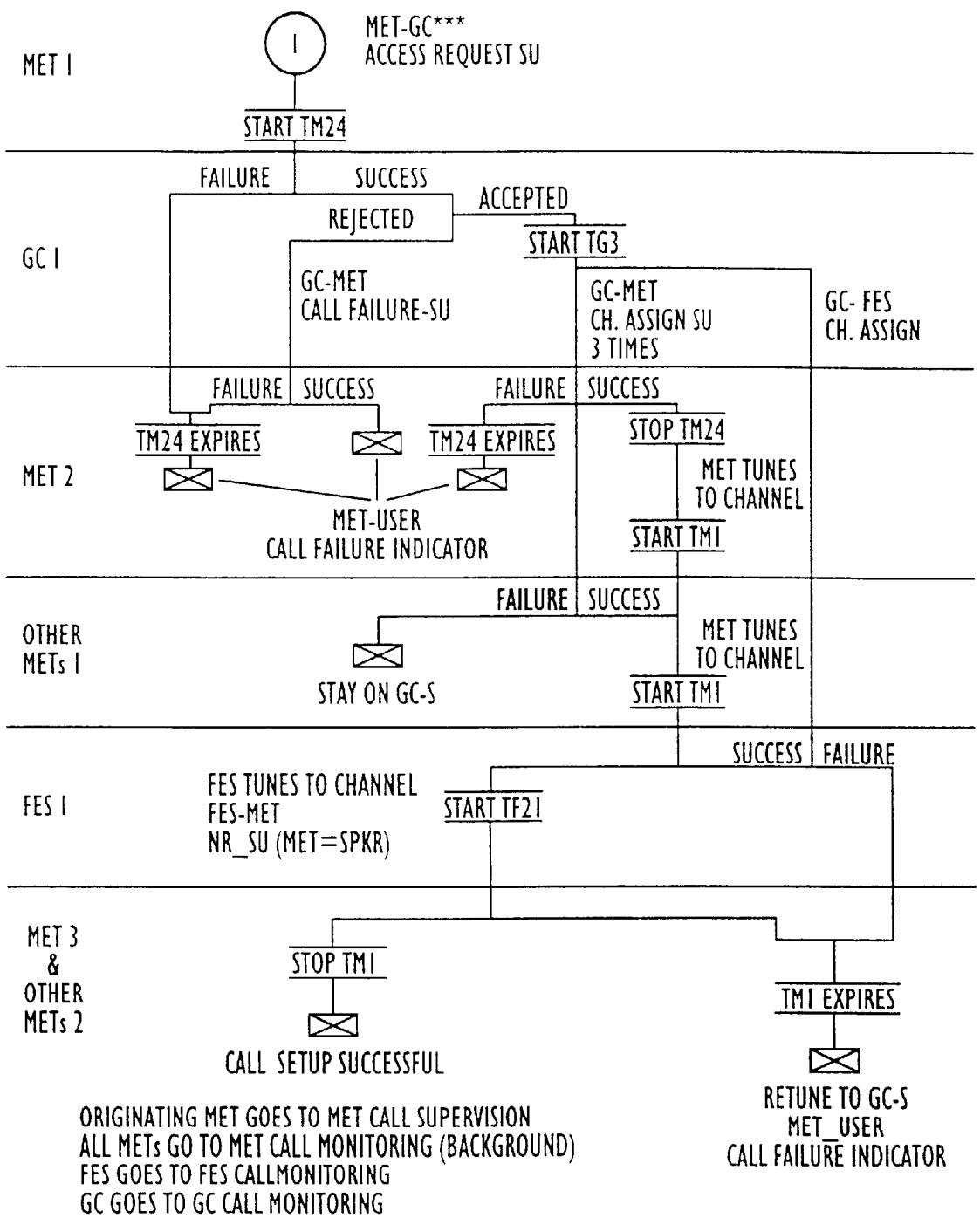
FIG. 38 is an illustration of a MET originated Net Radio call setup event tree.

MET originated Net Radio calls are established using the sequence of messages shown in FIG. 37. The protocol employed is as specified in the event tree in FIG. 38. Upon receiving a NRACR-SU, the GC verifies, based on the requesting MET RTIN that:

the MET is an operational Net Radio user;
the MET is authorized to originate a Net Radio call using the NET ID included in the NRACR_SU;
the required satellite capacity is available;
the call type in the NET ID data base file is for Net Radio service.

The GC verifies that the MET which requested the Net Radio call is in a beam included for the NET ID. If for any reason the call cannot be completed the GC sends a Call Failure SU using MGSP to the mobile terminal with the cause of failure indicated in the cause indication parameter.

Once the GC determines that the call can be completed it will select frequency assignments for a FES-C communication channel and a MET-C communication channel and format a NRCHA SU with the NET ID for the call, and the call type set to Net Radio service. The FES begins transmitting Net Radio SUs (NR_SU) using the In-band signaling mode. The NET ID and requesting MET Directory Number are included in the NR_SU. The FES starts the Lost Speaker timeout (Nominally, for example, 3.5 secs). The FES also connects the Net Radio call to a dispatcher, as appropriate.

Upon reception of the NRCHA_SU on the GC-S channel, the MET stops timer $T_M24$ and checks the call type. For Net Radio service call types, the MET tests the NET ID to determine what action to take. If the NET ID received matches one of the NET IDs assigned to the MET and if one of the following conditions is true, the MET accepts the Net Radio channel assignment and tunes to the assigned frequencies. If the NET ID does not match any NET ID assigned to the MET, or if none of the following case is true, then the MET ignores the NRCHA_SU and remains tuned to the GC-S channel.

Case 1: The Monitor code for the NET ID indicates a mandatory response.

Case 2: The Monitor code for the NET ID indicates a conditional response and the condition criteria permit the MET to respond to the assignment.

If the MET accepts the Net Radio channel assignment, then it alerts the user to the Net Radio call with appropriate audio and/or visual displays. The MET then starts timer $T_M1$. (Nominally, for example, 10 seconds). If timer $T_M24$ expires, or a call failure is received, the MET indicates call failure to the user. Upon acquisition of the FES-C channel, the MET stops timer $T_M1$ and decodes the NR_SU using the scrambling vector determined from the Access Security Key. If the MET has a Net Radio call request outstanding, it verifies the NET ID and confirms that its user's Directory Number matches the Speaker ID. If there is no outstanding request, the MET only verifies the NET ID.

The MET tests the Speaker ID and if it matches its DN, it generates an audio and/or visual alert to the user and enable transmission. If $T_M1$ expires or the NET ID received on the communications channel does not match the assigned NET ID, the MET indicates call failure to the user and retunes to the GC-S channel.

MET Call Monitoring Procedure

Figure 40:
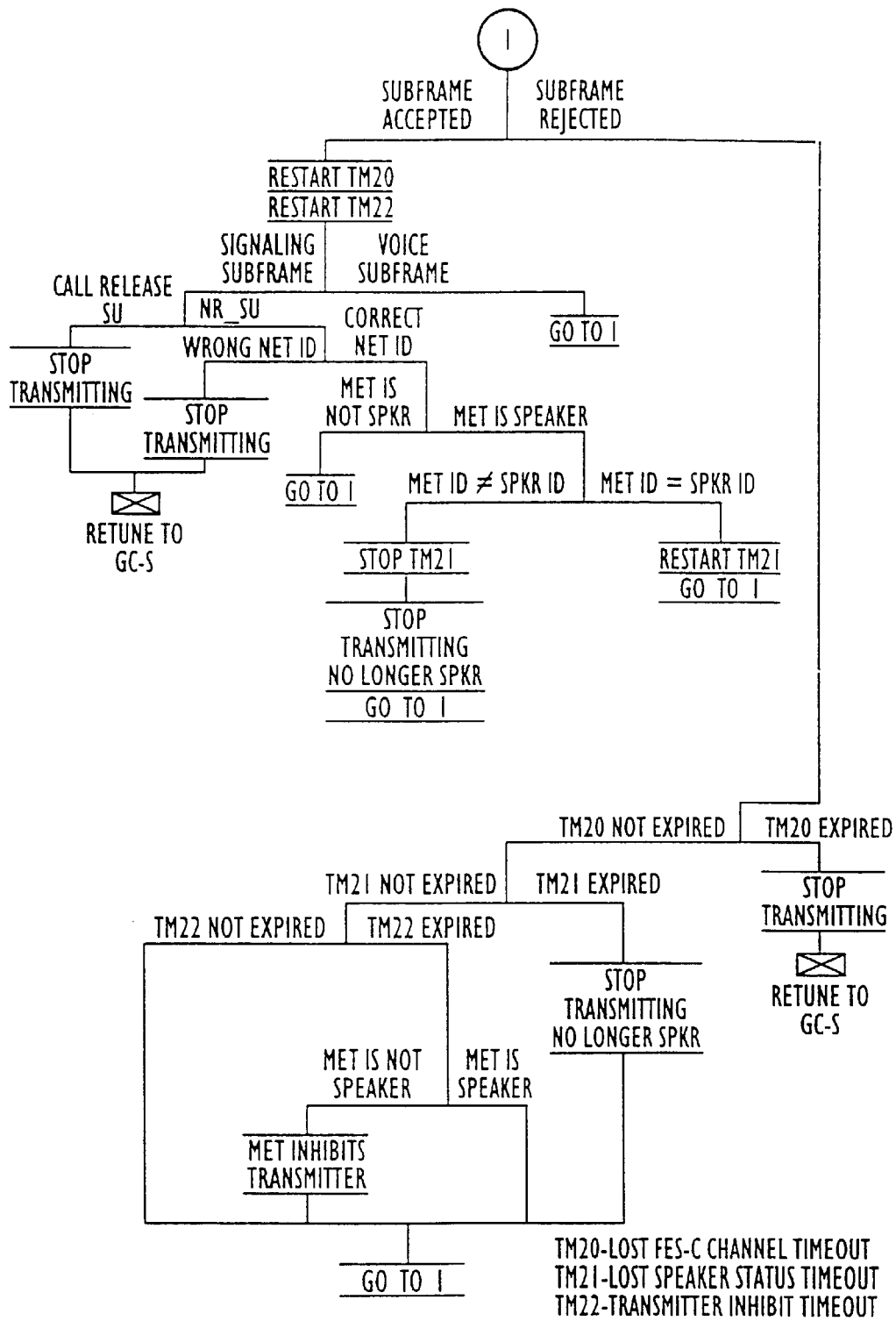
FIG. 40 is an illustration of a MET call monitoring event tree.

MET Call Monitoring defines the procedures followed by a MET while assigned to a Net radio call. The MET monitors the FES-C channel and operates timers on loss of the carrier. The procedures determine when to permit PTT requests, disable transmission, or re-tune to the GC-S channel. After accepting a NRCHA_SU and tuning to the assigned frequencies for a net radio call, a MET follows the call monitoring procedures specified herein and as shown in FIG. 40.

Upon accepting the NRCHA_SU the MET starts timers $T_M20$, the Lost FES-C channel timeout (Nominally, for example, 10 secs), and $T_M22$, the Transmit Inhibit timeout (1 superframe). The MET monitors the FES-C channel and generally only enables transmission if all the following conditions are true:

the MET is in receipt of the FES-C channel, indicated when timers $T_M20$, and $T_M22$ are not expired;

the MET is a member of the NET ID;

the Speaker ID is the vacant ID or is equal to the MET user's DN;

the user initiates PTT signaling.

The transmitting MET continues transmitting provided all of the following conditions are true:

the MET is in receipt of the FES-C channel, indicated when timers $T_M20$, and $T_M21$ are not expired. ($T_M21$ is defined in MET Call Supervision Procedure below);

the current speaker as saved by the MET (see below) matches the MET's DN; and the PTT remains active.

The MET tests for a valid subframe at each FES-C subframe interval. When the MET receives a valid subframe, the MET restarts timers $T_M20$ and $T_M22$. A valid subframe is a voice subframe or a subframe having a message type recognized by the MET as a Net Radio message type and no errors are detected in the packet. If the subframe received is a voice frame, or a NR_SU where the Speaker ID matches the MET's DN, (i.e. the MET is confirmed as the "speaker"), the MET restarts timer $T_M21$, "loss of speaker status timeout".

If the subframe received is a NR_SU, the MET tests the NET ID. If the NET ID is not valid for the MET, the MET shall retune to the GC-S channel. If the NET ID is valid, the MET saves the Speaker ID as the current speaker. If the Speaker ID matches the MET's DN, the MET confirms, or maintains it's status as the "speaker". If the Speaker ID does not match the MET's DN, the MET ceases transmitting, if it was transmitting, and negates it's status as the speaker.

If the subframe received is a Net Radio Call Release (NRCR) SU, the MET ceases transmitting and retunes to the GC-S channel. On expiration of timer $T_M22$, the MET checks its speaker status. If the MET has the speaker status it ignores the timeout and continues transmitting. If the MET's speaker status is negated, it inhibits further PTT requests until all of the conditions listed above to enable transmission are satisfied.

On expiration of timer $T_M21$, the MET stops transmitting, and negates or clears it's status as the current speaker. The MET indicates to the user that transmission has ceased. The MET remains on the assigned Net Radio channel. On expiration of timer $T_M20$, the MET retunes to the GC-S channel.

MET Call Supervision Procedure

Figure 41:
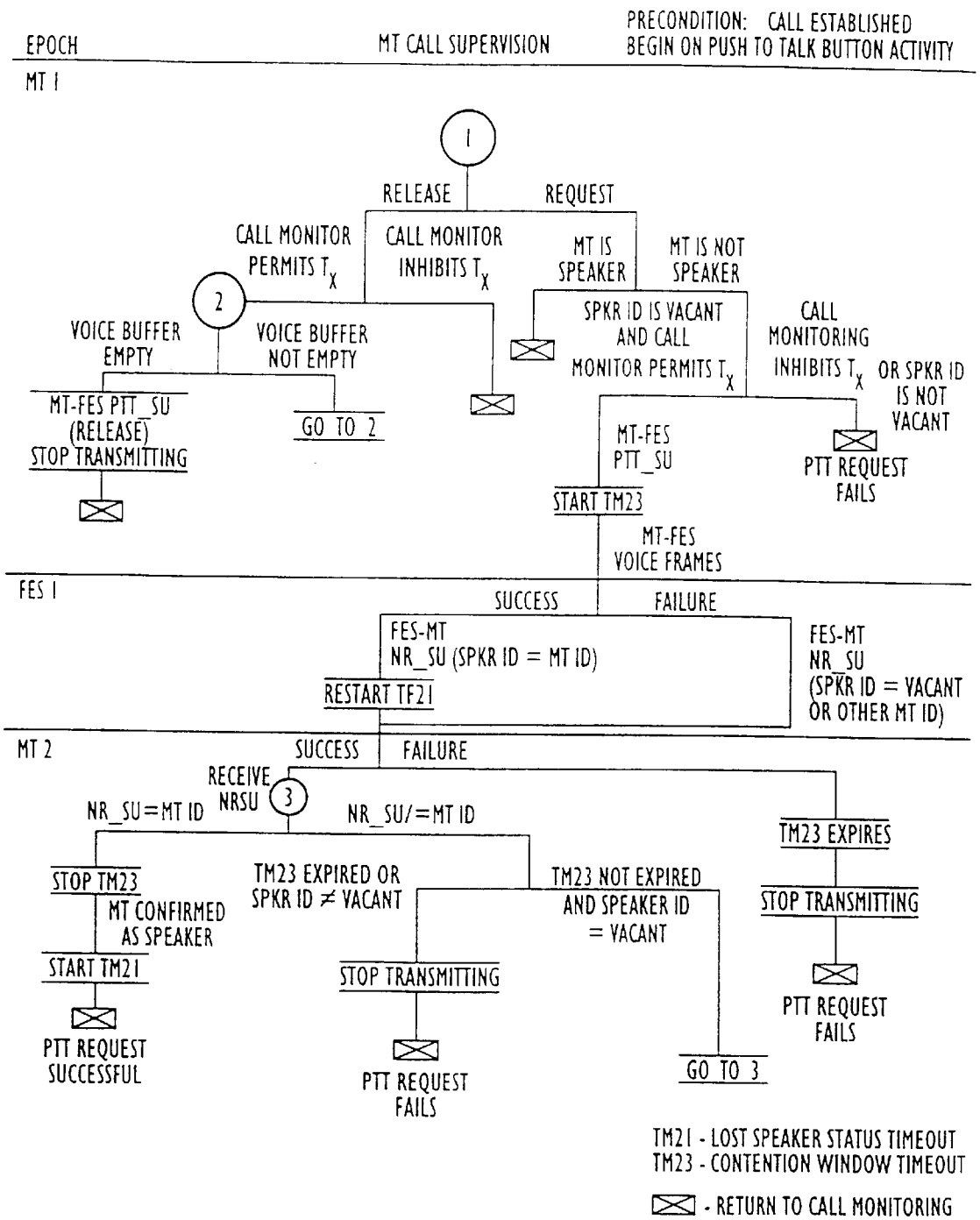
FIG. 41 is an illustration of a MET call supervision event tree.

MET call supervision defines the procedures followed by a MET when the PTT button is pressed or released. The procedures, together with the FES Net Radio procedures provide contention resolution of the inbound channel. The MET accesses the MET-C channel for transmission when the PTT is activated by the user in accordance with the MET call monitoring specified above and the call supervision specified herein, and by the event tree given in FIG. 41.

Figure 42:
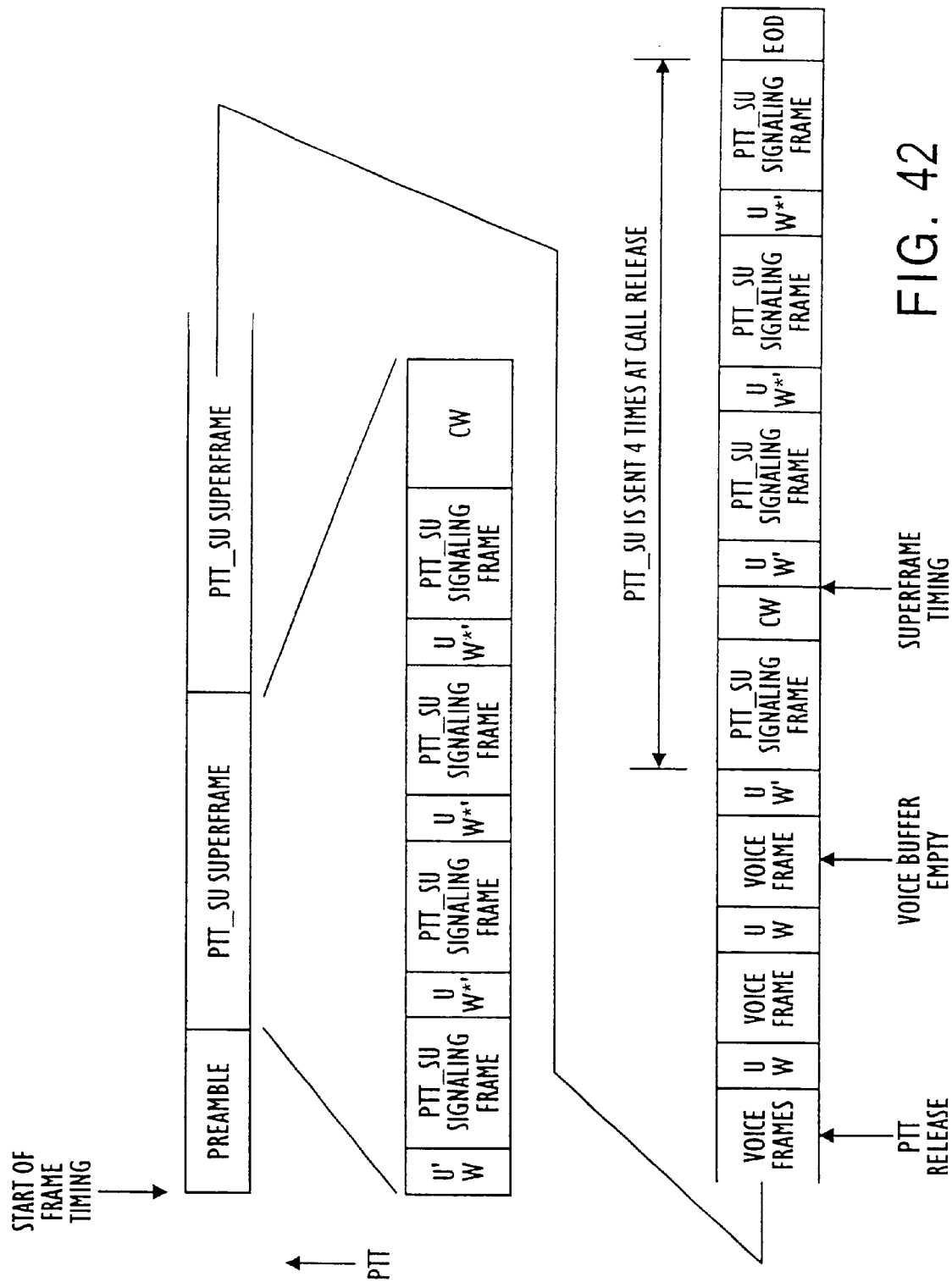
FIG. 42 is an illustration of a MET PTT frame structure.

To access the MET-C channel, the MET transmits a PTT_SU using the In-band signaling mode for one frame as shown in FIG. 42 until an NR_SU is received with the Speaker ID not equal to the vacant code. The PTT_SU includes the MET user's DN and the NET ID. The MET then switches to voice mode and starts timer $T_M23$, the contention window timer (Nominally, for example, 1 second).

The MET continues transmitting on the MET-C channel and monitoring the FES-C channel. On detection of In-band signaling subframes with NR_SUs, the MET tests the Speaker ID. If it matches the MET's DN, the MET saves the Speaker ID as the current speaker. The MET is then confirmed as the speaker. If the Speaker ID does not match the MET's DN, the MET ceases transmitting. The MET saves the Speaker ID as the current speaker. The MET negates or clears its speaker status.

If the MET detects voice mode subframes on the FES-C channel instead of In-band signaling subframes, it assumes that these voice frames are either its own, or the dispatcher's and that the Speaker's ID SU was missed. In this case the MET continues transmitting. An NR-SU is sent to the MET in the next superframe. If an NR_SU with the MET's DN as speaker ID is not received before the expiration of $T_M23$, the MET ceases transmitting. The MET then negates its speaker status.

When the MET is confirmed as the speaker, the MET starts timer $T_M21$, the Lost Speaker Status timeout (Nominally, for example, 3.5 secs). In addition the MET disables passing voice output to either the extended speaker or the handset speaker. The MET continuously transmits while the PTT button is active and conditions specified in the MET call monitoring procedures are met.

Figure 43A:
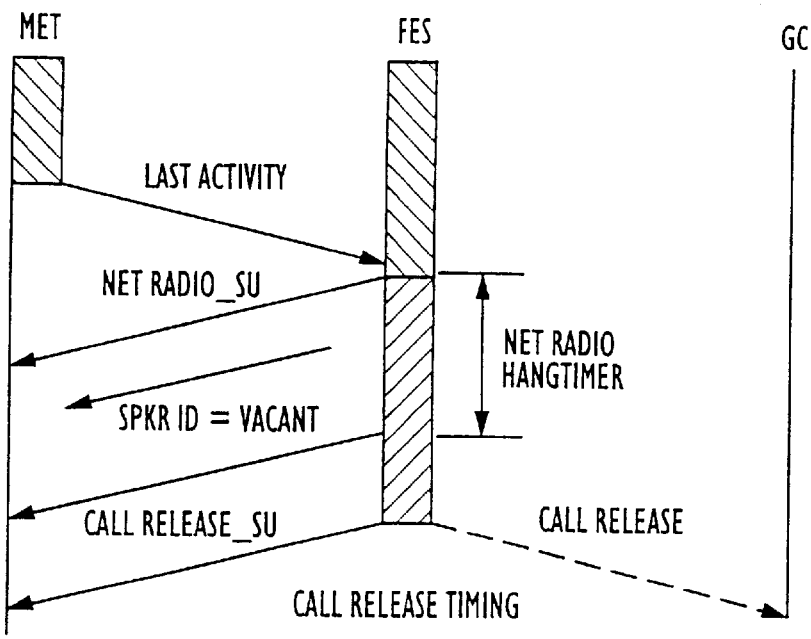
FIG. 43 is an illustration of a Net Radio call release message flow and frame structure.
Figure 43B:
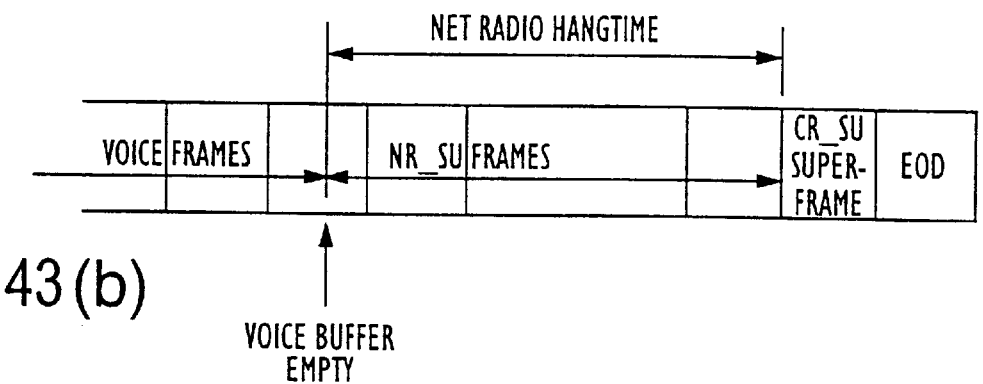
Figure 43C:
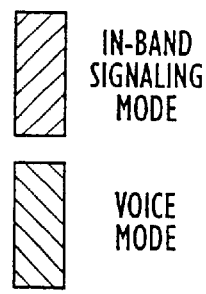

When the user releases the PTT button and the MET has been transmitting, the MET finishes transmitting any voice subframes remaining in the buffer, and then switches to In-Band signaling mode as shown in FIGS. 42 and 43. The MET transmits one frame using the In-band Signaling mode consisting of PTT_SUs. The PTT_SU identifies the MET user's DN and the NET ID and the PTT Release Code. The MET then ceases transmitting, but remains tuned to the net radio frequencies, and continues to monitor the FES-C channel for the NET ID in accordance with the MET call monitoring procedures. After the user releases the push to talk, the MET waits for a time equal to or greater than the delay time before enabling the loudspeaker again.

Call Release

Figure 44:
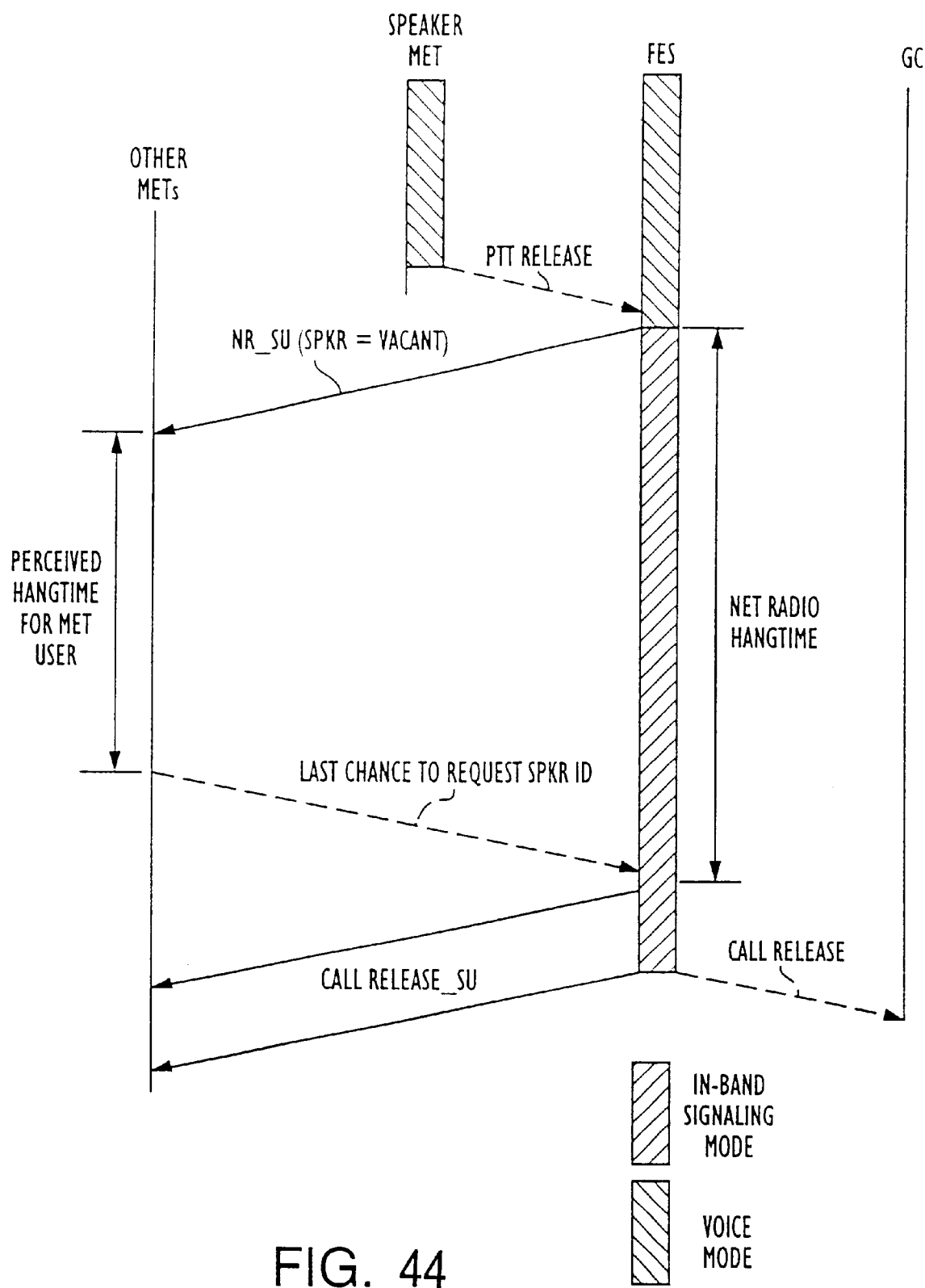
FIG. 44 is an illustration of a perceived hangtimer for MET users.

Upon receiving the Net Radio Call Release SU, the MET tuned to the FES-C channel retunes to the GC-S channel and deactivates the Net Radio call indicator to the user. The FES operates a hangtimer. When no activity has occurred for the hangtime duration, the FES releases the call. The hangtimer, perceived by a MET user is shown in FIG. 44.

Private Mode Service Call Procedures

The Network Control System procedures for MET originated Private Mode Service calls allow mobile CUG members to originate a call using a Net Radio channel configuration for the purpose of private communications with another member of the CUG. More than one NRC may be configured at a FES using the same NET ID. This permits more than one Private Mode call to be in progress at the same time.

Channel Assignment

Figure 45:
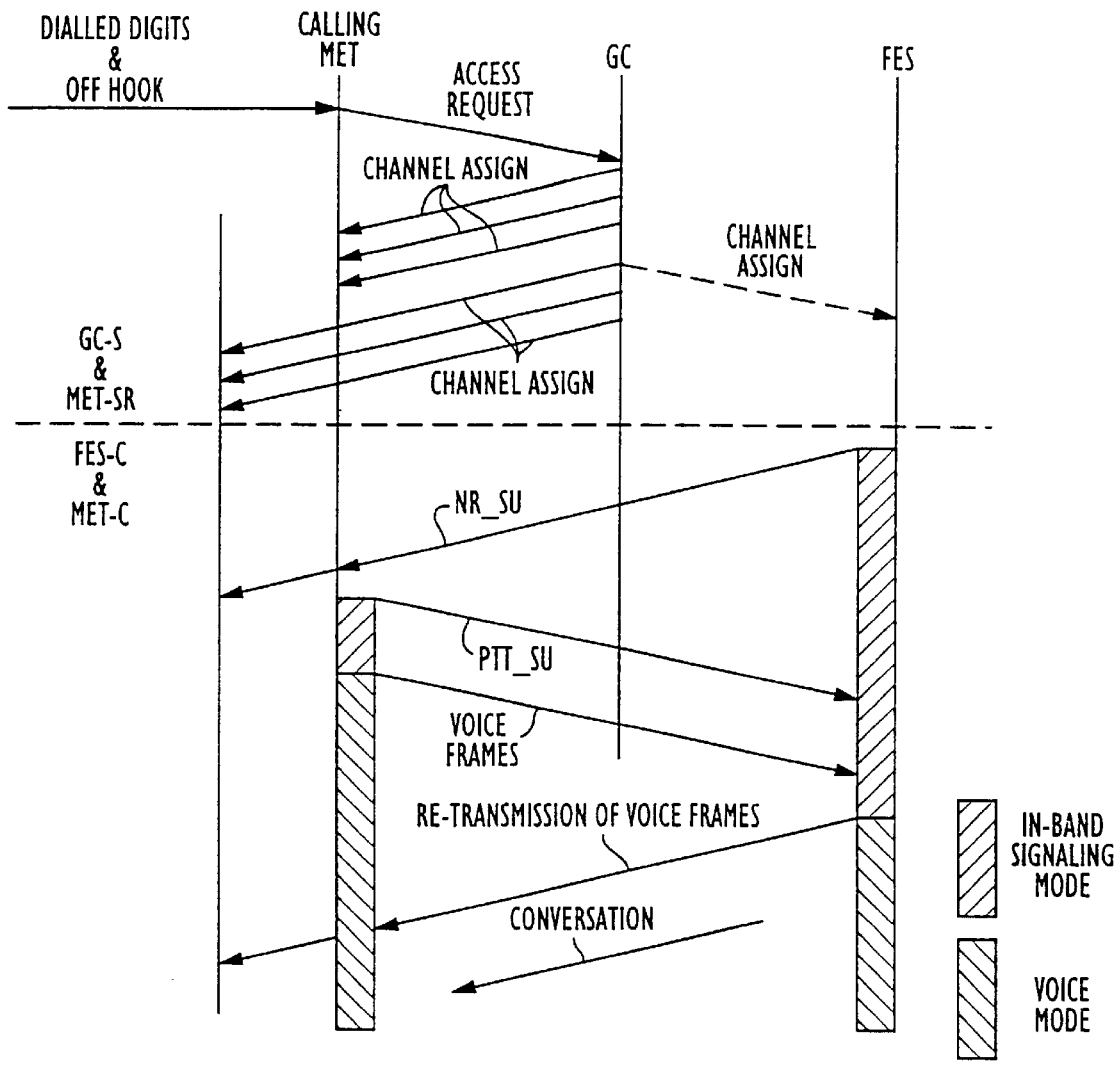
FIG. 45 is an illustration of a MET originated private mode call setup message flow.

MET originated Private Mode service calls are established using the sequence of messages shown in FIG. 45. The protocol employed is as specified for Net Radio service in the event tree given in FIG. 38. On selection of Private Mode service, and on receipt of dialed digits, a MET, suitably equipped for Private Mode service formats and sends a Net Radio Access Request SU using MGSP on the MET-SR channel. The NRACR_SU includes the NET ID private mode with the called DN. If no NET ID with a NET ID Tag number of '00 hex' has been assigned to the MET, the MET indicates call failure to the operator.

Upon receipt of the NRACR_SU the GC performs all the verifications as specified for MET originated Net Radio service calls. Once the GC determines that the call can be completed it selects the frequency assignments required for the NET ID and formats a NRCHA_SU with the call type field set for Private Mode and the MET FTIN number of the calling MET in place of the NET ID. The GC sends the assignment SU three times as for Net Radio service on the GC-S channel.

The GC formats a second Private Mode call type NRCHA_SU using the called MET FTIN number in place of the NET ID. The GC sends this assignment SU three times as for Net Radio service on the GC-S channels required for the NET ID. In the event there are no NRC's available to handle the call, the GC sends a Call Failure Message with no resources as the cause indication to the requesting MET. Upon receipt of the NRCHA_SU with the Private Mode call type, a MET compares it's FTIN with the FTIN in the NUCHA_SU. If the numbers match, the MET tunes to the assigned frequencies. The MET then proceeds as for Net Radio service calls.

Call Establishment, Call Monitoring, Call Supervision and Call Release

The MET uses the call establishment, call monitoring, call supervision and call release procedures as specified for Net Radio service calls.

Priority 1 Service Call Procedures

Figure 46:
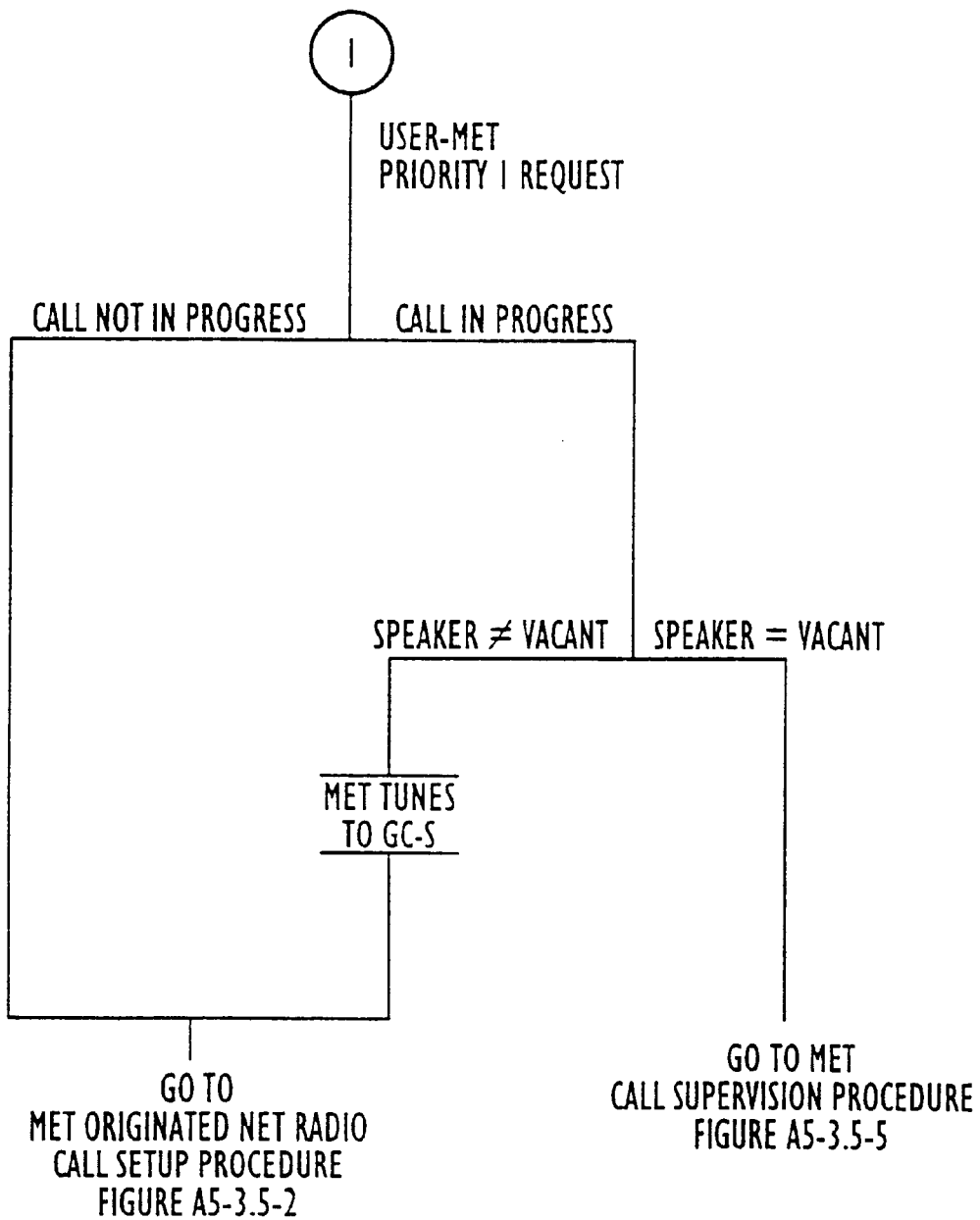
FIG. 46 is an illustration of a MET Priority 1 event tree.

The MET shall follow the Priority 1 procedures as specified in this section and as shown by the event tree given in FIG. 46. The MET supports a Priority One mode of operation called the normal mode.

Priority One Normal Operation

When the MET user initiates Priority 1 service, the MET takes one of three actions based on the state of the MET at the time. The three states are:

Case 1: Net radio call is not in progress.
    Case 2: Net Radio call in progress and the current Speaker ID is equal to the vacant code.
    Case 3: Net Radio call in progress and the current Speaker ID is not the vacant code.

Case 1

In the case where the Net Radio call is not in progress and the MET user has selected a Net ID, the MET originates the Net Radio Call. The MET appends the Priority 1 code to the Net ID in the NRACR_SU. The Net ID included in the NRACR_SU is that which the MET user has selected. The MET then proceeds with call establishment, call monitoring, call supervision, and call release as for MET originated Net Radio service.

Case 2

In this case the MET responds as in case 1, except that the NET ID included in the NRACR_SU is retrieved from the NVRAM location specifically tagged by the MET user for this situation.

Case 3

In the case where the Net Radio call is in progress and the speaker ID is not the vacant code and not equal to the MET's DN, the MET tunes to the GC-S channel and sends a NRACR_SU with the Priority 1 code appended to the Net ID as for Case 1.

In the case where the Net Radio call is in progress and the speaker ID is not the vacant code but is equal to the MET's DN, the MET sends a PTT_SU request with the Priority One code appended.

Upon receipt of the NRACR_SU, the GC follows the call setup procedures as for MET originated Net Radio Calls. The GC rebroadcasts the NRCHA_SU on all GC-S channels identified in the Net ID or that are active (per dynamic beam allocation). The GC sends the NRCHA_SU three times in three consecutive superframes as for Net Radio Service channel assignments. The GC sets the Priority 1 code and includes the call identifier of the established call in the GC-I channel assignment message to the FES.

The requesting MET tunes to the assigned frequencies and proceeds as for MET originated Net Radio calls. The MET presently transmitting on the MET-C channel detects that the speaker ID no longer matches its DN and ceases transmitting in accordance with the MET call monitoring procedures. The Priority 1 requesting MET then proceeds as for Case 1.

Priority One Default Operations

When the MET user initiates Priority One Default service via the Priority One button, the MET expediently performs the following actions:

The MET tunes to the GC-S channel and sends a NRACR_SU with the Priority One code appended on the corresponding MET_SR channel.

The MET retrieves the NET ID included in the NRACR_SU from a NVRAM location specifically tagged by the MET user for this situation.

Upon receipt of the NRACR_SU, the GC follows the call setup procedures as for MET originated Net Radio Calls. The GC rebroadcasts the NRCHA_SU on all GC-S channels identified in the Net ID or that are active (per dynamic beam allocation). The GC sends the NRCHA_SU three times in three consecutive superframes as for Net Radio Service channel assignments.

The GC sets the Priority 1 code and includes the call identifier of the established call in the GC-I channel assignment message to the FES.

The requesting MET tunes to the assigned frequencies and proceeds as for MET originated Net Radio calls. If the Net ID selected for Priority One default operations is in use and the Speaker ID is not vacant, the MET transmitting on the MET-C channel detects that the Speaker ID no longer matches its DN and ceases transmitting in accordance with MET call monitoring procedures.

The MET proceeds with call establishment, call monitoring, call supervision and call release as for MET originated Net Radio service.

NET Radio Security Generation and Verification Process

The MET beneficially includes the option of providing the service with a verification process that utilizes a security code. The security code NET ID ASK is stored in the MET memory as encrypted. The MET recovers or derives the Net ID ASK from the encrypted Net ID ASK using the following process illustrated in FIG. 47.

The 64-bit MET ASK and the concatenation of the 24 bit MET electronic serial number (ESN) and 10 "A" hexadecimal fill digits to form a 64-bit word are input into the DES encryption process. Both the MET ASK and the DES encryption process are described in detail in copending patent applications entitled "Fraud Detection and User Validation System for Mobile Earth Terminal Communication Device," to William R. Tisdale and C. Edward Sigler, application Ser. No. 08/565,036 filed on Nov. 30, 1995, and application Ser. No. 08/601,912 filed on Feb. 15, 1996, both of which are incorporated herein by reference. A description is also provided hereinafter.

For the basic fraud detection and user validation system, the following process is implemented. A MET authenticates its identity upon each commissioning event, performance verification event, and call setup event. The authentication process is based upon the use of an encryption function and a MET Access Security Key (ASK) to form an authorization code (the Access Security Check Field) from a random variable (the MET transmit and receive frequency assignments) at the beginning of each event.

Figure 48:
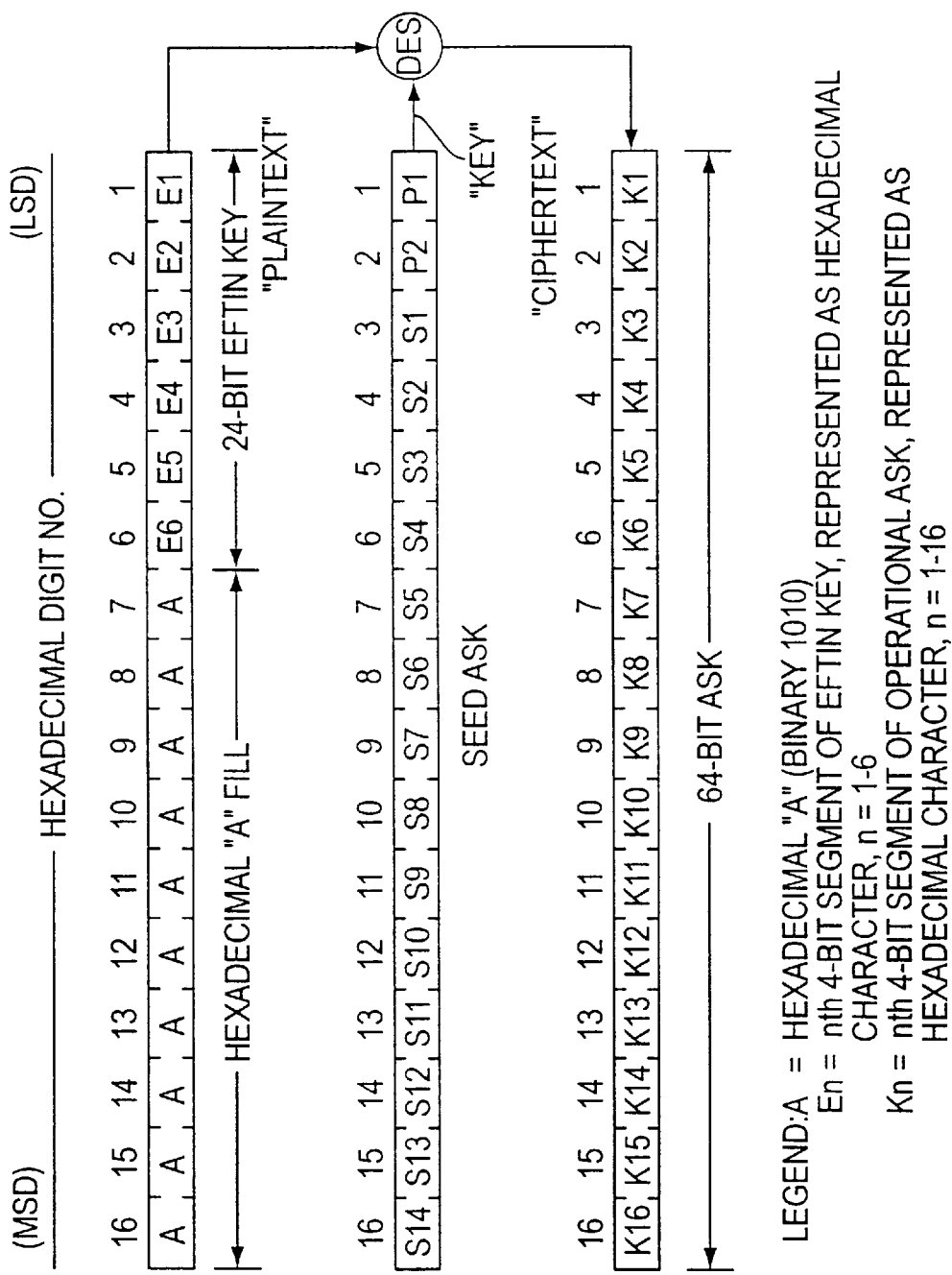
FIG. 48 is a diagram of the Authentication Security Key generation process.

The encryption algorithm is preferably the Data Encryption Standard (DES) defined by ANSI X3.92-1981/R1987, used in the Electronic Codebook Mode (ECB) and is built into both the MET and the NCC. The ASK for each MET is generated by the MSS system operator. FIG. 48 illustrates the ASK generation process using a Seed ASK (SASK) provided by the MSS system operator, and a random number (EFTIN). The CRC-8 parity check algorithm is used to protect the integrity of the ASK. The parity check is generated over all of the hexadecimal digits comprising the ASK. The NOC provides a logically separate master database for the METID numbers (the MET electronic serial numbers) and the MET ASKs. The NCCs maintain slave ASK databases, and also provide protection from access by NCC processing functions other than the legitimate authorization processes.

The MET SASK is supplied to the MET user prior to commissioning. The MET provides a "user friendly" means, using alphanumeric prompted, audible tones, and key strokes, for the user to enter the SASK into the MET and verify its correctness. The MET verifies the correctness of the SASK via the CRC-B parity check. The MET uses the process detailed in FIG. 48 to generate the ASK from the inputted SASK. The MET stores the ASK in NVRAM. There is no means provided to read out or display the ASK once it is entered. Any attempted access to the ASK will preferably render the MET inoperable. It is possible, however, to enter or reenter the SASK at will.

Figure 49:
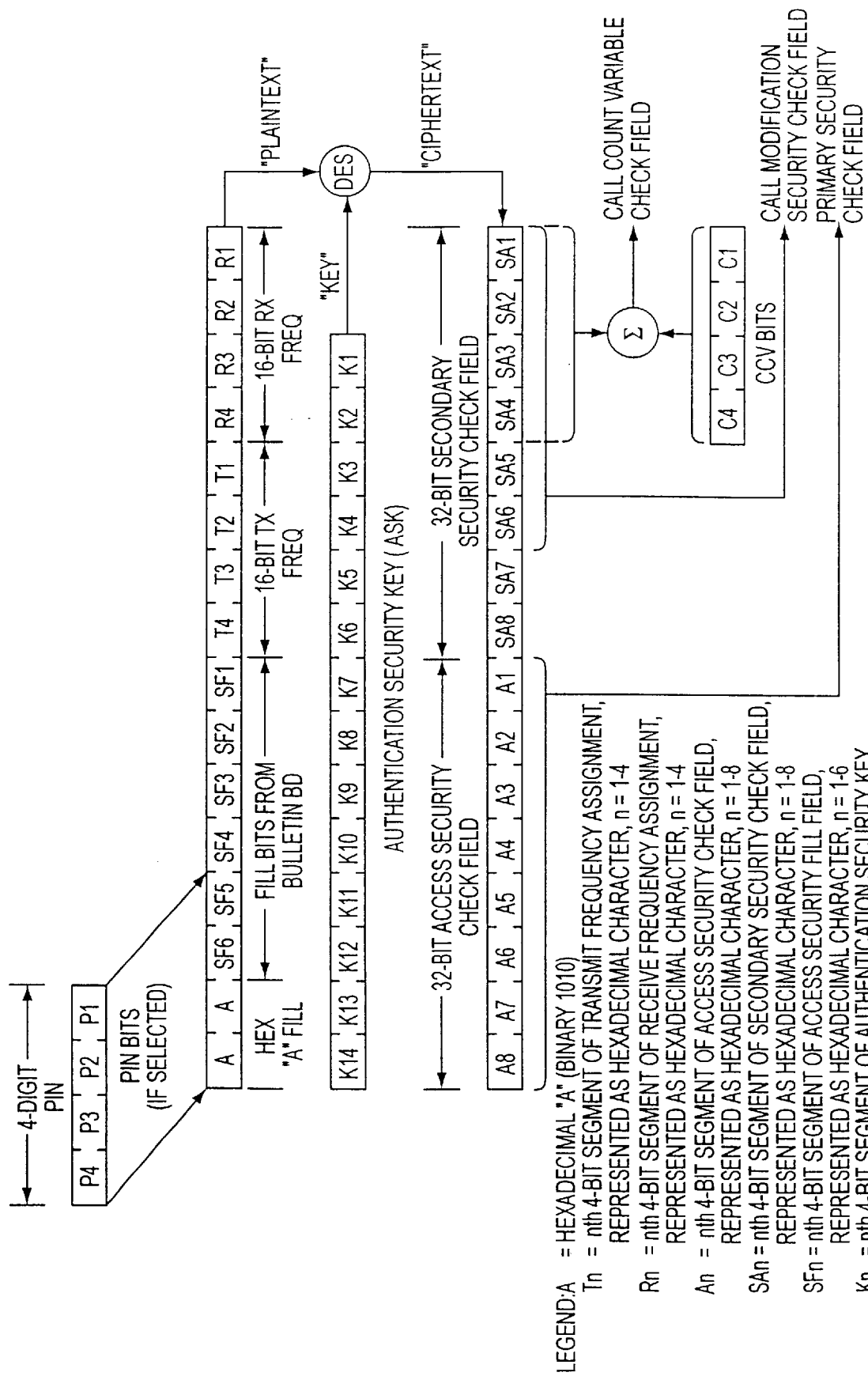
FIG. 49 is a diagram of the Access Security Check Field and Secondary Security Check Field generation process.

For either MET originated or terrestrial network originated calls, the NCC compute a 64-bit cipher text block by using the ASK stored in its secure database and the DES algorithm in the ECB mode to encode a 64-bit input variable comprised of the 16-bit receive frequency assignment in the least significant bit positions, the 16-bit transmit frequency assignment in the next least significant positions, the 24 Access Security Fill Bits, and the 8 most significant positions filled with the hexadecimal "A" (1010) characters. The most significant 32 bits of the resulting cipher text block are designated the Access Security Check Field (ASCF). The least significant 32 bits are designated the Secondary Security Check Field (SSCF). The Access Security Check Field and the Secondary Security Check Field generation process is depicted in FIG. 49. The Access Security Check Field is transmitted from the GC to the terminating FES in the SU.

The MET independently generates the Access Security Check Field using an identical process to encode the transmit and receive frequency assignments received in the MET Channel Assignment SU received from the NCC. Following the establishment of the MET-FES communication link, the MET transmits the Access Security Check Field to the FES in the scrambling Vector SU.

The FES compares the MET and NCC generated Access Security Check Fields on a bit-by-bit basis. If the values are identical, the MET is declared authenticated, and the call setup is completed normally. If the values are not identical, the MET identity is declared non-authenticated, and the FES terminates the call process. The FES sends a channel release message to the NCC, as well as the call record, with authentication failure indicated as the call clearing reason.

During commissioning or PVT, the MET generates the Access Security Check Field from the transmit and receive frequency assignments included in the Set Loopback Request SU received from the NCC, and returns it to the NCC in the scrambling vector SU. The NCC compares the locally generated value of the Access Security Check Field with the value returned by the MET on a bit-by-bit basis. If the values are identical, the MET identity is declared authenticated, and commissioning or PVT continues. If the values do not compare, the MET identity is declared non-authenticated, and the NCC terminates the process, declare PVT failure, and sends an authentication failure alert message to the NOC.

A "clear mode" is provided to facilitate system troubleshooting on an individual MET basis. This mode is invoked at the NCC (with suitable password control), and causes the authentication system to accept and complete all calls for the specific MET, with or without a valid Access Security Check Field.

An "override mode" is provided that permits system operation without authentication, in case of failure or other problems. This mode is invoked at the NCC through operation of a hardware or software switch, with suitable protection (i.e., physical key, password).

The "Authentication Subsystems" at the NOC (which maintains the master MET ASK database), and at the NCC (which maintains the slave MET ASK database and generates the Access Security Check Field) are preferably both logically and physically separated from other NOC and NCC processors, and provide both physical and password security to prevent unauthorized access to the MET ASK databases. The NCC processors access the NCC Authentication Subsystem with the MET ID and the transmit and receive frequency assignments, and the NCC Authorization Subsystem returns only the MET ID and the Access Security Check Field.

A MET generally authenticates its identity upon each commissioning event, performance verification event, and call setup event. The authentication process is based upon the use of an encryption function and MET Access Security Key (ASK) to form an authorization code (the Access Security Check Field) from a random variable (the MET transmit and receive frequency assignments) at the beginning of each event.

The encryption algorithm is preferably the Data Encryption Standard (DES) defined by ANSI X3.92-1981/R1987, used in the Electronic Codebook Mode (ECB), and is built into both the MET and the NCC. DES is well known, well documented, and is in the public domain. Its performance is also well known, and is generally approved for U.S. Government application. The algorithm is defined in Federal Information processing Standard (FIPS) Publication 46-1, Jan. 15, 1977, Reaffirmed Jan. 22, 1988 (Approved as American National Standard X3.92-1981/R1987), incorporated herein by reference. While a purely software implementation of DES would require significant processing power for a continuous stream encryption, we have discovered that for the MET, only the generation of a single "codeword" is needed. Thus, for the MET system, the software implementation is feasible and not processing intensive. Additional discussion of the DES algorithm can be found in the following references, all of which are incorporated by reference herein: Federal Information Processing Standards Publication 74, Apr. 1, 1981; Federal Information Processing Standards Publication 81, Dec. 2, 1981; Robert V. Meushaw, "The Standard Data Encryption Algorithm, Part 1: An Overview", BYTE Magazine, March 1979; and "The Standard Data Encryption Algorithm, Part 2: Implementing the Algorithm", BYTE Magazine, April 1979.

The following relates to an enhanced or more detailed version of the fraud detection and user validation process. The ASK for each MET is independently generated at both the MET and the NOC/NCC using the DES algorithm. The inputs to the generation process is a Seed ASK (SASK) provided by the MSS system operator, and a random number (EFTIN KEY) generated by the MET at the time of commissioning and used to encrypt the FTIN. The SASK for each MET will be generated by the CMIS at the time of MET registration. As indicated above, FIG. 48 illustrates the ASK generation process using the SASK and EFTIN variables. A standard CRC-8 parity check algorithm will be used to protect the integrity of the SASK. The parity check is generated over all of the hexadecimal digits and incorporated into the SASK.

The NMS provides the processing capability necessary to generate the SASK and any needed parity check. Note that inclusion of the parity check bits as part of the SASK yields a 64 bit binary word which is the length of key required by the DES. The SASK parity check sequence is generated by the polynomial $G(X)=X^8+X^7+X^4+X^3+X+1$. The input to the parity checker is the information portion of the SASK. The SASK is supplied to the MET subscriber prior to commissioning. The key distribution scheme is not a requirement of this specification. The MET provides a "user friendly" means, using alphanumeric prompts, audible tones, and key strokes, for the user to enter the SASK into the MET. The MET verifies the correctness of the SASK as described below. If the SASK is incorrect, the user is prompted to enter the SASK again. The MET does not enter the "Ready for Commissioning" state prior to entry of a valid SASK.

At the time of commissioning, the MET uses the DES algorithm in the ECB mode to generate the "active" ASK. The EFTIN KEY is extended to additional bits by filling the leading positions and is used as the plain text input to the algorithm. The SASK is used as the key. The resulting cipher text block is from the ASK. The forms of the elements used in the key generation process are shown in FIG. 48. It is impossible for the MET to initiate recommissioning either with or without reentry of the SASK. Importantly, the CGS can selectively command at will a MET that has been detected as potentially fraudulent to reinitiate the commissioning process, thereby creating a new ASK and CCV. Therefore, if a fraudulent MET has gained access to CGS, the CGS can selectively "remove" the fraudulent MET upon detection. The MET stores the SASK and the ASK in NVRAM. There is no means provided to read out or display either the SASK, or the ASK once it is generated and stored.

Figure 50A:
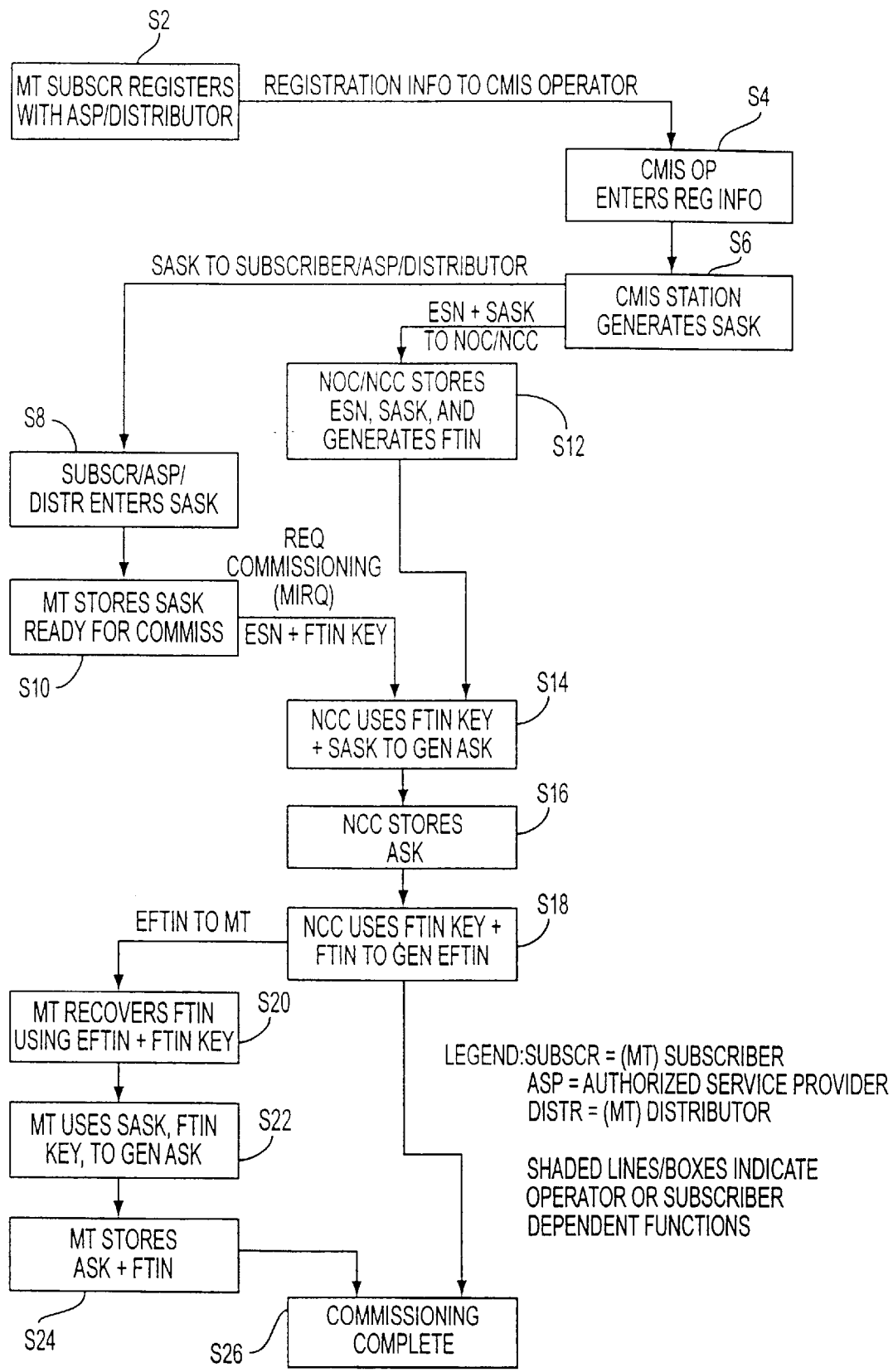
FIG. 50A is a flow chart of the keying process.
Figure 50B:
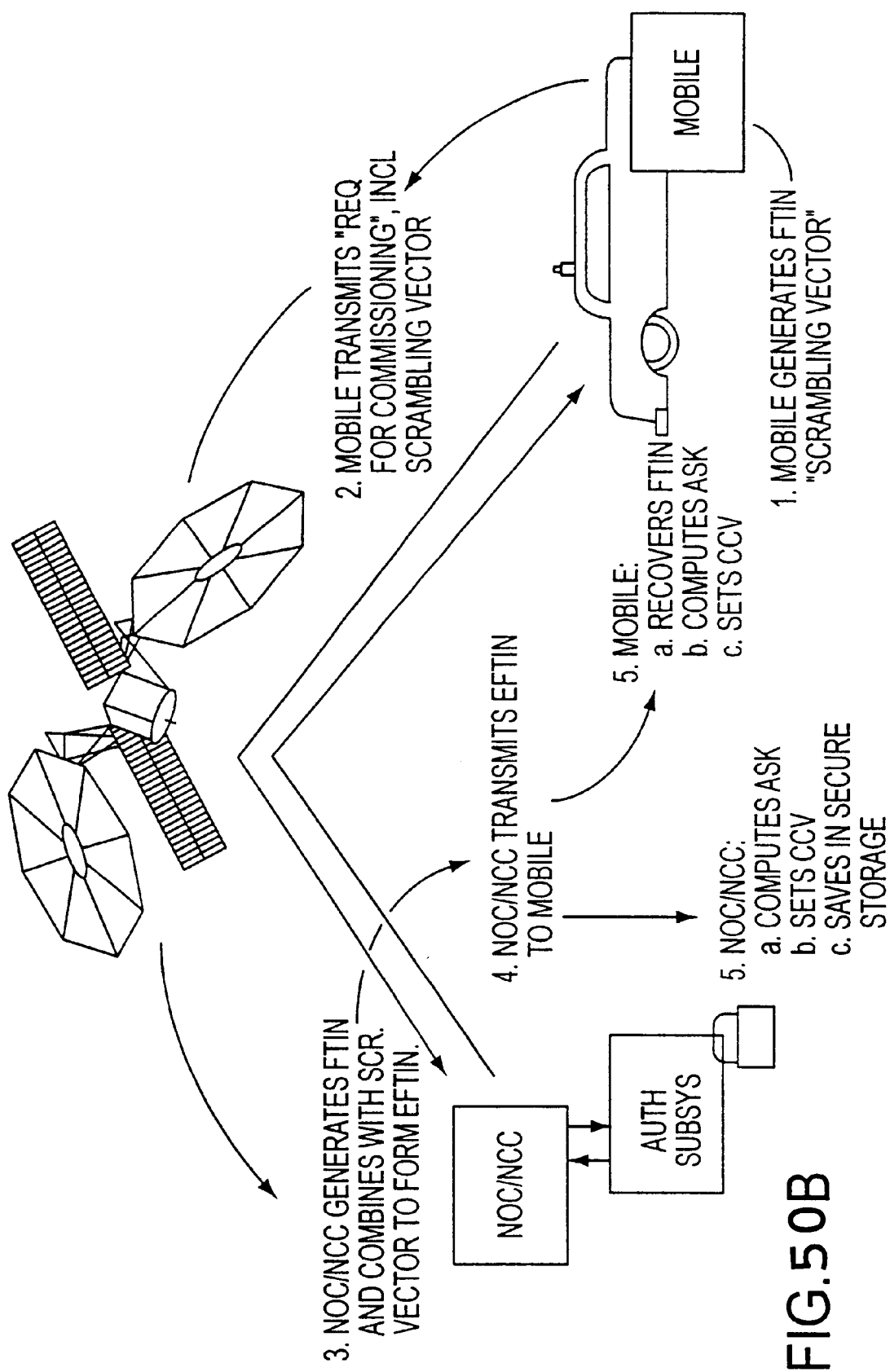
FIG. 50B is an illustration of the keying process in the satellite communication system.
Figure 50C:
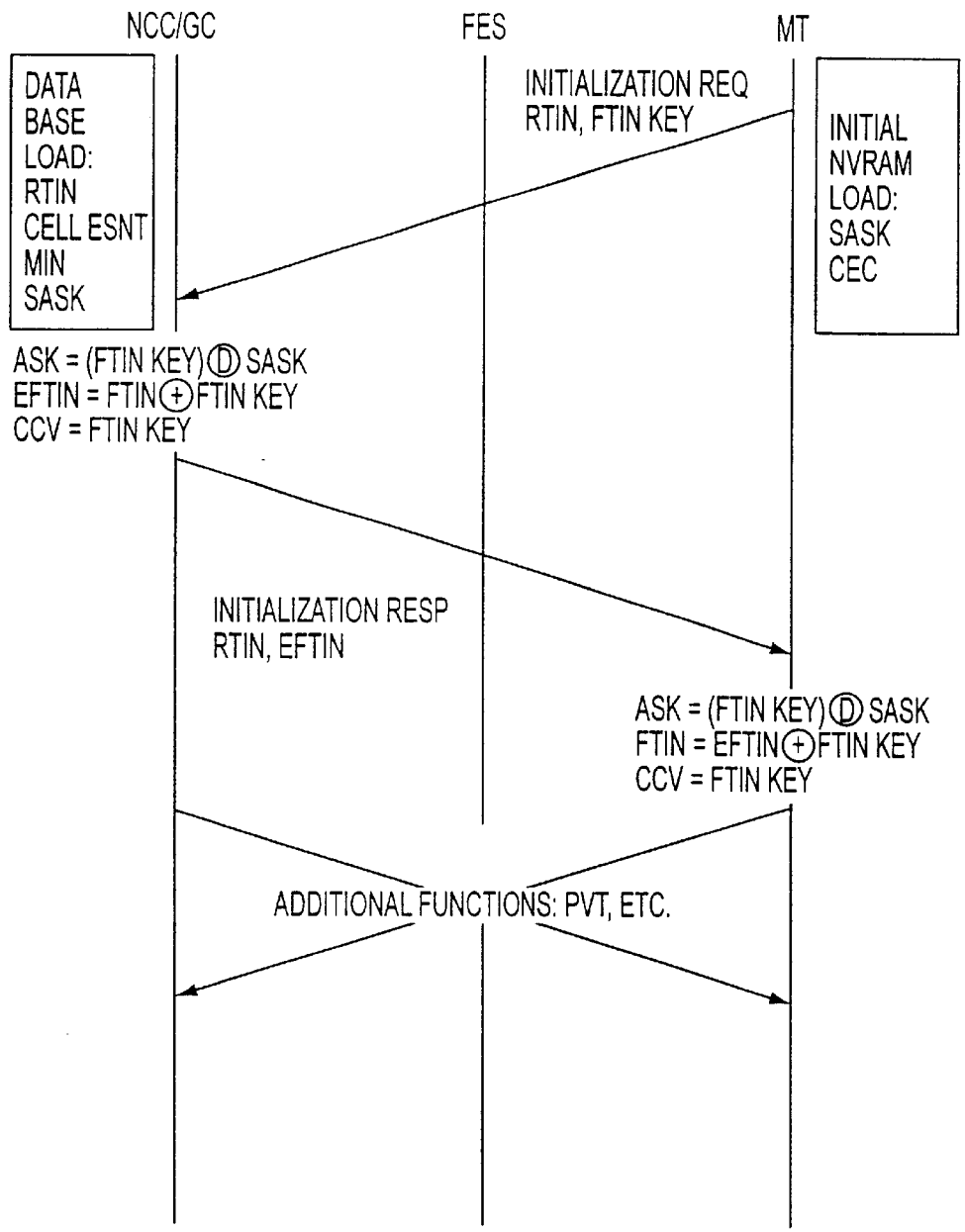
FIG. 50C is a signal/data diagram of the keying process.

The keying process is illustrated in FIGS. 50A–50C. FIG. 50A is a flow chart of the keying process, FIG. 50B is an illustration of the keying process in the satellite communication system, and FIG. 50C is a signal/data diagram of the keying process. In FIG. 50A, the MET subscriber registers or requests to become a subscriber of the satellite communication system in step S2. Registration information is sent to CMIS and a customer service representative enters the registration information in the CMIS system that handles subscriber billing, contact and the like, in step S4. CMIS then generates the Seed ASK which is supplied to the NOC/NCC and the subscriber/distributor of the MET prior to commissioning in step S6. The subscriber/distributor enters the SASK into the MET in step S8, and the MET stores the SASK for commissioning in step S10.

The NOC/NCC stores the ESN and SASK and assigns a Forward Terminal ID (FTIN) for each MET in step S12. The NOC/NCC also receives an FTIN Key from the MET which is a random number generated by the MET when the MET requests to be commissioned, and uses the FTIN key and the SASK to generate the ASK in step S14. The NCC stores the ASK in step S16. The NCC uses the FTIN Key and the FTIN to generate the EFTIN in step S18 and transmits the EFTIN to the MET. The MET uses the EFTIN and the FTIN key to recover the FTIN in step S20. The MET also uses the SASK and the FTIN Key to generate the ASK in step S20. The MET then stores the ASK and FTIN in step S24 to be used later during the registration or call connect process. The commissioning process is then completed in step S26, providing the necessary security codes in the MET associated with a specific ESN and in the NCC/NOC. Also, at the time of MET commissioning, the NCC duplicates the process of MET ASK generation. The NCC process is entirely automatic, and is protected from access by, the MSS system operators.

The NCC computes a cipher text block (see FIG. 49) by using the ASK stored in its secure database and the DES algorithm to encode an input variable comprised of the receive frequency assignment in the least significant positions, the transmit frequency assignment in the next least significant positions, the Access Security Fill Bits (transmitted in the Bulletin Board, see, for example, FIG. 51), and the most significant positions filled with predesignated characters. The 32 most significant bits of the resulting cipher text block are designated the Access Security Check Field, and the least significant is designated the Secondary Security Check Field. The MET also generates the Access Security Check Field from the transmit and receive frequency assignments included in the Set Loopback Request SU received from the NCC, and returns it to the NCC in the scrambling vector SU. The NCC compares the locally generated value of the Access Security Check Field with the value returned by the MET on a bit-by-bit basis. If the values are identical, the MET identity is declared authenticated, and commissioning or PVT continues. If the values do not coincide, the MET identity is declared non-authenticated, and the NCC terminates the process, declares PVT failure, and sends an authentication failure alert message to the NOC.

Figure 47:
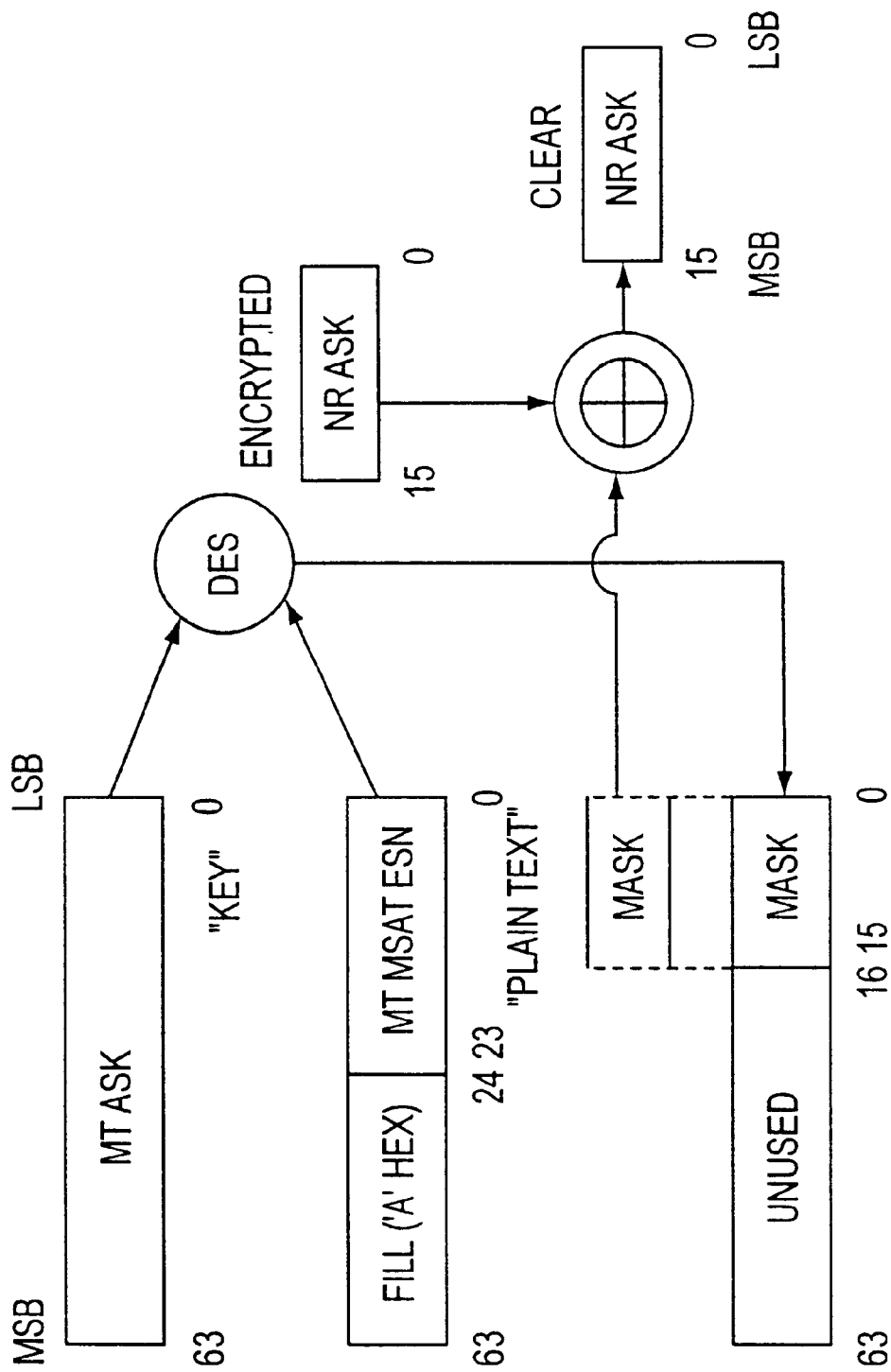
FIG. 47 is a diagram of the Net ID ASK security key generation process.

As illustrated in FIG. 47, the MET ASK is the DES 'key' and the concatenation of the ESN and fill bits is the DES 'Plaintext'. The least significant 16-bits of the resultant cryptovariable is then exclusive-"or"-ed with the encrypted Net ID ASK to form the cleartext Net ID ASK that is stored in the NVRAM of the MET.

Once the MET has derived the NET Radio (NR) ASK, the MET then proceeds to determine the scrambling vector used to initiate the MET scrambler for NET Radio calls. The generated NET Radio scrambling vector is applied to both the MET transmit and receive scrambling units. The MET determined the NR scrambling vector using the following process.

Figure 52:
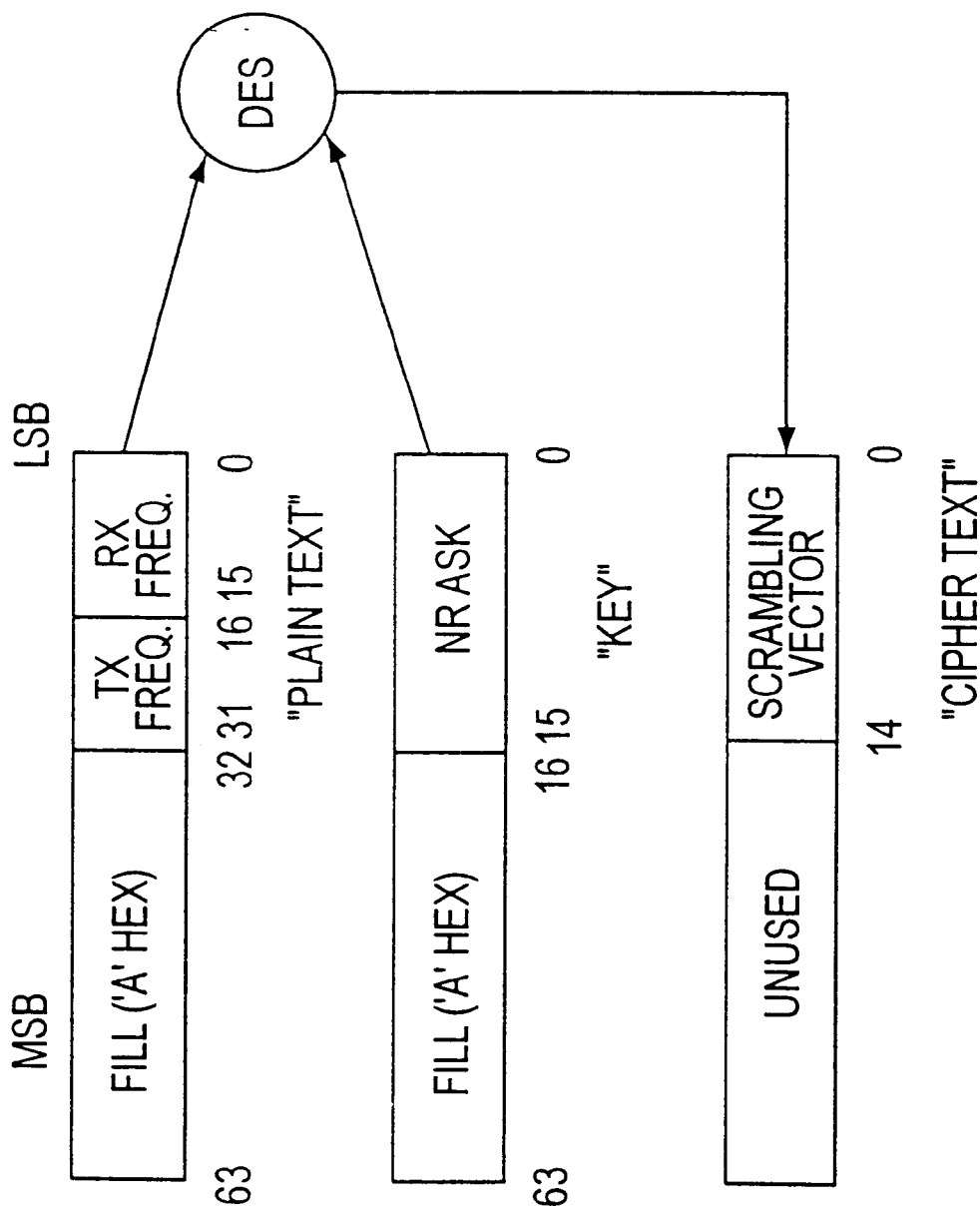
FIG. 52 is a diagram of the scrambling vector generation process for the NET Radio service.

As illustrated in FIG. 52, the 16-bit MET Transmit and Receive frequency assignments are concatenated with 8 "A" hexadecimal fill digits. This concatenated array is used as the "Plaintext" input to the DES process. The NET Radio ASK is also concatenated with 12 "A" hexadecimal fill digits. This second concatenated array is used as the "Key" input to the DES process. The NET Radio scrambling vector is, for example, the 15 least significant bits of the resultant 64-bit DES "ciphertext" output therefrom. When a MET wants to join a NET Radio group, then the MET is able to enter the group via the scrambling vector.

Dual Standby Operation

The MET includes the capability of dual standby operation when configured, registered and commissioned for both MTS and NR service. Dual standby operation is defined as MET operation whereby the MET responds to either MTS page requests or NR Channel Assignments as transmitted on the GC-S channel. To effectuate the dual standby operation, the MET is not required to monitor the GC-S channel for service requests of another type while the MET is responding to a service request of either type. This feature is user selectable: either MTS only, NR only, or Dual Standby. The MET, of course, determines whether an MTS call or NR call is desired via the appropriate entries by the MET user or by receiving the appropriate signaling units discussed previously.

When the "MTS only" of the dual standby mode feature is selected, the MET will undertake the authentication process after the MET ASK has been generated. The authentication process indicates that the MET is ready to gain access to CGS for voice/data communication using the real-time authentication process described hereinafter. According to the authentication process, the Access Security Fill Bits are transmitted in the MET bulletin board. The NOC operator can manually change this field to any desired pattern. It is recognized that when the Access Security Fill Bits are changed there will be a short period during which METs will attempt to access the system with Authentication Codes generated using the "old" fill bits, which may result in those METs being denied service. As one option to prevent this problem, the NOC operator will have the option to disable the access security check for a short time when the fill bits are changed. The NCC computes a cipher text block (see FIG. 49) by using the ASK stored in its secure database and the DES algorithm to encode an input variable comprised of the receive frequency assignment in the least significant positions, the transmit frequency assignment in the next least significant positions, the Access Security Fill Bits (transmitted in the Bulletin Board, see, for example, FIG. 51), and the most significant positions filled with predesignated characters. The 32 most significant bits of the resulting cipher text block are designated the Access Security Check Field, and the least significant is designated the Secondary Security Check Field. The Access Security Check Field and the Secondary Security Check Field are transmitted to the terminating FES in the Channel Assignment SU.

The MET independently generates the Access Security Check Field and the Secondary Security Check Field using an identical process to encode the transmit and receive frequency assignments received in the MET Channel Assignment SU received from the NCC. Following the establishment of the MET-FES communication link, the MET transmits the Access Security Check Field in the Scrambling Vector SU.

The FES compares the MET and NCC generated Access Security Check Fields on a bit-by-bit basis. If the values are identical, the MET identity is declared authenticated, and the call setup shall be completed normally. If the values are not identical, the MET identity is declared non-authenticated. If nonauthenticated, the FES terminates the call process, and sends a channel release message to the NCC with authentication failure indicated as the call clearing reason. Upon receiving the channel release message with authentication failure as the call clearing reason, the GC generate an authentication failure event. The NCC treats this as an alarm condition. The NCC provides a real time display to the MSS operator console indicating that the call was failed due to authentication failure.

A "clear mode" is provided to facilitate system troubleshooting on an individual basis. This mode is invoked at the NCC (with suitable password control), and causes the authentication system to accept and complete all calls for the specific MET with or without a valid Secondary Security Check Field.

An "override mode" is also provided which permits system operation without authentication, in case of failure or other problems. This mode is invoked at the NCC through operation of a hardware or software, with suitable protection (i.e., physical key, password).

An option is provided in which the "Authentication Subsystem" at the NOC/NCC (which maintains the MET ASK database) is both logically and physically separated from mother NOC and NCC processors, and which provides both physical and password security to prevent unauthorized access to the MET ASK databases. The NCC processors access the NCC Authentication Subsystem with the MET ESN (RTIN) and the transmit and receive frequency assignments and fill bits. The NCC Authorization Subsystem returns only the MET ESN, the Access Security Check Field and the Secondary Security Check Field.

A MET is required to authenticate its identity upon each request to invoke an advanced calling feature which redirects the source or destination of a call or adds participants. To effectuate authentication, the MET includes the least significant ("right most") bits of the Secondary Security Check Field in the AFR SU ("Hook Flash") transmitted in an Advanced Features Request Sequence. The serving FES compares the these least significant bits of the Secondary Security Check Field received from the NCC in the Channel Assignment SU. If the values are identical, the MET identity is declared reauthenticated, and the advanced features request is processed normally. If the values are not identical, the MET identity is declared non-reauthenticated, and the FES denies the advanced features request, and provides a suitable indication, such as a tone or recorded voice announcement, to the MET subscriber. The FES sends a reauthentication failure alert message to the NCC.

The MSS system provides for a Call Count Variable (CCV) in the authentication process. The CCV is a count of calls made by each MET, and is separately and independently maintained by the individual METs and the NCC. The CCV is a 16 bit binary number, and is set equal to the value of the least significant 16 bits of random EFTIN KEY when the MET is commissioned or recommissioned. The CCV is incremented at the completion of each call setup. The CCV is also incremented at the MET when the change from transmission of the Scrambling Vector SU to voice/data frames is made. The CCV is also incremented at the NCC when the call Setup Complete SU is received from the serving FES.

At the time of call initiation, the NCC adds (i.e., the logical XOR operation) the CCV to the least significant bits of the Secondary Security Check Field. The resulting CCV Check Field is included in the Channel Assignment SU sent to the serving FES. The MET independently generates a CCV Check Field using an identical process, and includes the result in the Scrambling Vector SU sent to the serving FES during call setup.

Figure 53A:
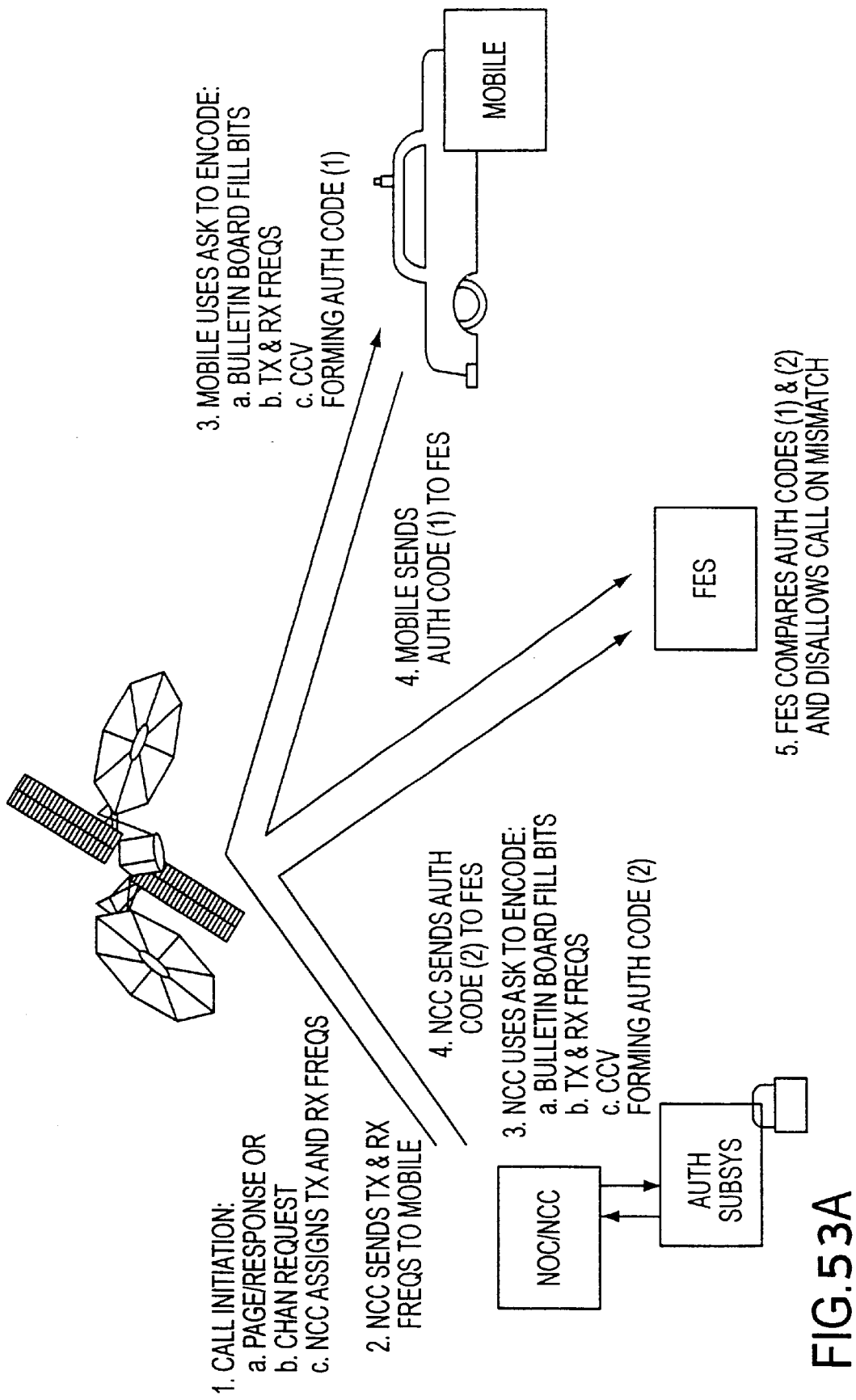
FIGS. 53A and 53B are diagrams of the authentication process using the authentication security key generated by the process described in FIGS. 50A–50C.
Figure 53B:
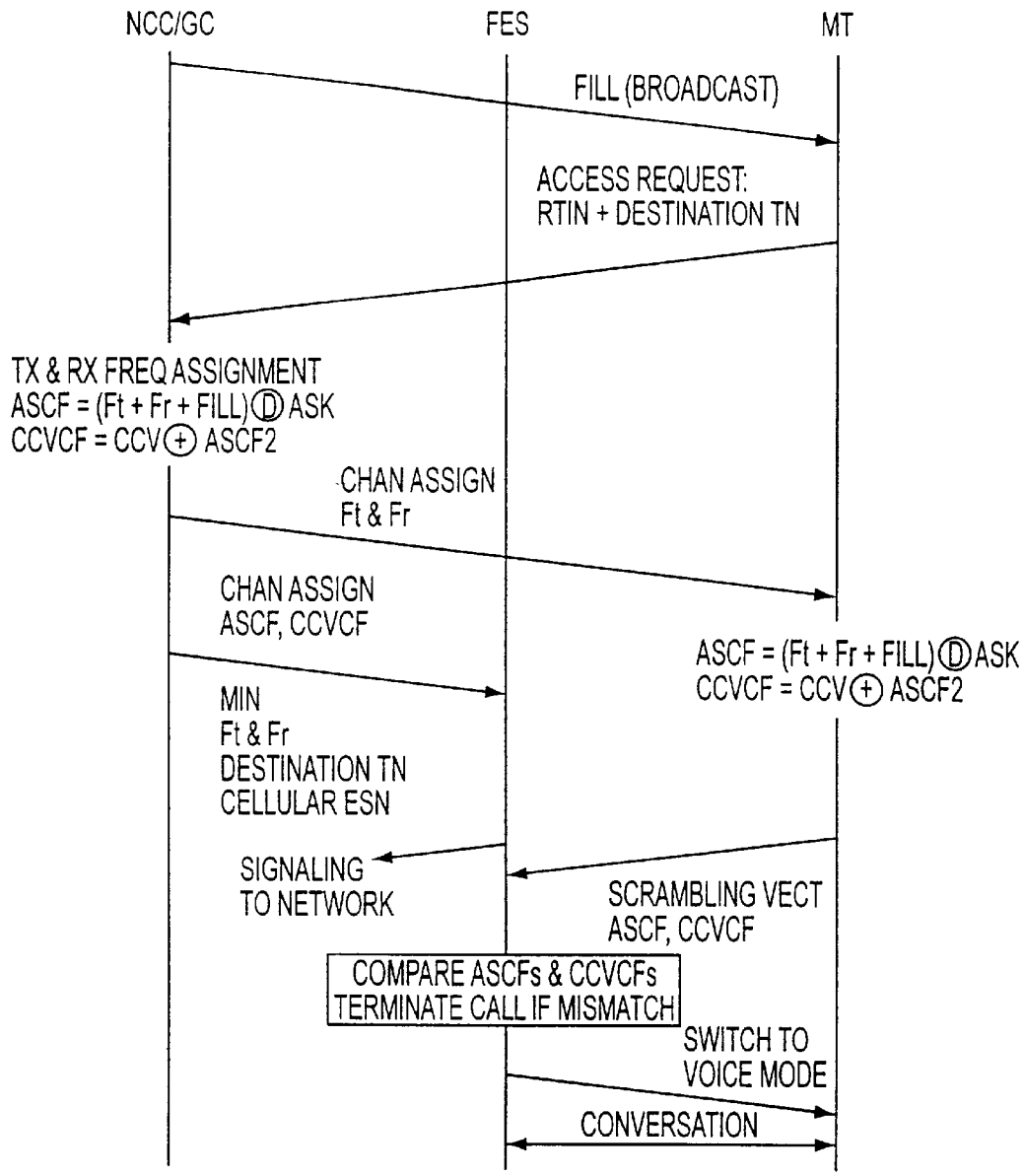

The FES verifies the MET CCV. The FES declares the CCV to be authenticated if the absolute value of the error is equal to or less than a configurable threshold. Provision is made for selection of the error threshold by the NOC/NCC operators. The nominal value of the threshold is zero, and the range is at least zero to 15 (decimal). If the absolute value of the error is greater than the threshold, the FES declares the CCV non-authenticated. The FES terminates the call process, and sends a channel release message to the NCC, with CCV authentication failure indicated as the call clearing reason. Upon receiving the channel release message with authentication failure as the call clearing reason, the GC generates an authentication failure event. The NCC treats this as an alarm condition. The NCC provides a real time display on the MSS operator console indicating that the call was failed due to authentication failure. FIGS. 53A and 53B are diagrams of this described authentication process using the authentication security key generated by the process described in FIGS. 50A–50C.

Advantageously, the fraud detection and user validation system optionally includes an enhanced MET authentication process through the use of a Personal Identification Number (PIN) entered by the MET subscriber at the initiation of each call. The PIN is not to be used for MET terminated calls. The PIN is provided to the MET subscriber by the MSS operator and must be entered whenever the MET initiates a call. The NOC/NCC makes provision to enter and store the PIN in the MET ASK secure database.

The NOC/NCC software architecture makes provision for a "PIN REQUIRED" Flag to be included in the data base for each MET, and in the calling sequence and software used to invoke generation of the Access Security Check Field by the Authentication Subsystem. The PIN Required flag can be set by CMIS or the NOC operator. If the use of the PIN is required, the NCC authentication subsystem replaces the most significant Access Security Fill Bits with the PIN characters. Generation of the cipher text block comprising the Access Security Check Field and the Secondary Security Check Field and subsequent actions is then proceeded as described above.

Generation of the cipher text block comprising the Access Security Check Field and the Secondary Security Check Field and subsequent actions is then performed as described above. The form of the "plain text input" used in the PIN-inclusive ASCF generation process is shown in FIG. 54. Transmission and verification of the various Security Check Fields, and subsequent actions, is implemented as described above.

When the "NR only" of the dual standby mode feature is selected, the MET undertakes the authentication process if it is the initiator of the NR call, or generates a scrambling vector for the NET Radio service using the MET ASK and the NR ASK to join the NET group.

When the "Dual Standby" of the dual standby mode feature is selected, the MET will undertake either the authentication process indicating that the MET is ready to gain access to CGS for voice/data communication or the scrambling vector generation process indicating that the MET is ready to gain access to a NET Radio group. As soon as the MET dedicates itself for one of the MTS or NET Radio services, then the MET is generally no longer able to receive the other service, with the exception of receiving preferably a unique tone indicating that a call on the other service is waiting, i.e., a modified call waiting feature. In this manner, the MET is able to advantageously utilize both the standard MTS voice service and the NET Radio service.

Although a number of arrangements of the invention have been mentioned by way of example, it is not intended that the invention be limited thereto. Accordingly, the invention should be considered to include any and all configuration, modifications, variations, combinations or equivalent arrangements falling within the scope of the following claims.

DICTIONARY ITEMS AND DEFINITIONS

Actual GSI

Definition: Current GSI based on TDM changes during MET operation. This field is populated by the NOC based on actions on the CGS. The CMIS cannot create or update this field.

Call Barring Inbound/Outbound Flag
Definition: Describes the call barring entry as applying to incoming or outgoing calls. If the Call Barring List is flagged as Inbound, it applies to calls the MET is receiving. If the Call Barring List is flagged as Outbound, it applies to calls the MET is making.

Call Barring Include/Exclude Flag
Definition: Describes the call barring entry as an included (legal) call or an excluded (illegal) call. When a Call Barring List is flagged as Include, the MET may only make calls to the numbers or NPAs on the list. Any other call would be denied. Conversely, if a Call Barring List is flagged as Exclude, the MET may make calls to any number or NPA except those on the list.

Call Barring List Value
Definition: Numbering plan area or phone number in the call barring list. The values that appear in the list are the phone numbers or NPAs that the MET's restriction apply to. The types of restrictions are dictated by the flags for Include/Exclude and Inbound/Outbound Call Barring.

Call Trap Flag
Definition: Indicates call trapping has been initiated for the MET. The GC will trap MET states as they change during MET CGS activity. This information will be provided to the CMIS on a call record.

Call Type
Definition: Service available on the MET. There are four service types: voice data (2400 or 4800 baud), fax, and alternate voice data (avd). For each service the mobile is registered, a service record is created with a single call type indicated. This call type in turn has a unique mobile identification number (min) associated with it.

Carrier
Definition: Name of preferred IXC carrier. This field is a switch field used to support equal access to long distance carriers.

Cellular ESN
Definition: 32 bit ESN that is used by the switch. For dual mode cellular/satellite phones it is the ESN for the cellular portion of the phone and would match the ESN used by the home cellular carrier to identify that mobile terminal.

CGS Time Stamp
Definition: Time stamp was created/modified. Part of the notification of success or failure of CGS action. Not created or updated by CMIS.

Channel Spacing
Definition: Multiple of frequency step size. This element is a characteristic of the MET Class. CMIS will only have the MET Class ID that a particular METs equipment maps to. NE originates this and other data that describes the MET Class and sends it to the NOC.

Check String
Definition: Constant used by the GC to validate the encryption/decryption algorithm. This element is related to the ASK.

Commanded GSI
Definition: Set by CMIS this is the original GSI stored as a NVRAM (non-volatile RAM) parameter by the MET. Required for each new MET registered for service. This element is used by the MET to tune to a GC-S channel during commissioning on the CGS. Without the GSI the MET is incapable of logging on to the CGS.

Configuration File
Definition: A file containing the contents of a working configuration that has been saved to disk under a unique name.

Current Configuration
Definition: The set of resources that exist in the configuration most recently sent to or received from the NOC. This is assumed to be the actual configuration of the traffic bearing network at any given time.

Commit a Resource
Definition: Explicit engineer action to add a fully provisioned interim resource to the working configuration.

Control Group ID
Definition: The CGS is divided into Control Groups that contain circuit pools, signaling channels, bulletin boards, METs, and VNs. A MET may only belong to one Control Group. The control Group assignment is based on the virtual network membership. All VNs a MET is a member of must be in the same control group.

Cust Group
Definition: Identifier for a specialized routing information used at the switch (e.g., 1024 available cust groups per MSR). Dialing plans will be implemented for groups of customers through a Customer Group (Cust Group).

Data Hub Id
Definition: Used to route messages during PSTN to IVDM call setup to the proper data hub. This is only applicable for METs that are participating in the Mobile Packet Data Service.

Date Last Tested
Definition: Time stamp of most recent commissioning test. This field is populated by the NOC and cannot be created or updated by CMIS.

Default VN
Definition: VN selected if user does not specify VN during dialing. For METs that belong to only one VN, this can be populated with the VN ID the MET is assigned to by default.

EIRP
Definition: Equivalent Isotropic Radiated Power—power level required for a MET to receive a satellite signal. This element is a characteristic of the MET Class. CMIS will only have the MET Class ID that a particular METs equipment maps to. NE/SE originates this and other data that describes the MET Class and sends it to the NOC.

Event Argument Id
Definition: Part of the Event Record received from the NOC. CMIS has no part in creating or updating events—they arrive unsolicited from the NOC.

Event Argument Type
Definition: Part of the event Record received from the NOC. CMIS has no part in creating or updating events—they arrive unsolicited from the NOC.

Event Argument Value
Definition: Part of the Event Record received from the NOC. CMIS has no part in creating or updating events—they arrive unsolicited from the NOC.

Event Argument VMS Type
Definition: Part of the Event Record received from the NOC. CMIS has no part in creating or updating events—they arrive unsolicited from the NOC.

Event Code
Definition: Part of the Event Record received from the NOC. CMIS has no part in creating or updating events—they arrive unsolicited from the NOC.

Event Severity
Definition: Network impact assessment of the trouble event.

Event Time
Definition: Time the event occurred within the network.

Event Type
Definition: Part of the Event Record received from the NOC. CMIS has no part in creating or updating events—they arrive unsolicited from the NOC.

External Date Time Stamp
Definition: CMIS generated time stamp used for CMIS audit purposes in exchanging messages with the CGS.
External Transaction Id
Definition: CMIS generated transaction id used for CMIS audit purposes in exchanging messages with the CGS.
Feature Set
Definition: Identifies MET features within a specific VN. Fixed features are set up during order processing and require no action by the MET user to invoke a feature. MET activated features must also be set up during order processing but will only be available through some action on the part of the MET use during call process.
FIXED FEATURES include:
Calling Line Id Presentation (CLIP)—display the calling party's number to a MET.
Calling Line Id Restriction (CLIR)—prohibition from displaying the METs number when it is calling another party.
Connected Line Id Presentation (COLP)—display the number the calling MET is connected to.
Connected Line Id Restriction (COLR)—prohibit display of the connected MET's number to the calling party.
Sub-addressing (SA)—allows one or more attachments to the MET to be addressed. This is being accomplished through unique phone numbers for service types requiring different equipment.
Call Waiting (CW)—notification to a MET engaged in the call that another call is waiting. MET may accept the other call or ignore it.
Call Barring (CB)—restricts the MET user's from making or receiving one or more types of calls.
Operator intervention (OI)—allows an operator to break into a call in progress for the MET.
Operator Assistance (OA)—allows the MET to access an MSAT operator to receive assistance
Call Priority (CP)—used in conjunction with the system's call queuing function (trunk access priority) presence of this feature gives a MET access to channels at times of congestion ahead of MET's with lower priority. Priority applies only to MET initiated calls.
MET ACTIVATED (dynamic) FEATURES include:
Call Transfer (CT)—allows sa MET user to transfer an established call to a third party.
Call Forwarding Unconditional (CFU)—permits a MET to have all calls forwarded to another MET or PSTN number.
Call Forwarding Busy (CFB)—permits a MET to have all incoming calls attempted when the MET is busy to another MET or PSTN number.
Call Forward Congestion (CFC)—permits the MET to have all incoming calls attempted when the signaling channels are congested answered with a recorded announcement intercept.
Call Forward No Reply (CFN)—permits a MET to have all incoming calls attempted when the MET is not answering to another MET or PSTN number. This applies if the MET is blocked, turned off or not answering.
Call Holding (CH)—allows a MET to interrupt call communication on an existing connection and then re-establish communications.
Alternate Voice Data Operation (AVD)—allows a MET user to toggle between voice and data mode during a call. Requires that the call be initiated in voice mode. Only the MET user may toggle between voice and data. This requires a special service type in addition to the activation at set-up of the feature.
Conference calling (CC)—allows a MET to communicate with multiple-parties including METs and PSTN concurrently.
Three Party Service (3PS)—allows a MET to who is active on a call to hold that call, make an additional call to a third party, switch from one call to the other (privacy being provided between the calls) and/or release one call and return to the other.
Malicious Call Trace (MCT)—enables an MSAT operator to retrieve the complete call record at a MET's request for any terminated call in real-time. The operator can then identify the calling party to the MET and take appropriate action.
Voice Mail (VM)—allows call forwarding to a voice mail box and retrieved of messages by the MET.
Alternate Accounts Charging (ACC)—allows the MET user to enter in an account code to charge the call to after entering the dialed digits
Fully Provision
Definition: Supply values to all attributes of a resource
Frequency Step Size
Definition: Minimum tuning increment acquired for a MET to tune in an assigned channel. CMIS will only have the MET Class ID that a particular MET's equipment maps to. NE originates this and other data that describes the MET Class and sends it to the NOC.
From MET Call Barring Flags
Definition: Describe actions available to a user originating a call from a MET. These call Barring flags relate to specific types of calls at an aggregate level to indicate if the MET can make or receive a call of a particular type. When this list indicates that an Inclusion or Exclusion to particular numbers or area codes is allowed, the values for those restrictions are indicated on a Call Barring List.
FTIN
Definition: Forward Terminal Identification Number—Downloaded to MET from NOC during commissioning. Used for MET to GC signaling.
Internal Data Time Stamp
Definition: NOC generated time stamp used for NOC audit purposes.
Internal Transaction Id
Definition: NOC generated transaction is used for NOC audit purposes.
Interim resource
Definition: The resource currently being modified by the engineer. Changes made to an interim resource are not added to the working configuration until the resource is committed to the working configuration
L Band Beam
Definition: Current beam MET is logged into. Determined by the GC during commissioning. CMIS has no role in creating or updating this field.
LCC
Definition: Line Class Code—type of phone, required by the switch.
MCC Class Id
Definition: Part of the Event Record received from the NOC. CMIS has no part in creating or updating events—they arrive unsolicited from the NOC.
MCC Instance
Definition: Part of the Event Record received from the NOC. CMIS has no part in creating or updating events—they arrive unsolicited from the NOC.

MCC Instance Id
Definition: Part of the Event Record received from the NOC. CMIS has no part in creating or updating events—they arrive unsolicited from the NOC.

MCC Instance Type
Definition: Part of the Event Record received from the NOC. CMIS has no part in creating or updating events—they arrive unsolicited from the NOC.

Message Status 1
Definition: Used in the message initiated by the NOC to acknowledge success or failure of a previously transmitted CMIS request. Used by the DM.

Message Status 2
Definition: Used in the message initiated by the NOC to acknowledge success or failure of a previously transmitted CMIS request. Will be used by the DM.

Message Verb
Definition: Action required at the NOC on data passed in a message from CMIS. This field is in the message relaying the results of a CMIS request.

Modulation Scheme
Definition: Non-standard modulation schemes. CMIS will only have the MET Class ID that a particular MET's equipment maps to. NE/SE originates this and other data that describes the MET Class and sends it to the NOC.

MSA
Definition: Mobile Servicing Area—identifies the last call's servicing area. Atomic data element within MSR. Transient data maintained in call processing not on the cellular switch table. Same as MSR.

MSR
Definition: Mobile Servicing Region id (table) contains multiple MSA assignments for the MET. For a roamer, the operator will input the MSR for temporary assignment. Allows up to 1024 cust groups—At CGS startup there will be 1 MSR.

MET ASK
Definition: Access Key MET must match during call setup/validation.

MET Class ID
Definition: Identifies the operating characteristics of the MET. Associated to MET by CMIS during registration from data supplied by NE/SE. The technical characteristics the MET Class ID encompasses are not needed by CMIS. These are stored on a table in the NOC and referenced by having the ID on the MET Information record. This ID applies to MET level regardless of how many services, etc. the MET has tied to it.

MET Commanded State
Definition: Current CGS status of MET.

MET Fraud Flag
Definition: Indicates fraud has been detected on the MET. Updated by GC and CMIS only. This field is set at the MET level regardless of the number of services, etc. the MET has.

MET ID
Definition: CMIS assigned unique MET identifier. This can be a unique random number assigned to each MET registered for service. This is a MET level characteristic set once for the MET regardless of how many services, etc. the MET has. The MET ID is used by the NOC to identify METs. It does not have to be used within CMIS as a key field. MET ID cannot be updated once it has been assigned. A MET that requires a new MET ID for any reason would have to go through the registration process anew.

MET Signaling Code
Definition: Dialed digits from MET that identifies VN selection. Signaling codes would be assigned when a MET has multiple Virtual Network memberships. After the MET user enters the destination phone number, the pound key is hit and then the signaling code is entered if the caller wants to associated the outbound call with a particular virtual network. When no signaling code is entered, implies default VN be associated with the call.

Net Radio Monitor Code
Definition: Controls MET responses to specific channels after hang time limit is exceeded. A NR Net selection is made at the MET by the user.

Net Radio MET Directory Number
Definition: Net radio MET directory number. Assigned during registration.

Net Radio Net Id
Definition: Net ID

Net Radio MET Directory Number
Definition: Tag number on the MET equipment that identifies a particular net radio net.

Pending NVRAM Init Flag
Definition: Instructs the GC to download/initialize parameters for a MET.

Pending PVT Flag
Definition: This flag indicates that a PVT is required following next MET access. If CMIS requests a PVT to help diagnose customer troubles, an update would be sent to NOC with the Flag set to Perform PVT after Next MET access (1).

Picsel
Definition: Flag indicating if user has asked for a preferred IXC carrier. Carrier name is contained in CARRIER field.

Record Type
Definition: Type of record defined by object. Part of the Update Results Record.

Remote
Definition: Remote user—not required by the switch for MSAT Application.

Recent Configuration Event
Definition: This is a serial list of events received from the NOC that pertain to configuration database changes.

Referential Integrity
Definition: Database "key field" relationships that bind record within the databases, and create dependencies for additions and deletions of table instances.

RF Pin
Definition: Remote feature personal identification number. A user is prompted for a pin when attempting to use a remote feature.

Roam
Definition: Roam Capable—not required by the switch for MSAT Application.

RTIN
Definition: Reverse Terminal Identification Number which is also the satellite electronic serial number on satellite only and dual mode cellular/satellite METs. This is a unique identifier assigned by manufacturer for each piece of equipment. Within CGS processing the RTIN is used by the GC to signal the MET.

Satellite Id
Definition: Satellite Id of current L-band beam. The NOC populates this field based on MET commissioning. CMIS does not ever create or update this field.

SCM
Definition: Station Class Mark.

Secure Disable Flat
Definition: Channel Unit security check flag. Setting this flag to bypass security would disable ASK verification during call processing for a MET. CMIS cannot change this flag.

Signaling Priority
Definition: Number of MET signaling requests to the GC during network congestion. Assigned at the MET level—each MET may have only one signaling priority regardless of the number of VN memberships it has. The highest priority level is 0 and the lowest is seven.
TDM Change Enable Flat
Definition: Restriction on MET from changing TDM (TDM is the GSI)
Telephone Number
Definition: Phone number associated with a call type (voice, data, fax, avd) in a given virtual network.
Template
Definition: An initial set of default attribute values for each resource being added.
To MET Call Barring Flags
Definition: Describes actions available to a user receiving a call at their MET.
Trunk Access Priority
Definition: Satellite trunk queuing priority used during network congestion. Determines access to channels.
Virtual Network Id
Definition: Identifies the Virtual Network that the service and feature profiles relate to. Within a single VN a MET may have one voice, data, fax and/or avd service type. Features and restrictions for those services are defined on the basis of the METs membership in that VN. If the MET required an additional instance of a service that it already subscribed to, (e.g. a second voice number), a second virtual network assignment would be required. Features and restrictions for that second membership can be defined with no relation to the existing VN membership, but all elements that relate to the MET level cannot change without a ripple effect to the other services.
VMS Instance Type
Definition: Part of the Event Message
Vocoder Id
Definition: Vocoder version currently installed in the MET. CMIS will only have the MET Class ID that a particular METs equipment maps to. NE/SE originates this and other data that describes the MET Class and sends it to the NOC.
Working Configuration
Definition: The set of resources currently being modified by the engineer. This may be an existing, complete configuration which the engineer is modifying, or may be a new, partial (or initially empty) configuration.

GLOSSARY

| | |
|---|---|
| A | Availability |
| AAC | Airline Administrative Communications |
| AARM | Access Authentication Request |
| ABH | Average Busy Hour |
| AC | Alternating Current |
| ACU | Access Channel Unit |
| ACU | Antenna Control Unit |
| AD | Attribute Dictionary |
| AEDC | After Effective Date of Contract |
| AFC | Automatic Frequency Control |
| AFS | Antenna/Front-end Subsystem |
| AGC | Automatic Gain Control |
| AIOD | Automatic Number Identification Outward Dialing |
| AMI | Alternative Mark Inversion |
| AMPS | North American Analog and Digital Cellular Networks |
| AMSC | American Mobile Satellite Corporation |
| AMS (R)S | Aeronautical Mobile Satellite (Route) Service |
| AMSS (R) | Aeronautical Mobile Satellite Services (Reserved) |
| ANI | Automatic Number Identification |
| ANSI | American National Standards Institute |
| ANT | Antenna |
| AOC | Aircraft Operational Communications |
| APC | Airline Passenger Communications |
| API | Applications Program Interface |
| AR | Automatic Roaming |
| ARC | Atlantic Research Corporation |
| ASK | Access Security Key |
| ASN.1 | Abstract Syntax Notation One |
| AT | Command set for a DTE to communicate with asynchronous host |
| ATC | Air Trafic Control |
| AVD | Alternate Voice/Data Calls |
| AWGN | Additive White Gaussian Noise |
| AZ | Azimuth |
| B8ZS | Bipolar with 8 Zeros Substitution |
| BB | Bulletin Board |
| BBS | Bulletin Board Service |
| BERT | Bit Error Rate Tester |
| BID | Beam Identifier Code |
| BIT | Built In Test |
| BITE | Built-In Test Equipment |
| BPS | Bits Per Second |
| BS | Base Station |
| BSPU | Baseband Signaling Processing Unit |
| BSS | Base Station Switch |
| C/No | Carrier to Noise Power Density Ratio |
| CAC | Channel Access and Control |
| CAF | Call Failure Message |
| CCCS | Command, Control, and Communications Subsystem |
| CCIR | Consultative Committee International de Radio |
| CCITT | Consultative Committee International Telegraph and Telephone |
| CCU | Communications Channel Unit |
| CD | Call Delivery |
| CDR | Call Detail Record |
| CDR | Critical Design Review |
| CDRL | Contract Data Requirements List |
| CE | Common Equipment |
| CG | Control Group |
| CGID | Control Group Identification Number |
| CGS | Communications Ground Segment |
| CHA | Channel Assignment Message |
| CHREL | Channel Release Message |
| CHREQ | Channel Request Message |
| CI | Configuration Item |
| CIBER | Cellular Intercarrier Billing Exchange Roamer |
| CIC | Carrier Identification Code |
| CM | Configuration Management |
| CMIP | Common Management Information System |
| CMIS | Configuration Management Information System |
| CMIS | Customer Management Information System |
| CP | Circuit Pool |
| CPD | Call Processing Demonstration |
| CPS | Circuit Pool Segment |
| CPU | Central Processing Unit |
| C/PV | Commissioning/Performance Verification |
| CRC | Cyclic Redundancy Check |
| CS | Communications System |
| CSC | Computer Software Component |
| CSCI | Computer Software Configuration Item |
| CSDT | Channel Switchover Detection Time |
| CSF | Critical System Functionality |
| CSMA/CD | Carrier Sense Multiple Access with Collision Detection |
| CSMP | Circuit Switch Management Processor |
| CSMPCS | Circuit Switch Management Data Processor Equipment Communications System |
| CSPU | Channel Signal Processing Unit |

GLOSSARY-continued

| | |
|---|---|
| CSR | CAC Statistics Request |
| CSREP | Call Status Reply Message |
| CSREQ | Call Status Request Message |
| CSU | Computer Software Unit |
| CSUG | Computer Software Unit Group |
| CTB | Customer Test Bed |
| CTN | Cellular Telephone Netword |
| CTN | Cellular Terrestrial Network |
| CTNI | Cellular Telephone Network Interface |
| CU | Channel Unit |
| CUD | Call User Data |
| CUG | Closed User Group |
| CUP | Channel Unit Pool |
| CUS | Channel Unit Subsystem |
| CVR | Cellular Visitor Registration |
| CVRACK | Cellular Visitor Registration Acknowledge |
| CW | Carrier Wave |
| CWCHA | Call Waiting Channel Assignment Message |
| DAMA | Demand Assignment Multiple Access |
| db | Database |
| dbc | Decibel Relative to Carrier |
| db | decibels |
| dBi | dB Relative to Isotropic |
| dBm | dB relative to 1 milli watt |
| dBW | decibels relative to 1 watt |
| D bit | 'Data Configuration' bit in X.25 |
| DBMS | DataBase Management System |
| dBw | dB Relative to 1 Watt |
| DC | Direct Current |
| DCE | Data Circuit Terminating Equipment |
| DCE | Data Communications Equipment |
| DCL | Digital Command Language |
| DCN | Down CoNverter |
| DCR# | Document Control Release # |
| DCU | Data Channel Unit |
| DD | Design Document |
| DDCMP | Digital Data Communications Message Protocol |
| DDS | Direct Digital Synthesis |
| DEC | Digital Equipment Corporation |
| DECmss | Digital's Network Management System |
| DEQPSK | Differential Encoded Quadrature Phase Shift Keying |
| DET | Data Equipment Terminal |
| DFD | Data Flow Diagram |
| DH | Data Hub |
| DH-D | Outbound Time Division Multiplex Channel from Data Hub to Mobile Terminal |
| DHP | Data Hub Processor |
| DHSI | DH-D Selector Identification Code |
| DID | Direct Inward Dialing |
| DIDs | Data Item Descriptions |
| DME | Dial-Up Modem Emulation |
| DMQ | DEC Message Queue |
| DMS | Digital Multiplex System |
| DN | Directory Number |
| DNS | Digital Name Service |
| DOC | Canadian Department of Communications |
| DOD | Direct Outward Dialing |
| DPSK | Differential Phase Shift Keying |
| DQPSK | Differentially Encoded Quadrature Phase Shift Keying |
| DS0 | Digital Service Level Zero (single 64K b/s channel) |
| DS 1 | Digital Service Level One twenty four voice channels) |
| DSP | Digital Signal Processing |
| DSSS 1 | Digital Subscriber Signaling System 1 |
| DTC | Digital Trunk Controller |
| DTE | Data Terminal Equipment |
| DTE | Data Terminal Element |
| DTMF | Dual Tone Multiple Frequency |
| DVSI | Digital Voice Systems, Inc. |
| Eb/No | Bit Energy to Noise Power Density Ratio |
| ECN | Engineering Change Notice |
| EFD | EF Data, Inc. |
| EFTIN | Encrypted Forward Terminal Identification Number |
| E-I | Exchange - Interexchange |

GLOSSARY-continued

| | |
|---|---|
| EIA | Electronic Industries Association |
| EICD | Element Interface Control Document |
| EIE | External Interface Equipment |
| EIRP | Equivalent Isotropic Radiated Power |
| EI | Elevation |
| EMC | ElectroMagnetic Compatibility |
| EMI | ElectroMagnetic Interference |
| eng | engineer or engineering |
| EO | End Office |
| EO | External Organizations |
| EOD | End of Data |
| ESN | Electronic Serial Number |
| FAX | Facsimile |
| FCA | Functional Configuration Audit |
| FCC | Federal Communications Commission |
| FCS | Fading Channel Simulator |
| FDMA | Frequency Division Multiple Access |
| FEC | Forward Error Correction |
| FES | Feederlink Earth Station |
| FES-C | Inbound Communication channel from Feederlink Earth Station to Mobile Terminal |
| FES-I | Interstation signaling channel from Feederlink Earth Station to Group Controller |
| FES/MT | Feederlink Earth Station/Mobile Terminal |
| FES-RE | Feederlink Earth Station-Radio Frequency Equipment |
| FES-TE | Feederlink Earth Station Terminal Equipment |
| FFT | Fast Fourier Transform |
| FIS | Feederlink Earth Station Interface Simulator |
| FIT | Fault Isolation Tests |
| FIU | Fax Interface Unit |
| FMT | Fixed Mobile Terminal |
| FMA | Field Programmable Gate Array |
| FPMH | Failures per Million Hours |
| FRO | Frequency Reference Oscillator |
| FT | Fault Tolerant |
| FTE | Fax Terminal Equipment |
| FTIN | Forward Terminal Identification Number |
| G/T | Gain to System Noise Ratio |
| GBF | Gateway/Base System |
| GC | Group Controller |
| GC-I | Interstation signaling channel from Group Controller to Feederlink Earth Station |
| GC-S | Time Division Multiplex Signaling channel from Group Controller to Mobile Terminal |
| GCSST | GC-S Search Time |
| GEN | Generator |
| GHz | Giga (1,000,000,000) Hertz (cycles per second) |
| GMACS | Graphical Monitor And Control System |
| GPIB | General Purpose Instrument Bus |
| GPS | Global Positioning System |
| GS | Gateway Station |
| GSI | GC-S Selector Identifier |
| GW | Gateway |
| GWS | Gateway Switch |
| GWS/BSS | Gateway Switch/Base Station Switch |
| H/W | Hardware |
| HCHREQ | Handoff Channel Request |
| HDP | Hardware Development Plan |
| HLR | Home Location Register |
| HMI | Human Machine Interface |
| HOT | Hand-off Test |
| HPA | High Power Amplifier |
| HRS | Hardware Requirements Specification |
| HWCI | Hardware Configuration Item |
| HW/SW | Hardware/Software |
| Hz | Hertz |
| I | In Phase channel |
| IAW | In Accordance With |
| IC | Interexchange Carrier |
| ICD | Interface Control Document |
| ICI | Instrument Control Interface |
| ICP | Intelligent Cellular Peripheral |
| ICU | Interstation Channel Unit |
| ICWG | Interface Control Working Group/Interface Coordination Working Group |
| ID | Identification |
| IEEE | Institute of Electrical and Electronics Engineers |

GLOSSARY-continued

| | |
|---|---|
| IF | Intermediate Frequence |
| IFIS | Intermediate Frequency Subsystem |
| IFL | Interfacility Link |
| IF IFL | Intermediate Frequency Internal Facility Link |
| IHO | Interstation Hand-Off |
| IICD | Internal Interface Control Document |
| IICWG | Internal Interface Control Working Group |
| IM | Intermodulation |
| IMBE | Improved Multiband Excitation |
| IOC | Input/Output Controller |
| IP | Internet Protocol |
| ISCU | Interstation Signaling Channel Unit/ Interstation Channel Unit |
| ISDN | Integrated Services Digital Network |
| ISL | Interstation Signaling Link |
| ISO | International Standards Organization |
| IVDCPD | Integrated Voice & Data Call Processing Demonstration |
| IVDM | Integrated Voice/Data Mobile Terminal |
| KBPS | Kilo (1,000) Bits per Second |
| kHz | Kilohertz |
| KLNA | K-band Low Noise Amplifier |
| KP | Key Pulse |
| LAN | Local Area Network |
| LAP | Link Access Procedure |
| LAPB | Link Access Procedure using a balanced mode of operation |
| LATA | Local Access and Transport Area |
| LBP | Local Blocking Probability |
| LCN | Logical Channel Number |
| LLCSC | Lower Level Computer Software Component |
| LLNA | L-band Lowe Noise Amplifier |
| LLS | Lower Level Specification |
| LNA | Low Noise Amplifier |
| LOI | Level of Integration |
| LPP | Link Periperal Processor |
| LRU | Line Replaceable Unit |
| LRU | Line Replaceable Unit |
| LRU | Lowest Replaceable Unit |
| LSSGR | Loval Access and Transport Area Switching Systems Generic Requirements |
| MAP | Maintenance Administrative Position |
| MAP | Mobile Appplication Part |
| M bit | 'More Data' bit in X.25 |
| M&C | Monitaor and Control |
| MCC | Management Control Center |
| MCGID | Mobile Data Service Control Group Identification Number |
| MDLP | Mobile Data Service Data Link Protocol |
| MDS | Mobile Data Service |
| MDSR | MDLP Statistics Request |
| MEA | Failure Modes and Effects Analysis |
| MEF | Minimum Essential Functionality |
| MELCO | Mitsubishi Electronic Company |
| MET | Mobile Earth Terminal (a.k.a. MT) |
| MET-C | Communication Channel Between Mobile Terminal and Feederlink Earth Station |
| MET-DRd | Inbound Slotted Aloha Data Channel |
| MET-DRr | Inbound Slotted Aloha Reservation Channel |
| MET-DT | Inbound Packet Time Division Multiple Access Channel |
| MET-SR | Random Access Signaling Channel from Mobile Terminal to Group Controller |
| MET-ST | Time Division Multiple Access signaling channel from Mobile Terminal to Group Controller |
| MF | Multiple Frequency |
| MFID | Manufacturer Identification |
| MGSP | Mobile Terminal to Group Controller Signaling Protocol |
| MHz | Mega hertz (cycles per second) |
| MIB | Management Information Base |
| MIR | Management Information Region |
| MIRQ | MT Initialization Request |
| MIS | Mobile Terminal Interface Simulator |
| MIS | Mobile Earth Terminal Interface Simulator |
| ML | Message Layer |
| MLCSC | Mid Level Computer Software Component |
| MLP | Multilink Procedure |
| MMI | Man Machine Interface |
| MMRS | Mobile Road Service |
| MMSS | Maritime Mobile Satellite Services |
| MNMS | Mobile Data Service Network Management Subsystem |
| MNP | Multi Network Protocol |
| MODEM | MODulator/MEModulator |
| MOS | Mean Opinion Score |
| MOV | Method of Verification |
| MPLP | Mobile Data Service Packet Layer Protocol |
| MPR | MPR Teltch Inc. |
| MRI | Minimum Request Interval |
| MRS | Mobile Radio Service |
| MSAT | Mobile Satellite |
| MSC | Mobile Switching Center |
| MSS | Mobile Satellite Service |
| MSSP | Mobile Terminal Specialized Services Protocol |
| ms | millisecond |
| MT | Mobile Terminal |
| MT-C | Communication Channel Beween Mobile Terminal and Feederlink Earth Station |
| MT-DRd | Inbound Slotted Aloha Data Channel |
| MT-DRr | Inbound Slotted Aloha Reservation Channel |
| MT-DT | Inbound Packet Time Division Multiple Access Channel |
| MT/NR | Mobile Terminal/Net Radio |
| MT ASK | Mobile Terminal Access Security Key |
| MTBF | Mean-Time Between Failures |
| MTBRA | Mean-Time Between Restoral Action |
| MTCRS | Mobile Telephone Cellular Roaming Service |
| MT-MET | Mobile Terminal to Mobile Terminal |
| MT-MT | Mobile Terminal to Mobile Terminal |
| MTP | Mobile Data Service Transacton Protocol |
| MT-PSTN | Mobile Terminal/Public Switched Telephone Network |
| MTS | Mobile Telephone Service |
| MT-SR | Random Access Signaling Channel from Mobile Terminal to Group Controller |
| MTSR | MTP Statistics Request |
| MT-ST | Time Division Multiple Access Signaling Channel from Mobile Terminal to Group Controller |
| MTTR | Mean-Time to Repair |
| MTX | Mobile Telephone Exchange |
| MULP | Mobile Data Service Unacknowledged Link Protocol |
| MUSR | MULP Statistics Request |
| NACN | North American Cellular Network |
| NADP | North American Dialing Plan |
| NANP | North American Numbering Plan |
| NAP | Network Access Processor |
| NAP-C | Netork Access Processor for the Communications Channel |
| NAP-CU | Network Access Processor-Channel Unit |
| NAP-D | Network Access Processor for the Data Channel |
| NAP-N | Network Access Processor for the Network Radio Channel |
| NAP-S | Network Access Processor for the Signaling Channel |
| NAS | Network Access Subsystem |
| NASP | National Aerospace Plan |
| NCC | Network Communications Controller |
| NCC | Network Control Center |
| NCC-RE | Network Communication Controller Radio frequency Equipment |
| NCC-TE | Network Communications Controller Terminal Equipment |
| NCS | Network Control System |
| NCU | Net Radio Control Unit |
| NCU | Net Radio Channel Unit |
| NE | Network Engineering |
| NEBS | New Equipment Building System |
| NE/SE | Network Engineering/System Engineering |
| NIM | Network Module |
| NM | Network Module |
| NMP | Network Management Process |
| NMS | Network Management System |
| NMS/CMIS | Network Management System/Customer Management Information System |
| NOC | Network Operations Center |
| NOC-FES | Network Operations Center-Feederlink Earth Station |
| NPA | Numbering Plan Area |

GLOSSARY-continued

| | |
|---|---|
| NR | Net Radio |
| NRCHA | Net Radio Channel Assignment |
| NRCHREL | Net Radio Channel Release |
| NRCHREQ | Net Radio Channel Request |
| NRDVI | Net Radio Dispatcher Voice Interface |
| NRS | Net Radio Service |
| NRZ | Non-Return to Zero |
| NT | Northern Telecom |
| NTL | Northern Telecom Limited |
| NTP | Northern Telecom Practice |
| NVM | Non-Volatile Memory |
| OA&M | Operation, Administration, and Maintenance |
| O&M | Operation and Maintenance |
| OJJ | On the Job Training |
| OM | Operational Measurements (from GWS) |
| OS | Operating System |
| OSF | Open Software Foundation |
| OSI | Open Systems Interconnection |
| OSR | Operational Suppoprt Review |
| PA | Product Assurance |
| PAC | Pre-emption Acknowledge Message |
| PAD | Packet Assembler/Disassembler |
| PAP | Product Assurance Plan |
| PBX | Private Branch Exchange |
| PC | Process Control |
| PCM | Pulse Code Modulation |
| PC-RFMCP | PC based RFM Control Processor |
| PC-SCP | PC Based Systems Control Processor |
| PCSTR | Physical Channel Statistics Request |
| PCT | Provisioning Criteria Table |
| PCU | Pilot Control Unit |
| PCU | Pilot Channel Unit |
| PDAMA | Priority Demand Assignment Multiple Access |
| PDN | Packet Data Network |
| PDR | Preliminary Design Review |
| PDU | Protocol Data Unit |
| PE | Protocol Extension |
| PER | Packet Error Rate |
| PERSP | Packet Error Rate Sample Period |
| PERT | Packet Error Rate Threshold |
| PIP | Program Implementation Plan |
| PLP | Packet Layer Protocal |
| PLT | Pilot |
| PMR | Project Management Review |
| PMT | Pre-emption Message |
| PN | Private Network |
| PN | Pseudo Noise |
| PNIC | Privat Network Identificaton Code |
| PPM | Pulses per Minute |
| PS | Processor Subsystem |
| PSDN | Private Switched Data Network |
| PSDN | Public Switched Data Network |
| PSTN | Public Switched Telephone Network |
| PTT | Push-To-Talk |
| PVC | Performance Virtual Circuit |
| PVT | Permanent Verification Test/Performance Verification Test |
| Q | Quadrature Phased Channel |
| QA | Quality Assurance |
| Q bit | 'Qualified Data' bit X.25 |
| QPSK | Quadrature Phase Shift Keying |
| RAM | Random Access Memory |
| RAM | Reliability, Availability, Maintainability |
| RDB | Relational DataBase |
| REMS | Remote Environmental Monitoring System |
| Req | Requirement |
| Rev | Revision |
| RF | Radio Frequency |
| RFE | Radio Frequency Equipment |
| RF IFL | Radio Frequency Inter Facility Link |
| FRM | Radio Frequency Monitor |
| RFP | Request For Proposal |
| RFS | Radio Frequency Subsystem |
| RHCP | Right Hand Circularly Polarized |
| RMS | Remote Monitoring Station |
| RMS | Remote Monitor Subsystem |
| RNO | Remote NOC Operator |

GLOSSARY-continued

| | |
|---|---|
| ROM | Read Only Memory |
| RR | Receiver Ready |
| RS | Requirements Specification |
| RS-232C | Electronics Industry Standard for unbalanced data circuits |
| RSP | Radio Standard Procedure |
| RTIN | Reverse Terminal Identification Number |
| RTM | Requirements Traceability Matrix |
| RTP | Reliable Transaction Protocol |
| RTR | Reliable Transaction Router |
| RTS | Reliable Transaction Service |
| RTS | Receiver/Tuner System |
| Rx | receive |
| S/W | Software |
| SCADA | Supervisory Control and Data Acquisition |
| SCCP | Signaline Connection Control Part |
| SCPC | Single Channel Per Carrier |
| SCR | Software Change Request |
| SCS | System Common Software |
| SCU | Signaling Channel Unit |
| SDD | Software Design Description |
| SDID | Seller Data Item Description |
| SDLC | Synchronous Data Link Control |
| SDP | Software Development Plan |
| SDPAP | Software Development Product Assurance Plan |
| SDR | System Design Review |
| SDRL | Seller Data Requirements List |
| SE | Systems Engineering |
| SEC | Setup Complete Message |
| SEDP | Software Engineering Development Plan |
| SEE | Software Engineering Environment |
| SEEP | Software Engineering Environment Plan |
| SID | System Identifier Code |
| SIF | System Integration Facility |
| SIT | Special Information Tones |
| SLOC | Source Lines of Code |
| SLSS | Station Logic and Signaling Subsystem |
| SM | Site Manager |
| SMAC | Station Monitor Alarm and Control Subsystem |
| SMDS | Satellite Mobile Data Service |
| SMP | Software Management Plan |
| SMRS | Satellite Mobile Radio Service |
| SMSC | Satellite Mobile Switching Center |
| SMTS | Satellite Mobile Telephone Service |
| SNA | Systems Network Architecture |
| SNAC | Satellite Network Access Controller |
| SNACS | Satellite Network Access Controller Subsystem |
| SNMP | Simple Network Management Protocol |
| SNR | Signal to Noise Ratio |
| SOC | Satellite Operation Center |
| SOW | Statement of Work |
| SP | Start Pulse |
| SPAP | Software Product Assurance Plan |
| SPP | Satellite Protocol Processor |
| SQL | Software Query Language |
| SRR | Systems Requirements Review |
| SRS | Software Requirements Specification |
| SS7 | Signaling System No. 7 |
| SSA | Slopppy Slotted Aloha |
| SSTS | Satellite Transmission Systems, Inc. |
| STP | Signal Transfer Point |
| STP | System Test Program |
| STS | System Test Station. |
| STSI | Satellite Transmission Systems, Inc. |
| SU | Signaling Unit |
| SUES | Shared-Use Earth Station |
| SVC | Switched Virtual Circuit |
| SVVP | Software Verification and Validation Plan |
| SVVPR | Software Verification and Validation Plan Review |
| S/W | Software |
| [TI] | Top Level Specification |
| T-1 | Digital Transmission link, 1.544 Mega-bits per second |
| TCP/IP | Transmission Control Protocol Internet Protocol |

GLOSSARY-continued

| | |
|---|---|
| TCAP | Transactions Capabilities Application Part |
| TCF | Training Check Frame |
| TD | Transmission Demonstration |
| TDM | Time Division Multiplex |
| DTMA | Time Division Multiplex Selector ID |
| TE | Terminal Equipment |
| Telecom | Telephonic Communications |
| TDM | Time Division Multiplex |
| TDMA | TDM Access |
| TID | Terminal Identification |
| TIM | Timing |
| TIM | Technical Interchange Meeting |
| TIN | Terminal Identification Number |
| TIS | Terrestrial Interface Subsystem |
| TLCSC | Top Level Computer Software Component |
| TLS | Top Level Specification |
| TMI | Telesat Mobile Incorporated |
| TMS | Test and Monitor Station |
| TNI | Terrestrial Network Interface |
| TPP | Test Plan and Procedure |
| TT&C | Telemtry, Tracking and Control |
| Tx | Transmit |
| UCN | Up CoNverter |
| UDS | Unacknowledged Data Delivery Service |
| UIS | User Interface Subsystem |
| UPC | Uplink Power Control |
| UTR | Universal Tone Receiver |
| UW | Unique Words |
| V&V | Verification and Validation |
| VAC | Value-Added Carrier |
| VAX | Model Identification of a Digital Equipment Corporation system |
| VAX | Virtual Address eXtension (proprietary name used by DEC for some of its computer systems) |
| VCN | Virtual Circuit Number |
| VF | Voice Frequency |
| VLR | Visitor Location Register |
| VN | Virtual Network |
| VPN | Virtual Private Network |
| VUP | VAX Unit of Processing |
| V.22bis | Modem Standard for 24( )0 Baud Service Over Telephone Lines |
| V.25 | Procedure for setting up a data connection on the Public Switched Telephone Network |
| V.26, V.28 | Electrical specification of interchange circuits at both the Data Terminal Equipment and Data Communications Equipment sides of the interface (similar to RS-232-C) |
| V.32 | High Speed Serial Link, Physical Layer Definition |
| V.35 | X.25 physical layer interface used to access wideband channels (at data rates up to 64 kbit/s) |
| WAN | Wide Area Network |
| XCR | X.25 Configuration Request |
| XICD | External Interface Control Document |
| XICWG | External Interface Control Working Group |
| X.3 | Specification for facilities provided by the Packet Assembler/Disassembler |
| X.21 | X.25 physical layer interface for Data Terminal Equipment and Data Communications Equipment using synchronous transmission facilities |
| X.21bis | X.25 physical layer interface for Data Terminal Equipment designed for interfacing to synchronous V-series modems to access data networks |
| X.25 | Specification for interface between Data Terminal Equipment and Data Communication Equipment for terminals operating in packet mode |
| X.28 | Specification for interaction between loval terminal and Packet Assembler/Disassembler |
| X.29 | Specification for interaction between Packet Assembler/Disassembler and remote packet mode terminal |

What is claimed is:

1. In a mobile communication system including at least one satellite for receiving/transmitting a message from/to a mobile communication system, a method of providing priority access to a closed user group communication, comprising the steps of:

(a) transmitting a NET radio request indicating the NET radio is being requested for a NET group associated therewith;

(b) allocating a frequency for the NET radio, and transmitting the frequency to the NET group;

(c) tuning by the NET group to the frequency in response to said allocating step (b); and (d) accessing by the NET group on a priority basis the closed user group communication responsive to issuance of a priority message for priority access thereto;

(e) executing the closed user group communication responsive to said accessing step (d).

2. The method according to claim 1, wherein at least one controller controls the closed user group communication including NET radio parameters used by at least first and second METs.

3. The method according to claim 1, wherein at least one controller selectively downloads the NET IDs to first and second METs according to predetermined user criteria.

4. The method according to claim 3, wherein the at least one controller collects billing information regarding the closed user group communication and transmits the billing information to the mobile satellite system, and wherein the mobile communication system charges a service fee to a customer that has requested the closed user group arrangement.

5. The method according to claim 1, further comprising the steps of:

(1) accessing the mobile communication system via one of a public switched telephone network and a wireless network to initiate a closed user group communication with the NET group;

(2) transmitting the message to the NET group informing the NET group of the allocated frequency and the communication associated therewith; and (3) tuning to the frequency in response to the message transmitted by the at least one controller to communicate closed user group arrangement.

6. The method according to claim 2, further comprising the steps of:

(1) transmitting by the at least one controller a non-MET message to at least one of a public switched telephone network and a wireless network including the communication associated therewith; and (2) the at least one of the public switched telephone network and the wireless network receiving the non-MET message from the at least one controller and transmitting the non-MET message to a non-MET to establish the closed user group arrangement between the MET and the non-MET.

7. The method according to claim 2, wherein the first MET includes a push to talk (PTT) device for generating the release of speaker message, and wherein said method further comprises the steps of the first MET activating the PTT device generating a PTT signal only when the PTT device is activated after a current speaker is one of vacant or the first MET, relieving congestion on the satellite by selectively transmitting the PTT signal.

8. The method according to claim 7, wherein when the first MET activates the PTT device before one of the current speaker is vacant and the first MET, the first MET ignores the activation of the PTT device.

9. The method according to claim 2, further comprising the step of the at least one controller selectively downloading monitor codes to the first and second METs according to predetermined user criteria.

10. The method according to claim 9, wherein the monitor codes functioning to lock at least one of the first and second METs to the NET group preventing the NET group from being released when no request has been made by one of the first and second METs to be the current speaker after a predetermined period of time.

11. The method according to claim 1, wherein the NET group comprises at least first and second METS, and wherein said method further comprises the step of controlling the closed user group communication including NET radio parameters used by at least first and second METs.

12. In a mobile satellite system including at least one satellite for receiving/transmitting a message from/to a mobile communication system, a method of providing secure access to a closed user group communication, comprising the steps of:
(a) transmitting a NET radio request indicating the NET radio is being requested for a NET group associated therewith;
(b) allocating a frequency for the NET radio, and transmitting the frequency to the NET group;
(c) tuning by the NET group to the frequency in response to said allocating step (b); and
(d) accessing by the NET group the closed user group communication responsive to issuance of a security message for authorized access thereto;
(e) executing the closed user group communication responsive to said accessing step (d).

13. A method according to claim 12, wherein the security message comprises a scrambling vector, and the scrambling vector is generated in accordance with the following steps:
(1) generating a first security key having first and second components using a first process having first and second input signals, the first input signal comprising a second security key and the second input signal comprising at least one of a transmit frequency and a receive frequency;
(2) generating the scrambling vector responsive to the first security key.

14. A method according to claim 12, wherein the security message is generated in accordance with the following steps:
(1) generating a first security key having first and second components using a first process having first and second input signals, the first input signal comprising a second security key and the second input signal comprising at least one of a transmit frequency and a receive frequency; and
(2) generating the security message responsive to at least one of the first and second components of the first security key.

15. A method according to claim 14, wherein the at least one of the transmit frequency and the receive frequency comprises both the transmit and receive frequencies.

16. A method according to claim 14, wherein the second input signal further comprises information received from a communication bulletin board in the mobile communication network system.

17. In a mobile satellite system including at least one satellite for receiving/transmitting a message from/to a mobile communication system, a method of providing communication between mobile earth terminals (METs) via a dual standby operation permitting communication alternately between a closed user group arrangement (NET radio) and a mobile telephone service (MTS), said method comprising the steps of:
(a) transmitting, alternately or substantially simultaneously, a MTS request indicating the MTS is being requested or a NET radio request indicating the NET radio is being requested for a NET group associated therewith;
(b) allocating a frequency for at least one of the MTS and the NET radio, and transmitting the frequency to at least one of the METs and the NET group;
(c) tuning by the at least one of the METs and the NET group to the frequency in response to said allocating step (b); and
(d) at least one of the METs alternately selecting between the NET radio request representing the NET radio, and the MTS request representing the MTS.

18. The method according to claim 17, wherein the at least one controller controls the closed user group satellite communication including net radio parameters used by the first and second METs.

19. The method according to claim 17, wherein the at least one controller selectively downloads the NET IDs to the first and second METs according to predetermined user criteria.

20. The method according to claim 17, wherein the at least one controller collects billing information regarding the closed user group satellite communication and transmits the billing information to the mobile satellite system, and wherein the mobile satellite system charges a service fee to a customer that has requested the closed user group arrangement.

21. The method according to claim 17, further comprising the steps of:
(1) a non-MET accessing the mobile satellite system via one of a public switched telephone network and a wireless network to initiate a communication with the NET group;
(2) the at least one controller transmitting the message to the NET group informing the NET group of the allocated frequency and the communication associated therewith; and
(3) the NET group tuning to the allocated frequency in response to the message to communicate with the non-MET in a substantially closed user group arrangement.

22. The method according to claim 17, further comprising the steps of:
(1) the first MET selecting the NET ID representing the NET group including at least the first MET and a non-MET serviced by one of a public switched telephone network and a wireless network to establish communication therewith;
(2) the first MET transmitting the NET ID to the at least one controller;
(3) the at least one controller receiving the NET ID, determining that the NET group includes the non-MET, and transmitting a non-MET message to the one of the public switched telephone network and the wireless network including the communication associated therewith; and (4) the one of the public switched telephone network and the wireless network receiving the non-MET message from the at least one controller and transmitting the non-MET message to the non-MET to establish the closed user group arrangement between the first MET and the non-MET.

23. The method according to claim 17, wherein the first MET includes a push to talk (PTT) device for generating the release of speaker message, and wherein said method further comprises the steps of the first MET activating the PTT device generating a PTT signal after the current speaker is one of vacant or the first MET, relieving congestion on the at least one satellite by selective transmission of the PTT signal.

24. The method according to claim 23, wherein when the second MET activates the PTT device before one of the current speaker is vacant and the first MET, the method ignores the activation of the PTT device.

25. The method according to claim 17, further comprising the step of the at least one controller selectively downloading monitor codes to the first and second METs according to predetermined user criteria.

26. The method according to claim 25, wherein the monitor codes functioning to lock at least one of the first and second METs to the NET group preventing the NET group from being released when no request has been made by the first and second METs to be the current speaker after the predetermined period of time.

27. In a mobile satellite system including at least one satellite for receiving/transmitting a message from/to a mobile communication system, a system for providing communication between multiple users in a closed user group arrangement, comprising:
at least first and second mobile earth terminals (METs) responsively communicable in the mobile satellite system, and adapted to select a closed user group network identifier (NET ID) representing a NET group; and
at least one controller responsively connectable to the first and second METs via the at least one satellite,
wherein the at least one of the at least first and second METs adapted to transmit a priority message to at least one of the NET group and a priority NET group, and the at least one of the NET group and the priority NET group adapted to receive the priority message as the communication in the closed user group arrangement.

28. In a mobile satellite system including at least one satellite for receiving/transmitting a message from/to a mobile communication system, a system for providing communication between multiple users in a closed user group arrangement, comprising:
at least first and second mobile earth terminals (METs) responsively communicable in the mobile satellite system, and adapted to select a closed user group network identifier (NET ID) representing a NET group including at least the first and second METs; and
at least one controller responsively connectable to the first and second METs via the at least one satellite, the at least one controller adapted to receive the NET ID from the first MET, allocate a frequency for the NET group, and transmit the message to the NET group including the second MET to inform the NET group of the allocated frequency and the communication associated therewith, the second MET adapted to tune to the allocated frequency in response to receiving the message, and one of the at least first and second METs designatable as a speaker for the NET group,
wherein at least one of the first and second METs adapted to generate a security message for authorized access to the communication, and to tune to the allocated frequency for the NET group using the security message.

29. In a mobile satellite system including at least one satellite for receiving/transmitting a message from/to a mobile communication system, a system for providing satellite communication between multiple users in a closed user group arrangement, comprising:
at least first and second mobile earth terminals (METs) responsively communicable in the mobile satellite system, and adapted to select a closed user group network identifier (NET ID) representing a NET group including at least the first and second METs; and
at least one controller responsively connectable to the first and second METs via the at least one satellite, the at least one controller adapted to receive the NET ID from the first MET, allocate a frequency for the NET group, and transmit the message to the NET group including the second MET to inform the NET group of the allocated frequency and the communication associated therewith, the second MET adapted to tune to the frequency in response to receiving the message, and one of the at least first and second METs designatable as a speaker for the NET group,
wherein the system is further adapted to provide dual standby operation permitting communication between the at least one of the first and second METs in at least one of a closed user group arrangement (NET radio) and a mobile telephone service (MTS).

30. In a mobile communication system for receiving/transmitting a message from/to a mobile communication device, a system for providing communication between multiple users in a closed user group arrangement, comprising:
at least first and second mobile communication devices responsively communicable in the mobile communication system, and adapted to select a closed user group network identifier (NET ID) representing a NET group; and
at least one controller responsively connectable to the first and second mobile communication devices,
wherein the at least one of the at least first and second mobile communication devices adapted to transmit a priority message to at least one of the NET group and a priority NET group, and the at least one of the NET group and the priority NET group adapted to receive the priority message as the communication in the closed user group arrangement.

31. In a mobile communication system for receiving/transmitting a message, a system for providing communication between multiple users in a closed user group arrangement, comprising:
at least first and second mobile communication devices responsively communicable in the mobile communication system, and adapted to select a closed user group network identifier (NET ID) representing a NET group including at least the first and second METs; and
at least one controller responsively connectable to the first and second mobile communication devices, the at least one controller adapted to receive the NET ID from the first mobile communication device, allocate a frequency for the NET group, and transmit the message to the NET group to inform the NET group of the allocated frequency, the second mobile communication device adapted to tune to the allocated frequency in response to receiving the message, and one of the at least first and second mobile communication devices designatable as a speaker for the NET group, wherein at least one of the first and second mobile communication devices adapted to generate a security message for authorized access to the communication, and to tune to the allocated frequency for the NET group using the security message.

32. In a mobile communication system including for receiving/transmitting a message, a system for providing communication between multiple users in a closed user group arrangement, comprising:

at least first and second mobile devices responsively communicable in the mobile communication system, and adapted to select a closed user group network identifier (NET ID) representing a NET group including at least the first and second mobile devices; and at least one controller responsively connectable to the first and second mobile devices, the at least one controller adapted to receive the NET ID from the first mobile device, allocate a frequency for the NET group, and transmit the message to the NET group including the second mobile device to inform the NET group of the allocated frequency and the communication associated therewith, the second mobile device adapted to tune to the frequency in response to receiving the message, and one of the at least first and second mobile devices designatable as a speaker for the NET group, wherein the system is further adapted to provide dual standby operation permitting communication between the at least one of the first and second mobile devices in at least one of the closed user group arrangement (NET radio) and a mobile telephone service (MTS).

* * * * *